United States Patent
Deenoo et al.

(10) Patent No.: US 12,279,326 B2
(45) Date of Patent: Apr. 15, 2025

(54) METHODS AND SYSTEMS FOR BEAM RECOVERY AND MANAGEMENT

(71) Applicant: InterDigital Patent Holdings, Inc., Wilmington, DE (US)

(72) Inventors: Yugeswar Deenoo, Chalfont, PA (US); Tao Deng, Roslyn, NY (US); Martino M. Freda, Laval (CA); Ghyslain Pelletier, Montreal (CA); Faris Alfarhan, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/476,874

(22) Filed: Sep. 28, 2023

(65) Prior Publication Data

US 2024/0023183 A1 Jan. 18, 2024

Related U.S. Application Data

(63) Continuation of application No. 17/848,102, filed on Jun. 23, 2022, now Pat. No. 11,812,488, which is a
(Continued)

(51) Int. Cl.
*H04B 7/08* (2006.01)
*H04W 72/21* (2023.01)
(Continued)

(52) U.S. Cl.
CPC .......... *H04W 76/19* (2018.02); *H04W 72/21* (2023.01); *H04W 72/23* (2023.01);
(Continued)

(58) Field of Classification Search
None
See application file for complete search history.

(56) References Cited

U.S. PATENT DOCUMENTS

| 6,768,913 B1 | 7/2004 | Molnar et al. |
| 7,349,371 B2 | 3/2008 | Schein et al. |

(Continued)

FOREIGN PATENT DOCUMENTS

| CN | 101583196 A | 11/2009 |
| CN | 101873601 A | 10/2010 |

(Continued)

OTHER PUBLICATIONS

Ericsson AB, et al., "RWS-120003", Views on Rel-12, Jun. 1, 2012, pp. 1-13.
(Continued)

*Primary Examiner* — Ajit Patel
(74) *Attorney, Agent, or Firm* — Flaster Greenberg, P.C.

(57) ABSTRACT

A system and methods for beam failure recovery and management for multi-carrier communications with beamforming are disclosed herein. A wireless transmit/receive unit (WTRU) may monitor for and detect a beam failure of a beam associated with a secondary cell (Scell). The WTRU may select an Scell candidate beam. The WTRU may transmit using a selected uplink (UL) resource in a primary cell (SpCell) a medium access control (MAC) control element (CE) including an indication of Scell beam failure and identifying the selected candidate beam. The WTRU may receive an Scell beam failure indication response on the SpCell indicating an SCell index and a downlink (DL) quasi co-location (QCL) reference associated with the Scell. The WTRU may verify that the DL QCL reference matches with the candidate beam. The WTRU may perform random access on the SCell using the selected QCL reference and the selected candidate beam.

20 Claims, 12 Drawing Sheets

Related U.S. Application Data continuation of application No. 16/636,210, filed as application No. PCT/US2018/046086 on Aug. 9, 2018, now Pat. No. 11,419,173.

(60) Provisional application No. 62/668,531, filed on May 8, 2018, provisional application No. 62/630,001, filed on Feb. 13, 2018, provisional application No. 62/615,250, filed on Jan. 9, 2018, provisional application No. 62/543,222, filed on Aug. 9, 2017.

(51) Int. Cl.
*H04W 72/23* (2023.01)
*H04W 74/0833* (2024.01)
*H04W 76/16* (2018.01)
*H04W 76/19* (2018.01)
*H04W 88/02* (2009.01)

(52) U.S. Cl.
CPC ....... *H04W 74/0833* (2013.01); *H04W 76/16* (2018.02); *H04W 88/02* (2013.01)

(56) References Cited

U.S. PATENT DOCUMENTS

| | | | |
|---|---|---|---|
| 8,111,656 B2 | 2/2012 | Che et al. | |
| 8,565,179 B2 | 10/2013 | Noh et al. | |
| 8,825,095 B2 | 9/2014 | Tong et al. | |
| 8,913,682 B2 | 12/2014 | Nam et al. | |
| 9,078,268 B2 * | 7/2015 | Jung | H04B 7/0695 |
| 9,642,126 B2 | 5/2017 | Park et al. | |
| 9,647,805 B2 | 5/2017 | Gerlach et al. | |
| 9,730,138 B2 | 8/2017 | Wang et al. | |
| 9,749,968 B2 | 8/2017 | Stern-berkowitz et al. | |
| 10,257,864 B2 | 4/2019 | Zhao et al. | |
| 10,700,752 B2 | 6/2020 | Jung et al. | |
| 10,848,230 B2 | 11/2020 | Lu et al. | |
| 10,979,127 B2 | 4/2021 | Zhang et al. | |
| 10,985,825 B2 | 4/2021 | Xiong et al. | |
| 11,006,441 B2 | 5/2021 | Shih et al. | |
| 11,184,080 B2 | 11/2021 | Nagaraja et al. | |
| 11,312,433 B2 | 4/2022 | Weisbruch | |
| 11,329,711 B2 | 5/2022 | Koskela et al. | |
| 11,336,357 B2 | 5/2022 | Koskela et al. | |
| 11,337,265 B2 | 5/2022 | Zhou et al. | |
| 11,368,995 B2 | 6/2022 | Wu et al. | |
| 11,419,173 B2 | 8/2022 | Deenoo et al. | |
| 11,470,631 B2 | 10/2022 | Matsumura et al. | |
| 11,595,103 B2 | 2/2023 | Matsumura et al. | |
| 2002/0159506 A1 | 10/2002 | Alamouti et al. | |
| 2009/0170514 A1 | 7/2009 | Yokoyama | |
| 2009/0175161 A1 | 7/2009 | Yi et al. | |
| 2009/0280867 A1 | 11/2009 | Hovers et al. | |
| 2010/0067470 A1 | 3/2010 | Damnjanovic et al. | |
| 2010/0267341 A1 | 10/2010 | Bergel et al. | |
| 2011/0268049 A1 | 11/2011 | Luo et al. | |
| 2012/0026913 A1 | 2/2012 | Reznik et al. | |
| 2012/0040684 A1 | 2/2012 | Gao et al. | |
| 2012/0076042 A1 | 3/2012 | Chun et al. | |
| 2012/0287875 A1 | 11/2012 | Kim et al. | |
| 2012/0300714 A1 | 11/2012 | Ng et al. | |
| 2013/0021952 A1 | 1/2013 | Jeong et al. | |
| 2013/0029657 A1 | 1/2013 | Gao et al. | |
| 2013/0039345 A1 | 2/2013 | Kim et al. | |
| 2013/0040684 A1 | 2/2013 | Yu et al. | |
| 2013/0083774 A1 | 4/2013 | Son et al. | |
| 2013/0102345 A1 | 4/2013 | Jung | |
| 2013/0121185 A1 | 5/2013 | Li et al. | |
| 2013/0155847 A1 | 6/2013 | Li et al. | |
| 2013/0182683 A1 | 7/2013 | Seol et al. | |
| 2013/0196678 A1 | 8/2013 | Liu et al. | |
| 2013/0265899 A1 | 10/2013 | Sayana et al. | |
| 2013/0272220 A1 | 10/2013 | Ying et al. | |
| 2013/0286960 A1 | 10/2013 | Li et al. | |
| 2013/0301542 A1 | 11/2013 | Krishnamurthy et al. | |
| 2013/0308714 A1 | 11/2013 | Xu et al. | |
| 2013/0316721 A1 | 11/2013 | Lan et al. | |
| 2013/0336176 A1 | 12/2013 | Rubin et al. | |
| 2013/0342846 A1 | 12/2013 | Campagne et al. | |
| 2014/0003240 A1 | 1/2014 | Chen et al. | |
| 2014/0016573 A1 | 1/2014 | Nuggehalli et al. | |
| 2014/0029684 A1 | 1/2014 | Shirani-mehr et al. | |
| 2014/0092855 A1 | 4/2014 | Ahn et al. | |
| 2014/0112254 A1 | 4/2014 | Lindoff et al. | |
| 2014/0112269 A1 | 4/2014 | Yu et al. | |
| 2014/0153427 A1 | 6/2014 | Seo et al. | |
| 2014/0177607 A1 | 6/2014 | Li et al. | |
| 2014/0293898 A1 | 10/2014 | Tseng | |
| 2015/0105025 A1 | 4/2015 | Zhang et al. | |
| 2015/0382205 A1 | 12/2015 | Lee et al. | |
| 2016/0001403 A1 | 1/2016 | Matsumoto et al. | |
| 2016/0080058 A1 | 3/2016 | Kang et al. | |
| 2017/0034812 A1 | 2/2017 | Deng et al. | |
| 2017/0055190 A1 | 2/2017 | Takano | |
| 2017/0207843 A1 | 7/2017 | June et al. | |
| 2017/0231011 A1 * | 8/2017 | Park | H04W 74/006 |
| 2017/0280481 A1 | 9/2017 | Stern-berkowitz et al. | |
| 2018/0006770 A1 | 1/2018 | Guo et al. | |
| 2018/0167883 A1 | 6/2018 | Guo et al. | |
| 2018/0219604 A1 | 8/2018 | Lu et al. | |
| 2018/0227899 A1 | 8/2018 | Yu et al. | |
| 2018/0278310 A1 | 9/2018 | Lee et al. | |
| 2018/0279286 A1 | 9/2018 | Akoum et al. | |
| 2018/0323856 A1 | 11/2018 | Xiong et al. | |
| 2018/0375556 A1 * | 12/2018 | Wang | H04B 7/0617 |
| 2019/0335522 A1 | 10/2019 | Zhang et al. | |
| 2020/0099437 A1 | 3/2020 | Harada et al. | |
| 2020/0120704 A1 | 4/2020 | Wang et al. | |
| 2020/0170027 A1 | 5/2020 | Yang et al. | |
| 2020/0186218 A1 | 6/2020 | Wu et al. | |
| 2020/0389220 A1 | 12/2020 | Kang et al. | |
| 2020/0404638 A1 | 12/2020 | Deogun et al. | |
| 2022/0061087 A1 | 2/2022 | Koskela et al. | |

FOREIGN PATENT DOCUMENTS

| | | | |
|---|---|---|---|
| CN | 101924610 A | 12/2010 | |
| CN | 102083228 A | 6/2011 | |
| CN | 102405603 A | 4/2012 | |
| CN | 102415121 A | 4/2012 | |
| CN | 102548016 A | 7/2012 | |
| CN | 102696183 A | 9/2012 | |
| CN | 102714807 A | 10/2012 | |
| CN | 103155622 A | 6/2013 | |
| CN | 103155678 A | 6/2013 | |
| CN | 103588583 A | 2/2014 | |
| CN | 103597765 A | 2/2014 | |
| CN | 103905346 A | 7/2014 | |
| CN | 103988551 A | 8/2014 | |
| CN | 104105212 A | 10/2014 | |
| CN | 104137440 A | 11/2014 | |
| CN | 104521312 A | 4/2015 | |
| CN | 105359427 A | 2/2016 | |
| CN | 106416346 A | 2/2017 | |
| CN | 107079459 A | 8/2017 | |
| CN | 108462515 A | 8/2018 | |
| CN | 108632837 A | 10/2018 | |
| CN | 108702767 A | 10/2018 | |
| CN | 109121223 A | 1/2019 | |
| CN | 109391344 A | 2/2019 | |
| CN | 104955606 B | 5/2019 | |
| EP | 2939349 A1 | 11/2015 | |
| EP | 3200498 A1 * | 8/2017 | H04B 7/0695 |
| EP | 3264631 A1 | 1/2018 | |
| WO | WO 2010/033989 A1 | 3/2010 | |
| WO | WO 2010/054378 A1 | 5/2010 | |
| WO | WO 2014/104758 A1 | 7/2014 | |
| WO | WO 2014/116928 A1 | 7/2014 | |
| WO | WO 2014/172306 A2 | 10/2014 | |
| WO | WO 2016/086114 A1 | 6/2016 | |
| WO | WO 2016086144 A1 | 6/2016 | |
| WO | WO 2017024516 A1 | 2/2017 | |
| WO | WO 2017123060 A1 | 7/2017 | |
| WO | WO 2017/151876 A1 | 9/2017 | |

(56) References Cited

FOREIGN PATENT DOCUMENTS

| WO | 2018129300 A1 | 7/2018 |
|---|---|---|
| WO | 2018164332 A1 | 9/2018 |
| WO | 2018190617 A1 | 10/2018 |

OTHER PUBLICATIONS

Third Generation Partnership Project (3GPP), "Small cell enhancements for E-UTRA and E-UTRAN—Physical layer aspects", Technical Specification Group Radio Access Network; (Release 12), 3GPP TR 36.872 V12.1.0, Dec. 2013, 100 pages.
IEEE 22nd International Symposium on Personal Indoor and Mobile Radio Communications, "Vision for Beyond 4G Broadband Radio Systems", Raaf, et al., Sep. 2011, 5 pages.
IEEE Access, vol. 1, "Millimeter Wave Mobile Communications for 5G Cellular: It Will Work!", Rappaport, et al., May 2013, pp. 335-349.
IEEE Wireless Communications, "The Evolution of Wireless LANs and PANs", Salkintzis, et al., vol. 10, Issue 6., Dec. 2003, 2 pages.
Master's Thesis Full-Text Database (CMFD) (Electronic Periodical) Information Science and Technology Section, "Research on DRX Algorithm based on LTE/LTE-Advanced System", Han, Apr. 21, 2014, 74 pages.
Third Generation Partnership Project, Technical Specification Group Radio Access Network; Evolved Universal Terrestrial Radio Access (E-UTRA) (Release 10), 3GPP TS 36.213 V10.8.0, Dec. 2012, 126 pages.
Third Generation Partnership Project, "Considerations on CSI feedback enhancements for high-priority antenna configurations", Alcatel-Lucent Shanghai Bell, et al., 3GPP TSG-RAN WG1 #66, R1-112420, Athens, Greece, Aug. 22-26, 2011, 7 pages.
Third Generation Partnership Project, "Evolved Universal Terrestrial Radio Access (E-UTRA) and Evolved Universal Terrestrial Radio Access Network (E-UTRAN)", Technical Specification Group Radio Access Network; Overall description; Stage 2 (Release 11), 3GPP TS 36.300 V11.4.0, Dec. 2012, 208 pages.
Third Generation Partnership Project, "Evolved Universal Terrestrial Radio Access (E-UTRA) and Evolved Universal Terrestrial Radio Access Network (E-UTRAN)", Technical Specification Group Radio Access Network; Overall description; Stage 2 (Release 11), 3GPP TS 36.300 V11.8.0, Dec. 2013, 209 pages.
Third Generation Partnership Project, "Evolved Universal Terrestrial Radio Access (E-UTRA) and Evolved Universal Terrestrial Radio Access Network (E-UTRAN)", Technical Specification Group Radio Access Network; Overall description; Stage 2, (Release 12), 3GPP TS 36.300 V12.0.0, Dec. 2013, 208 pages.
Third Generation Partnership Project, "Further advancements for E-UTRA physical layer aspects", Technical Specification Group Radio Access Network; Evolved Universal Terrestrial Radio Access (E-UTRA) (Release 9), 3GPP TR 36.814 V9.0.0, Mar. 2010, 104 pages.
Third Generation Partnership Project, "LTE Release 12 and Beyond", RWS-120003, 3GPP RAN WS on Rel-12 and onwards, Ljubljana, Slovenia, Jun. 11-12, 2012, 10 pages.
Third Generation Partnership Project, "Medium Access Control (MAC) protocol specification", Technical Specification Group Radio Access Network; (Release 12), 3GPP TS 36.321 V12.0.0, Dec. 2013, 57 pages.
Third Generation Partnership Project, "Medium Access Control (MAC) protocol specification", Technical Specification Group Radio Access Network; Evolved Universal Terrestrial Radio Access (E-UTRA) (Release 11), 3GPP TS 36.321 V11.4.0, Dec. 2013, 57 pages.
Third Generation Partnership Project, "Medium Access Control (MAC) protocol specification", Technical Specification Group Radio Access Network; Evolved Universal Terrestrial Radio Access (E-UTRA) (Release 11), 3GPP TS 36.321 V11.1.0, Dec. 2012, 57 pages.
Third Generation Partnership Project, "Medium Access Control (MAC) protocol specification", Technical Specification Group Radio Access Network; Evolved Universal Terrestrial Radio Access (E-UTRA) (Release 10), 3GPP TS 36.321 V10.10.0, Dec. 2013, 55 pages.
Third Generation Partnership Project, "Medium Access Control (MAC) protocol specification", Technical Specification Group Radio Access Network; Evolved Universal Terrestrial Radio Access (E-UTRA) (Release 10), 3GPP TS 36.321 V10.7.0, Dec. 2012, 54 pages.
Third Generation Partnership Project, "Medium Access Control (MAC) protocol specification", Technical Specification Group Radio Access Network; Evolved Universal Terrestrial Radio Access (E-UTRA) (Release 11), 3GPP TS 36.321 V11.0.0, Sep. 2012, 55 pages.
Third Generation Partnership Project, "Medium Access Control (MAC) protocol specification", Technical Specification Group Radio Access Network; Evolved Universal Terrestrial Radio Access (EUTRA) (Release 8), 3GPP TS 36.321 V8.12.0, Mar. 2012, 47 pages.
Third Generation Partnership Project, "Medium Access Control (MAC) protocol specification", Technical Specification Group Radio Access Network; Evolved Universal Terrestrial Radio Access (EUTRA) (Release 9), 3GPP TS 36.321 V9.6.0, Mar. 2012, 48 pages.
Third Generation Partnership Project, "Multiplexing and channel coding", Technical Specification Group Radio Access Network: Evolved Universal Terrestrial Radio Access (E-UTRA) (Release 12), 3GPP TS 36.212 V12.0.0, Dec. 2013, 88 pages.
Third Generation Partnership Project, "Multiplexing and channel coding", Technical Specification Group Radio Access Network; Evolved Universal Terrestrial Radio Access (E-UTRA) (Release 10), 3GPP TS 36.212 V10.8.0, Jun. 2013, 79 pages.
Third Generation Partnership Project, "Multiplexing and channel coding", Technical Specification Group Radio Access Network; Evolved Universal Terrestrial Radio Access (E-UTRA (Release 10), 3GPP TS 36.212 V10.7.0, Dec. 2012, 79 pages.
Third Generation Partnership Project, "Multiplexing and channel coding", Technical Specification Group Radio Access Network; Evolved Universal Terrestrial Radio Access (EUTRA) (Release 8), 3GPP TS 36.212 V8.8.0, Dec. 2009, 60 pages.
Third Generation Partnership Project, "Multiplexing and channel coding", Technical Specification Group Radio Access Network; Evolved Universal Terrestrial Radio Access (EUTRA) (Release 9), 3GPP TS 36.212 V9.4.0, Sep. 2011, 61 pages.
Third Generation Partnership Project, "Multiplexing and channel coding", Technical Specification Group Radio Access Network; Evolved Universal Terrestrial Radio Access (E-UTRA (Release 11), 3GPP TS 36.212 V11.4.0, Dec. 2013, 84 pages.
Third Generation Partnership Project, "Multiplexing and channel coding", Technical Specification Group Radio Access Network; Evolved Universal Terrestrial Radio Access (E-UTRA) (Release 11), 3GPP TS 36.212 V11.1.0, Dec. 2012, 82 pages.
Third Generation Partnership Project, "Physical channels and modulation", Technical Specification Group Radio Access Network; Evolved Universal Terrestrial Radio Access (E-UTRA) (Release 12), 3GPP TS 36.211 V12.7.0, Sep. 2015, 136 pages.
Third Generation Partnership Project, "Physical Channels and Modulation", Technical Specification Group Radio Access Network; Evolved Universal Terrestrial Radio Access (E-UTRA) (Release 11), 3GPP TS 36.211 V11.1.0, Dec. 2012, 108 pages.
Third Generation Partnership Project, "Physical Channels and Modulation", Technical Specification Group Radio Access Network; Evolved Universal Terrestrial Radio Access (E-UTRA) (Release 11), 3GPP TS 36.211 V11.5.0, Dec. 2013, 120 pages.
Third Generation Partnership Project, "Physical channels and modulation", Technical Specification Group Radio Access Network; Evolved Universal Terrestrial Radio Access (E-UTRA) (Release 12), 3GPP TS 36.211 V12.3.0, Sep. 2014, 124 pages.
Third Generation Partnership Project, "Physical Channels and Modulation", Technical Specification Group Radio Access Network; Evolved Universal Terrestrial Radio Access (E-UTRA) (Release 10), 3GPP TS 36.211 V10.6.0, Dec. 2012, 101 pages.
Third Generation Partnership Project, "Physical Channels and Modulation", Technical Specification Group Radio Access Network; Evolved Universal Terrestrial Radio Access (EUTRA) (Release 10), 3GPP TS 36.211 V10.7.0, Feb. 2013, 101 Pages.
Third Generation Partnership Project, "Physical Channels and Modulation", Technical Specification Group Radio Access Network;

(56) References Cited

OTHER PUBLICATIONS

Evolved Universal Terrestrial Radio Access (EUTRA) (Release 11), 3GPP TS 36.211 V11.0.0, Sep. 2012, 106 Pages.
Third Generation Partnership Project, "Physical Channels and Modulation", Technical Specification Group Radio Access Network; Evolved Universal Terrestrial Radio Access (E-UTRA) (Release 12), 3GPP TS 36.211 V12.0.0, Dec. 2013, 120 pages.
Third Generation Partnership Project, "Physical Channels and Modulation", Technical Specification Group Radio Access Network; Evolved Universal Terrestrial Radio Access (E-UTRA) (Release 8), 3GPP TS 36.211 V8.9.0, Dec. 2009, 83 pages.
Third Generation Partnership Project, "Physical Channels and Modulation", Technical Specification Group Radio Access Network; Evolved Universal Terrestrial Radio Access (E-UTRA) (Release 9), 3GPP TS 36.211 V9.1.0, Mar. 2010, 85 pages.
Third Generation Partnership Project, "Physical layer—Measurements", Technical Specification Group Radio Access Network; Evolved Universal Terrestrial Radio Access (E-UTRA) (Release 8), 3GPP TS 36.214 V8.7.0, Sep. 2009, 12 pages.
Third Generation Partnership Project, "Physical layer procedures", Technical Specification Group Radio Access Network; Evolved Universal Terrestrial Radio Access (EUTRA) (Release 8), 3GPP TS 36.213 V8.8.0, Sep. 2009, 77 pages.
Third Generation Partnership Project, "Physical layer procedures", Technical Specification Group Radio Access Network; (Release 10), 3GPP TS 36.213 V12.0.0, Dec. 2013, 186 pages.
Third Generation Partnership Project, "Physical layer procedures", Technical Specification Group Radio Access Network; Evolved Universal Terrestrial Radio Access (E-UTRA) (Release 10), 3GPP TS 36.213 V10.11.0, Dec. 2013, 127 pages.
Third Generation Partnership Project, "Physical layer procedures", Technical Specification Group Radio Access Network; Evolved Universal Terrestrial Radio Access (E-UTRA) (Release 11), 3GPP TS 36.213 V11.1.0, Dec. 2012, 160 pages.
Third Generation Partnership Project, "Physical layer procedures", Technical Specification Group Radio Access Network; Evolved Universal Terrestrial Radio Access (E-UTRA) (Release 11), 3GPP TS 36.213 V11.5.0, Dec. 2013, 182 pages.
Third Generation Partnership Project, "Physical layer procedures", Technical Specification Group Radio Access Network; Evolved Universal Terrestrial Radio Access (EUTRA) (Release 11), 3GPP TS 36.213 V11.0.0, Sep. 2012, 143 pages.
Third Generation Partnership Project, "Physical layer procedures", Technical Specification Group Radio Access Network; Evolved Universal Terrestrial Radio Access (E-UTRA) (Release 12), 3GPP TS 36.213 V12.3.0, Sep. 2014, 212 pages.
Third Generation Partnership Project, "Physical layer procedures", Technical Specification Group Radio Access Network; Evolved Universal Terrestrial Radio Access (E-UTRA) (Release 12), 3GPP TS 36.213 V12.7.0, Sep. 2015, 241 pages.
Third Generation Partnership Project, "Physical layer procedures", Technical Specification Group Radio Access Network; Evolved Universal Terrestrial Radio Access (EUTRA) (Release 9), 3GPP TS 36.213 V9.3.0, Sep. 2010, 80 pages.
Third Generation Partnership Project, "Physical layer; Measurements", Technical Specification Group Radio Access Network; Evolved Universal Terrestrial Radio Access (E-UTRA) (Release 10), 3GPP TS 36.214 V10.1.0, Mar. 2011, 13 pages.
Third Generation Partnership Project, "Physical layer; Measurements", Technical Specification Group Radio Access Network; Evolved Universal Terrestrial Radio Access (EUTRA) (Release 11), 3GPP TS 36.214 V11.1.0, Dec. 2012, 14 Pages.
Third Generation Partnership Project, "Physical layer; Measurements", Technical Specification Group Radio Access Network; Evolved Universal Terrestrial Radio Access (E-UTRA) (Release 9), 3GPP TS 36.214 V9.2.0, Jun. 2010, 14 pages.
Third Generation Partnership Project, "Radio Frequency (RF) system scenarios" Technical Specification Group Radio Access Network; Evolved Universal Terrestrial Radio Access (E-UTRA) (Release 11),3GPP TR 36.942 V11.0.0, Sep. 2012, 109 pages.
Third Generation Partnership Project, "Radio Frequency (RF) system scenarios", Technical Specification Group Radio Access Network; Evolved Universal Terrestrial Radio Access (E-UTRA)(Release 12), 3GPP TR 36.942 V12.0.0, Sep. 2014, 109 pages.
Third Generation Partnership Project, "Radio Resource Control (RRC); Protocol specification", Technical Specification Group Radio Access Network; Evolved Universal Terrestrial Radio Access (E-UTRA) (Release 9), 3GPP TS 36.331 V9.17.0, Dec. 2013, 262 pages.
Third Generation Partnership Project, "Radio Resource Control (RRC); Protocol specification", Technical Specification Group Radio Access Network; Evolved Universal Terrestrial Radio Access (E-UTRA) (Release 11), 3GPP TS 36.331 V11.2.0, Dec. 2012, 340 pages.
Third Generation Partnership Project, "Radio Resource Control (RRC); Protocol specification", Technical Specification Group Radio Access Network; Evolved Universal Terrestrial Radio Access (E-UTRA) (Release 11), 3GPP TS 36.331 V11.6.0, Dec. 2013, 349 pages.
Third Generation Partnership Project, "Radio Resource Control (RRC); Protocol specification", Technical Specification Group Radio Access Network; Evolved Universal Terrestrial Radio Access (EUTRA); (Release 8), 3GPP TS 36.331 V8.20.0, Jun. 2013, 216 pages.
Third Generation Partnership Project, "Radio Resource Control (RRC); Protocol specification", Technical Specification Group Radio Access Network; Evolved Universal Terrestrial Radio Access (E-UTRA) (Release 10), 3GPP TS 36.331 V10.12.0, Dec. 2013, 310 pages.
Third Generation Partnership Project, "Radio Resource Control (RRC); Protocol specification", Technical Specification Group Radio Access Network; Evolved Universal Terrestrial Radio Access (E-UTRA) (Release 10), 3GPP TS 36.331 V10.8.0, Dec. 2012, 305 pages.
Third Generation Partnership Project, "Radio Resource Control (RRC); Protocol specification", Technical Specification Group Radio Access Network; Evolved Universal Terrestrial Radio Access (E-UTRA) (Release 12), 3GPP TS 36.331 V12.0.0, Dec. 2013, 349 pages.
Third Generation Partnership Project, "Radio Resource Control (RRC); Protocol specification", Technical Specification Group Radio Access Network; Evolved Universal Terrestrial Radio Access (E-UTRA) (Release 9), 3GPP TS 36.331 V9.13.0, Dec. 2012, 258 pages.
Third Generation Partnership Project, "Radio Resource Control (RRC); Protocol specification", Technical Specification Group Radio Access Network; Evolved Universal Terrestrial Radio Access (E-UTRA) (Release 11), 3GPP TS 36.331 V11.0.0, Jun. 2012, 302 pages.
Third Generation Partnership Project, "Radio Resource Control (RRC); Protocol specification", Technical Specification Group Radio Access Network; Evolved Universal Terrestrial Radio Access (E-UTRA) (Release 12), 3GPP TS 36.331 V12.3.0, Sep. 2014, 378 pages.
Third Generation Partnership Project, "Radio Resource Control (RRC); Protocol specification", Technical Specification Group Radio Access Network; Evolved Universal Terrestrial Radio Access (E-UTRA) (Release 8), 3GPP TS 36.331 V8.18.0, Dec. 2012, 215 pages.
Third Generation Partnership Project, "Radio Resource Control (RRC); Protocol specification", Technical Specification Group Radio Access Network; Evolved Universal Terrestrial Radio Access (E-UTRA)(Release 12), 3GPP TS 36.331 V12.7.0, Sep. 2015, 453 pages.
Third Generation Partnership Project, "Requirements for support of radio resource management", Technical Specification Group Radio Access Network; Evolved Universal Terrestrial Radio Access (E-UTRA) (Release 12), 3GPP TS 36.133 V12.5.0, Sep. 2014, 209 pages.
Third Generation Partnership Project, "Requirements for support of radio resource management", Technical Specification Group Radio Access Network; Evolved Universal Terrestrial Radio Access (E-UTRA) (Release 12), 3GPP TS 36.133 V12.9.0, Sep. 2015, 299 pages.
Third Generation Partnership Project, "Requirements for support of radio resource management", Technical Specification Group Radio Access Network; Evolved Universal Terrestrial Radio Access (E-UTRA) (Release 13), 3GPP TS 36.133 V13.1.0, Sep. 2015, 42 pages.
Third Generation Partnership Project, "Small cell enhancements for E-UTRA and E-UTRAN—Physical layer aspects" Technical Specification Group Radio Access Network; (Release 12), 3GPP TR 36.872 V12.0.0, Sep. 2013, 78 pages.
Third Generation Partnership Project, "TDD Home eNode B (HeNB) Radio Frequency (RF) requirements analysis", Technical Specifi-

(56) References Cited

OTHER PUBLICATIONS cation Group Radio Access Network; Evolved Universal Terrestrial Radio Access (E-UTRA)(Release 10), 3GPP TR 36.922 V10.0.0, Apr. 2011, 74 pages.
Third Generation Partnership Project, "Use scenarios for elevation beamforming", Huawei, et al., 3GPP TSG RAN WG1, Meeting #72, R1-130028, St. Julian's, Malta, Jan. 28-Feb. 1, 2013, 3 pages.
Huawei et al., "RAN2 aspects of DL beam management," 3GPP TSG-RAN WG2 Meeting NR#2, R2-1706718, Qingdao, China (Jun. 27-29, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Nokia et al., "SCell Beam Failure Recovery," 3GPP TSG-RAN WG2 Meeting #101bis, R2-1805342, Sanya, China (Apr. 16-20, 2018).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.3.0 (Jun. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).
Third Generation Partnership Project, "Technical Specification Group Radio Access Network; Evolved Universal Terrestrial Radio Access (E-UTRA); Radio Resource Control (RRC);Protocol specification (Release 13)," 3GPP TS 36.331 V13.1.0 (Mar. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.3.0 (Jun. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.3.0 (Jun. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).

Third Generation Partnership Project, "Technical Specification Group Radio Access Network; Evolved Universal Terrestrial Radio Access (E-UTRA); Physical layer procedures (Release 14)," 3GPP TS 36.213 V14.7.0 (Jun. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.2.0 (Jul. 2018).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.7.0 (Jul. 2018).
Third Generation Partnership Project, "Technical Specification Group Radio Access Network; NR; Medium Access Control (MAC) protocol specification (Release 15)," 3GPP TS 38.321 V0.0.4 (Jun. 2017).
Third Generation Partnership Project, "Technical Specification Group Radio Access Network; NR; Medium Access Control (MAC) protocol specification (Release 15)," 3GPP TS 38.321 V15.2.0 (Jun. 2018).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.2 (Jun. 2018).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.7.0 (Jun. 2018).
ZTE Corporation, "Discussion on beam link failure," 3GPP TSG-RAN WG2 Meeting #98, R2-1704646, Hangzhou, P. R. China (May 15-19, 2017).
R1-1705893, "Beam failure detection and beam recovery actions", 8_1 .22.2, 3GPP TSG-RAN WG1 Meeting #88bis; Ericsson, Spokane, U.S., Apr. 3-7, 2017, 5 pages.
R2-1706718, "RAN2 aspects of DL beam management", 10.2.10, 3GPP TSG-RAN WG2 Meeting NR#2; Qingdao, China, Jun. 27-29, 2017, 4 pages.
R2-1706905, "Resource configuration for beam failure recovery request", 10.2.10, 3GPP TSG-RAN WG2 Meeting #AH, Lenovo Motorola Mobility, Qingdao, China, Jun. 27-29, 2017, 4 pages.
CN 101924610 A, Cited in Information Disclosure Statement dated May 30, 2023, in related U.S. Appl. No. 17/848,102.
RP-182067 , "Revised WID: Enhancements on MIMO for NR", Samsung, Sep. 10-13, 2018, 5 pages.
R2-1812639 , "BWP operation for BFR", LG Electronics Inc. 3GPP TSG-RAN WG2 Meeting #103,, Aug. 2018, 3 pages.
R1-1811853 , "Summary on SCell BFR and Beam Measurement", Intel Corporation 3GPP TSG RAN WG1 Meeting #94b, Chengdu, China, Oct. 8-12, 2018, 15 pages.
R1-1811049 , "Consideration on measurement and reporting of L1-RSRQ/L 1-SINR", CMCC. 3GPP TSG RAN WG1 #94b, Oct. 2018, 3 pages.
R1-1810805 , "Discussion on Beam Failure Recovery", NEC, 3GPP TSG RAN WG1 Meeting #94b, Oct. 2018, 2 pages.
3GPP TS 38.213 V15.3.0 , "NR Physical Layer Procedures for Control", 3rd Generation Partnership Project; Technical Specification Group Radio Access Network (Release 15), Sep. 2018, 101 pages.
3GPP TS 38.300 V15.3.1 , "NR; NR and NG-RAN Overall Description; Stage 2 (Release 15)", 3rd Generation Partnership Project; Technical Specification Group Radio Access Network, Oct. 2018, 92 pages.
3GPP TS 38.321 V15.3.0 , "3rd Generation Partnership Project; Technical Specification Group Radio Access Network", NR; Medium Access Control (MAC) protocol specification (Release 15), Sep. 2018, 76 pages.
3GPP TS 38.331 V15.3.0 , "NR; Radio Resource Control (RRC) Protocol Specification (Release 15)", 3rd Generation Partnership Project; Technical Specification Group Radio Access Network;, Sep. 2018, 444 pages.

(56) References Cited

OTHER PUBLICATIONS

GANG, "Principles and Applications of WiMAX Technology", Beijing University of Posts and Telecommunications Press, Dec. 2010.

R1-1808720, "On SCell Beam Failure Recovery", XP051516094 Ntel Corporation: 3GPP Draft 3rd Generation Partnership Project (3GPP), Mobile Competence Centre' 650, Route Des Lucioles; F-06921 Sophia-Antipolis Cedex; France, vol. RAN WG1, No. Gothenburg, Sweden, Aug. 11, 2018, 4 pages.

R1-1803348, "LS Reply on Beam Failure Recovery", RAN1, 3GPP TSG RAN WG1 Meeting #92 Third Generation Partnership Project, Feb. 26-Mar. 2, 2018, 2 pages.

R1-1803397, "Summary of Email Discussion on Beam Failure Recovery on SCell", CATT 3GPP TSG RAN WG1 Meeting #92, Athens, Third Generation Partnership Project Greece, Feb. 26-Mar. 2, 2018, 3 pages.

R1-1807725, "Draft Reply LS on Beam Failure Recovery", RAN1, 3GPP TSG-RAN WG1 Meeting #93, May 21-25, 2018, 2 pages.

R1-1808669, "Remaining Issues on Beam Management", Intel Corporation, 3GPP TSG RAN WG1 #94, Aug. 2018, 16 pages.

R1-1810303, "Discussion on multi-beam based operations and enhancements", LG Electronics, 3GPP TSG RAN WG1 Meeting #94bis, Oct. 2018, 8 pages.

R1-1810791, "On Beam Management Enhancement", Intel Corporation, 3GPP TSG RAN WG1 Meeting #94b, Oct. 2018, 11 pages.

\* cited by examiner

METHODS AND SYSTEMS FOR BEAM RECOVERY AND MANAGEMENT

CROSS REFERENCE TO RELATED APPLICATIONS

This application is a continuation of U.S. Non-Provisional application Ser. No. 17/848,102, filed Jun. 23, 2022, which is a continuation of U.S. Non-Provisional application Ser. No. 16/636,210, filed Feb. 3, 2020, which issued as U.S. Pat. No. 11,419,173 on Aug. 16, 2022, which is the U.S. National Stage, under 35 U.S.C. § 371, of International Application No. PCT/US2018/046086, filed Aug. 9, 2018, which claims the benefit of U.S. Provisional Patent Application Ser. No. 62/543,222, filed Aug. 9, 2017, U.S. Provisional Patent Application Ser. No. 62/615,250, filed Jan. 9, 2018, U.S. Provisional Patent Application Ser. No. 62/630,001, filed Feb. 13, 2018, and U.S. Provisional Patent Application Ser. No. 62/668,531, filed May 8, 2018, the entire contents of which are incorporated herein by reference.

BACKGROUND

Beamforming may be implemented, for example, to compensate for increased path loss at higher frequencies. Higher frequencies may include, for example, those equal to or greater than 6 GHz. A plurality of antenna elements may be used to achieve suitable beamforming gain. For example, a larger number of antenna elements may be used to achieve a higher beamforming gain. Analog and/or hybrid beamforming may be used to reduce implementation cost, for example by reducing the number of radio frontend chains.

SUMMARY

A system and methods for beam failure recovery and management that may be performed by a wireless transmit/receive unit (WTRU) configured for multi-carrier communications using beamforming are disclosed herein. A WTRU may monitor for beam failure on a secondary cell (Scell). The WTRU may detect a beam failure of a first beam associated with the Scell and may select a candidate beam associated with the Scell. The WTRU may determine an uplink (UL) resource in a primary cell (SpCell) as a function of the SCell and the selected candidate beam associated with the Scell, and transmit, using the selected SpCell UL resource, a medium access control (MAC) control element (CE) including at least an indication of Scell beam failure and an identification of the selected candidate beam associate with the Scell. The WTRU may receive an Scell beam failure indication response via a control channel associated with the SpCell, wherein the Scell beam failure indication response indicates at least an SCell index and a downlink (DL) quasi co-location (QCL) reference associated with the Scell. The WTRU may verify that the DL QCL reference matches with the candidate beam associated with the Scell. The WTRU may transmit a random access preamble on the SCell using the selected QCL reference and the selected candidate beam, and may receive a first random access response (RAR) on the selected candidate beam on the Scell.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
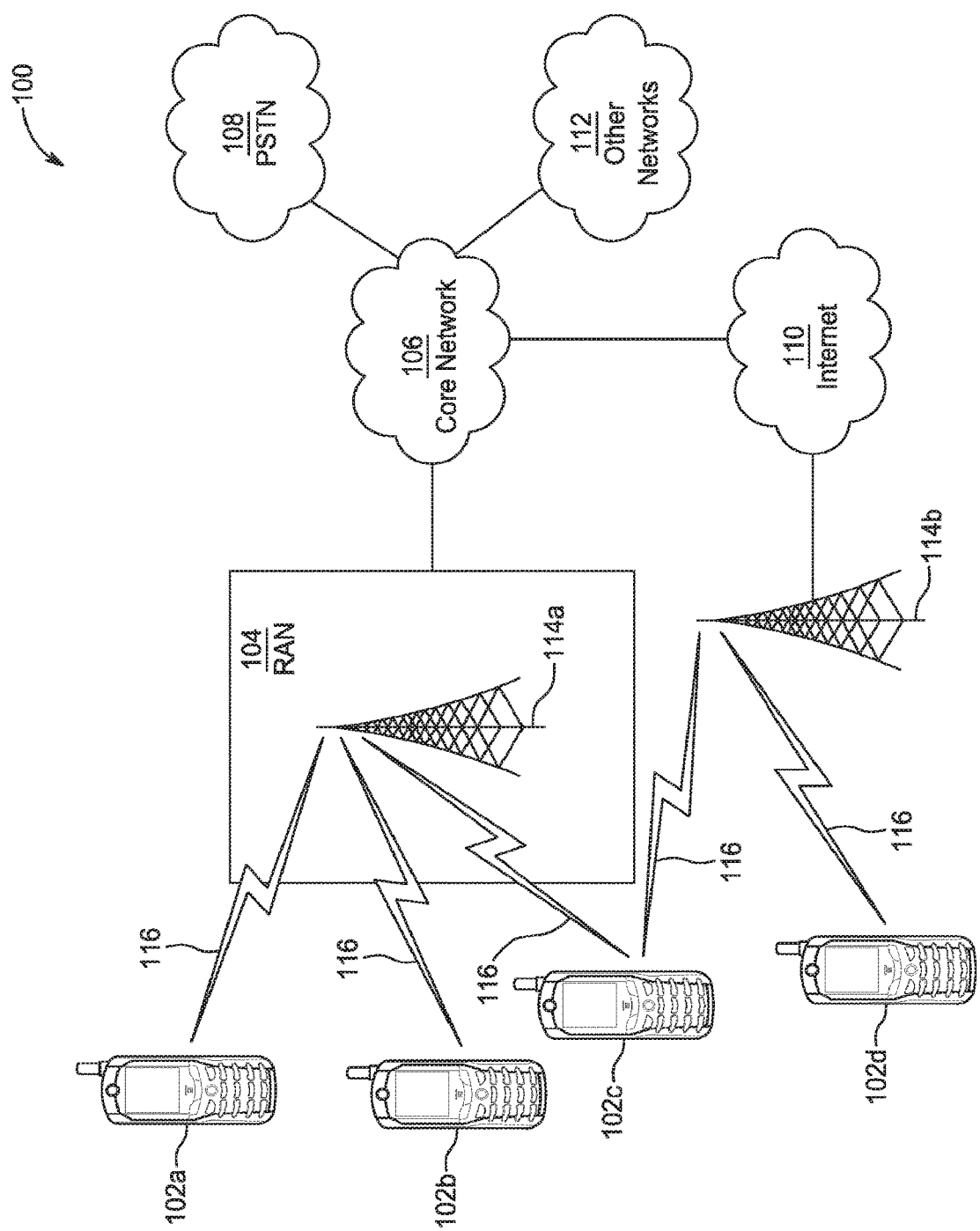
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a next generation (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as Institute for Electrical and Electronics Engineers (IEEE) 802.11 (i.e., Wireless Fidelity (WiFi), IEEE 802.16 (i.e., Worldwide Interoperability for Microwave Access (WiMAX)), CDMA2000, CDMA2000 1×, CDMA2000 Evolution Data Only/Evolution Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
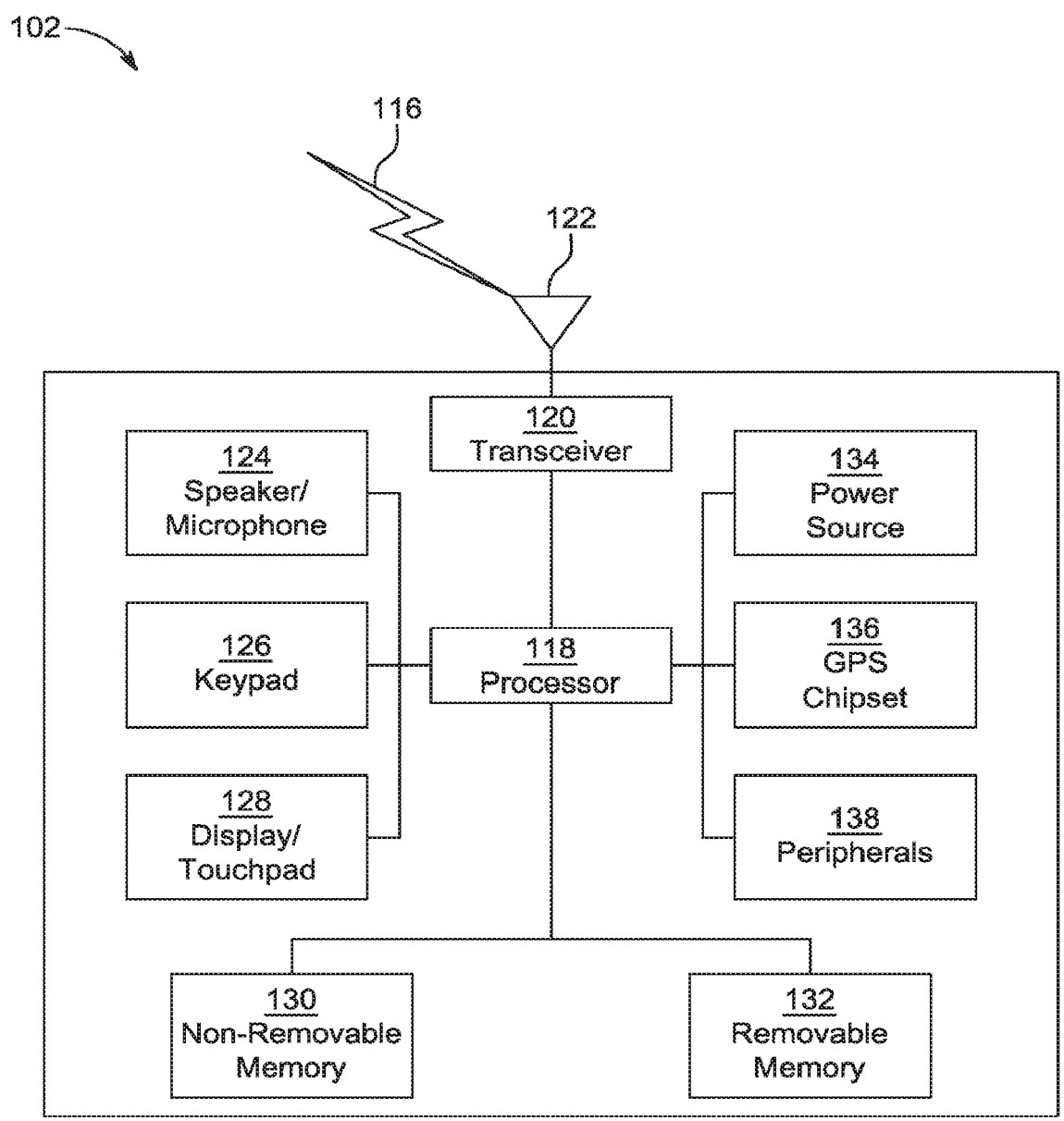
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
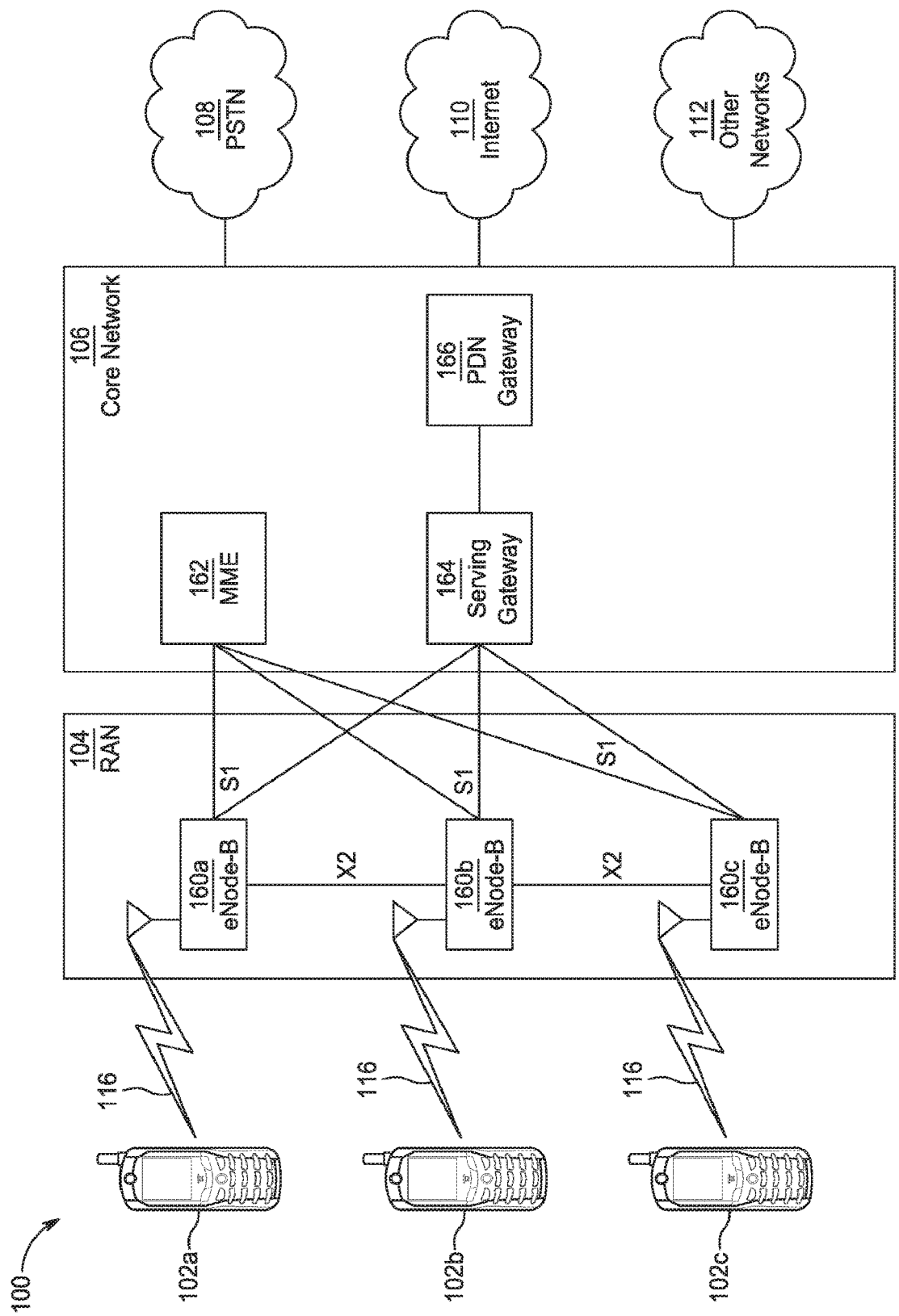
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
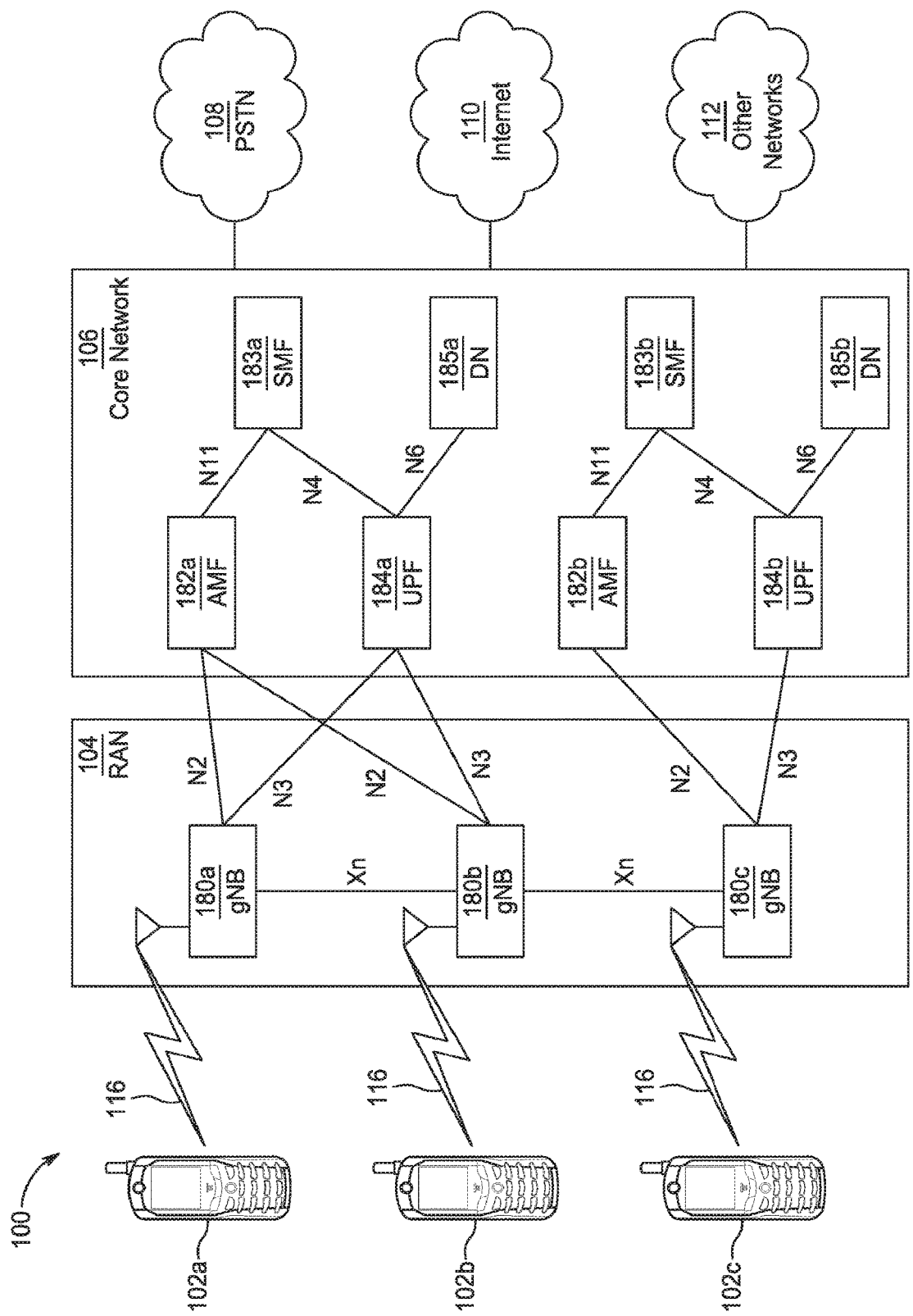
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182a/182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The term network may refer to one or more gNBs which in turn may be associated with one or more Transmission/Reception Points (TRPs) or any other node in a radio access network. The various embodiments discussed herein are described, in some instances, with respect to specific radio technologies, such as next generation air interfaces, LTE Advanced Pro, New Radio (NR) and/or Fifth Generation (5G) technology. Such references are illustrative, and that the various embodiments discussed herein are applicable to any suitable radio technologies.

The field of mobile communications is continuously evolving and is at the doorstep of its fifth incarnation, 5G. As with previous generations, new use cases have contributed to establishing the requirements for 5G. Example approaches described herein for the design of 5G systems that may correspond to NR access technology meeting 5G requirements are also not limited to 5G systems, and may be applicable to any other communication system.

The 5G air interface may enable certain use cases, such as improved broadband performance (IBB), industrial control and communications (ICC), vehicular applications (V2X), and massive machine-type communications (mMTC). Such use cases may give rise to requirements for the 5G air interface to provide support for ultra-low transmission latency (LLC), ultra-reliable transmission (URC), and/or MTC operation (including narrowband operation).

LLC requirements may include, for example, an air interface latency as low as 1 ms RTT requiring support for TTIs between 100 µs and 250 µs. Other example LLC requirements may include a specified time from initial system access until the completion of the transmission of the first user plane data unit. This may be referred to as ultra-low access latency. For example, IC and V2X use cases may require access latency of less than 10 ms. URC requirements may include transmission reliability that is much better than what is possible with legacy LTE systems. Example target URC requirements may include 99.999% transmission success and service availability. For example, IC and V2X use cases may require a packet loss ratio (PLR) of less than $10e^{-6}$. Other example URC requirements may include support for mobility for speeds in the range of 0-500 km/h. MTC operation requirements may include, for example, air interface support for narrowband operation (e.g., using less than 200 KHz), extended battery life (e.g., up to 15 years of autonomy) and/or minimal communication overhead for small and infrequent data transmissions (e.g., data rates in the range of 1-100 kbps with access latency in the range of seconds to hours).

Orthogonal frequency division multiplexing (OFDM) may be used as the basic signal format for data transmissions in both LTE and IEEE 802.11. OFDM divides a portion of the electromagnetic spectrum into multiple parallel orthogonal sub-bands. Each subcarrier is shaped using a rectangular window in the time domain leading to sinc-shaped subcarriers in the frequency domain. Orthogonal frequency division multiple access (OFDMA) includes frequency synchronization and management of uplink timing alignment within the duration of a cyclic prefix to maintain orthogonality between signals and to manage inter-carrier interference. Such synchronization may not be suitable for a system in which a WTRU is connected to multiple access points simultaneously. Additional power reduction may be applied to uplink transmissions to comply with requirements for spectral emission into adjacent bands.

OFDM is a possible candidate for 5G systems, including for the downlink transmission scheme. The performance of conventional OFDM (CP-OFDM) may be improved through more stringent radio frequency (RF) requirements, for example when operating using contiguous spectrum that does not require aggregation (of discontiguous spectrum). A CP-OFDM transmission scheme for 5G may yield a downlink physical layer similar to that of legacy LTE systems (e.g., with modifications to pilot signal density and location). Accordingly, 5G Flexible Radio Access Technology (5gFlex) may consider other waveform candidates as a basic signal format in 5G systems.

The 5gFlex radio access design may be characterized by a very high degree of spectrum flexibility, which may enable deployment in different frequency bands with different characteristics, including different duplex arrangements, and/or different and/or variable sizes of the available spectrum including contiguous and non-contiguous spectrum allocations in the same or different bands. The 5GFlex radio access design may support variable timing aspects including support for multiple TTI lengths and support for asynchronous transmissions.

Support for both time-division duplexing (TDD) and frequency division duplexing (FDD) schemes may be supported in 5G systems. For FDD operation, supplemental downlink operation may be supported using spectrum aggregation. FDD operation may support both full-duplex FDD and half-duplex FDD operation. For TDD operation, the DL/UL allocation may be dynamic i.e., it may not be based on a fixed DL/UL frame configuration; rather, the length of a DL or a UL transmission interval may be set per transmission opportunity.

Beamforming may be implemented, for example, to compensate for increased path loss at higher frequencies. Higher frequencies may include, for example, those equal to or greater than 6 GHz. For example, a larger number of antenna elements may be used to achieve a higher beamforming gain. Analog and/or hybrid beamforming may be used to reduce implementation cost (e.g., by reducing the number of RF chains). In an example, analog/hybrid beams may be multiplexed in time. Beamforming may be applied for the synchronization (Sync), physical broadcast channel (PBCH), and/or control channels to provide cell wide coverage. The term "beam sweep" may refer to the transmission/reception of beamformed channels multiplexed in time and/or frequency and/or space. The term "beam" is not limited to, but may refer to a radiation pattern of a wireless signal or any set of parameters that define a radiation pattern of a wireless signal.

The term reference signal (RS) may refer to any signal, preamble or system signature that may be received and/or transmitted by the WTRU for one or more of the purposes described herein. Reference signals may be defined for beam management in the downlink (DL) and/or uplink (UL). For example, channel state information reference signals (CSI-RS), demodulation reference signals (DMRS), synchronization signals and/or other signals, may be implemented for DL beam management. In another example, UL beam management may be implemented using sounding reference signals (SRS), DMRS, random access channel (RACH) signals, and/or other signals.

A WTRU may be configured with one or more Transmission Configuration Indication (TCI) states. The WTRU may use a TCI state determine antenna port quasi co-location (QCL) information associated with physical downlink shared channel (PDSCH) reception and/or physical downlink control channel (PDCCH) reception. The WTRU may be configured with up to M TCI states (e.g., the maximum number of TCI states may be M=64). For example, the value of M may depend on WTRU capability. A TCI state may include one (or more) set(s) of RSs. An RS may be associated with a QCL relationship with a DMRS port of a PDSCH and/or PDCCH. A QCL relationship may be of a specific type. For example, a QCL relationship type may correspond to channel characteristics (e.g., Doppler shift, a Doppler spread, a delay spread, etc.) and/or a spatial RX relation. The WTRU may be configured to decode a PDSCH based on the TCI state information in the received downlink control information (DCI).

Next generation air interfaces, including further evolutions of LTE Advanced Pro and NR, may support a wide range of use cases with varying service requirements, for diverse WTRU capabilities, under various mobility scenarios, using an architecture that is flexible enough to adapt to diverse deployment scenarios. Such service requirements may include, for example, low overhead low data rate power efficient services such as mMTC, URLLC services, and/or high data rate mobile broadband services, such as eMBB. Such diverse WTRU capabilities may include, for example, low power low bandwidth WTRUs, WTRUs capable of very wide bandwidth (e.g., ≥80 MHz), and/or WTRUs with support for high frequencies (e.g., ≥6 GHz). Such WTRU capabilities may be supported under different mobility scenarios, from stationary/fixed to high speed trains, using an architecture that is flexible enough to adapt to diverse deployment scenarios, such as standalone, non-standalone with assistance from a different air interface, centralized, virtualized, and/or distributed over ideal/non-ideal backhaul.

In NR, a lower layer link supervision/recovery mechanism may be specified, in addition to higher layer link supervision and recovery, to detect and recover from abrupt/frequent link failures (e.g., due to beam blockages, WTRU rotation, etc.). It may be desirable for the lower layer beam recovery procedure to restore the link faster than a higher layer procedure (e.g., a reestablishment) so that the overall interruption time is minimized. However, lower layer link recovery (e.g., beam recovery) mechanisms may incur associated resource overhead and/or latency. Dedicating a resource per-WTRU for the purpose of beam recovery may be prohibitive in terms of cost and/or complexity at higher WTRU densities and/or higher numbers of gNB and/or WTRU beams. Thus, mechanisms for reducing overhead and/or latency associated with beam recovery procedures may be desirable.

5G systems may also encounter issues related to operational configuration for a new beam after beam recovery or a beam change procedure. A successful beam recovery procedure may result in a change of UL beam, or DL beam, or both. Beam management may be confined to lower layers. However, a change in beam may affect parameters associated with a higher layer procedure. Further, a beam change may affect parameters that are associated with a particular layer (e.g., layer 1 (L1)) procedure, however the beam change may be configured by higher layer signaling. If such configurations (e.g., beam configurations provided by upper layer signaling when a change of beam(s) occurs) are forced to be beam independent, then the network may not be able to multiplex the WTRUs efficiently and/or restrictions in scheduling flexibility may result. Thus, solutions for operational configuration for a new beam in beam management procedures that result in DL beam change and/or UL beam change due to beam switch procedure or beam recovery procedure may be desirable.

5G systems may also incur unavailability and/or interruption of a transmission/reception opportunity due to a beam management procedure. For example, a WTRU may attempt to transmit and/or receive on candidate beams during a beam recovery procedure. In some scenarios however, ongoing procedures may be interrupted when a beam recovery procedure is triggered. For example, an ongoing beam recovery procedure may result in unavailability of transmission and/or reception opportunity for other procedures across various protocol layers. Accordingly, it may be desirable to address unavailability and/or interruption of a transmission/reception opportunity for beam management procedures that result in a DL beam change and/or a UL beam change due to a beam switching procedure or a beam recovery procedure.

In the following, solutions are described in the context of beam recovery, and may also be applicable to network controlled beam switch cases or other procedures that change and/or update the beams for a WTRU. The procedures described herein are such that any element that may be included, excluded, or performed in a different order, and/or two or more elements may be performed together in different implementations.

Figure 2:
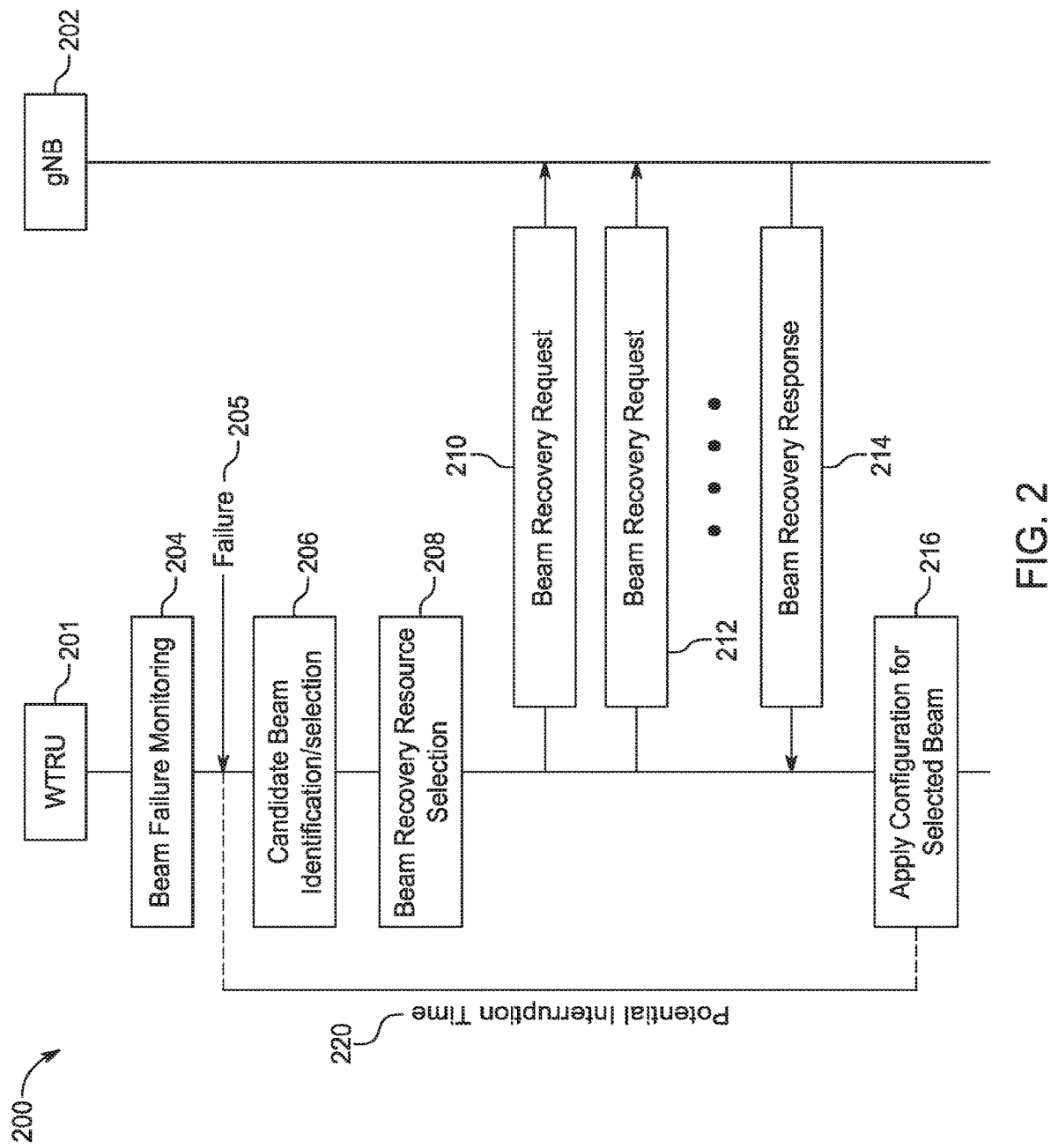
FIG. 2 is a signaling diagram of an example beam recovery procedure.

FIG. 2 is a signaling diagram of an example beam recovery procedure 200 between a WTRU 201 and a gNB 202. In this example, the WTRU 201 may be configured to operate in at least one serving cell of the gNB 202 and may apply beamforming. The WTRU 201 may perform beam failure monitoring 204 on a serving cell of gNB 202. In the event of a beam failure 205, the WTRU 201 may perform candidate beam identification and selection 206. The WTRU 201 may perform beam recovery resource selection 208 for the selected candidate beam. The WTRU 201 may send a beam recovery request message 210 to the gNB 202, and may indicate the selected candidate beam (the WTRU 201 may retransmit the beam recovery request message 212, for example if the beam recovery request message 210 fails. The gNB 202 may send a beam recovery response message 214 to the WTRU 201 to confirm usage of the selected beam. The WTRU 201 may apply configuration for the selected beam, 216 so that the WTRU 201 may communicate with the gNB 202 using the selected beam. In an example not shown in FIG. 2, the WTRU 201 may be configured to perform joint candidate beam selection 206 and resource selection 208 (i.e., selection of a candidate beam may be influenced by the resource configuration associated with the candidate beam).

A WTRU may be configured with one or more sets of WTRU-specific DL beams, and the beam indications used for the configuration may be based on, but are not limited to, any of the following information: a DL beam pair (BPL) index, DL beam index, beam-specific synchronization signal (SS) block configuration, and/or beam-specific CSI-RS configuration. Accordingly, the term "beam" as used herein may apply to, but is not limited to, the following information: BPL, beam index, SS Block index, RS associated with a physical downlink control channel (PDCCH), CSI-RS index, and/or CSI-RS resource index.

A WTRU may be configured with one or more beam sets, and each beam set may include a configuration for one or more beams. Each beam set may be configured to associate with or apply to a physical layer (PHY) function and/or procedure (e.g., L1 beam monitoring, L1 beam switch, L1 beam recovery, higher layer function/procedure(s), and/or radio resource management (RRM) mobility measurement). The configuration for beam sets may be WTRU specific, cell specific, and/or a function of the serving beam (e.g., the beam on which the WTRU monitors PDCCH). A WTRU may be configured with one or more beam sets. The configured beam sets may include, but is not limited to include, one or more of the following sets: PDCCH monitoring set, a beam-link monitoring set, L1 beam management set, and/or RRM measurement beam set.

If the WTRU is configured with a PDCCH monitoring set, the WTRU may monitor the PDCCH and decode DCI transmissions based on the received beam-specific PDCCH monitoring configuration in each beam of the PDCCH monitoring set. The beam-specific PDCCH monitoring configuration may include one or more of the following: a common search space (CSS) and user-specific (WTRU-specific/UE-specific) search space (USS) designation (e.g., an indication of which search space to monitor for each beam of the PDCCH monitoring set); a PDCCH resource allocation (e.g., parameters to determine a control-resource set (CORESET), location and number of control symbols in the slot, aggregation level, number of PDCCH candidate per aggregation level, and/or DCI format for each search space within the beam.); a PDCCH monitoring occasion (e.g., parameters to determine when and how often a WTRU may decode a PDCCH, such as a per-slot/per-mini-slot/per-symbol periodicity of the PDCCH monitoring); and/or a reference signal configuration (e.g., the WTRU may be configured with a periodic beam-specific CSI-RS for each beam of the PDCCH monitoring set, and/or a DMRS associated with the PDCCH for each beam in the set, such that the RS configuration may include frequency and time resource allocation, reference sequence type and index, and/or orthogonal cover code (OCC) parameter).

If the WTRU is configured with a beam link monitoring set, the WTRU may measure and process one or more configured beam quality metrics based on a beam-specific CSI-RS of each beam of the beam link monitoring set. The beam-specific beam link monitoring configuration may include one or more of the following: a beam link quality metric (e.g., to determine the link quality in terms of PDCCH block error rate (BLER), such as the signal-to-noise ratio (SNR)-based L1 received signal code power (L1-RSCP) and/or an energy indicator such as L1-received signal strength indication (RSSI)); a monitoring and processing configuration (e.g., parameters a WTRU may use to measure the beam link and process the result, such as monitoring duration and periodicity, averaging period, and/or filtering type and coefficients); an RS configuration (e.g., the WTRU may be configured with a periodic beam-specific CSI-RS for each beam of the beam link monitoring set, such that the RS configuration may include frequency and time resource allocation, reference sequence type and index, and/or OCC parameter); a beam failure triggering condition configuration (e.g., a triggering condition based on the configured beam link quality metric to declare beam failure, such as L1 RSCP being below a threshold); and/or a beam recovery transmission configuration (e.g., an uplink resource dedicated to each of the beams in the beam link monitoring set, where the resource may include a dedicated preamble sequence, an/or a dedicated set of frequency and time resource). In an example, the CSI-RS configuration for the beam link monitoring set may be different than for the PDCCH monitoring set.

The WTRU may be configured with an L1 beam management set for periodical and beam measurement for L1 beam management procedures (e.g., for P-1, P-2 and P-3 procedures). If the WTRU is configured with an L1 beam management set, The WTRU may measure and feedback to the gNB CSI and/or L1 beam quality metric for the beams of L1 beam management set. During a P-1 procedure a WTRU may measure different TRP TX beams (e.g., based on periodical beam-specific CRSs) to support selection of TRP TX beams and WTRU RX beams. A WTRU may use a P-2 procedure to further refine TRP TX beam selection by measuring (e.g., periodically or upon request) different TRP TX beams and thereby supporting a possible switch/change between intra-TRP and inter-TRP TX beams. Having selected TRP TX beam, a WTRU may use P-3 procedure to select and change a WTRU RX beam to be used in pair with the selected TRP TX beam.

The L1 beam management configuration may include, but is not limited to include, any of the following information: CSI type(s) configured to measure and report for the beam (e.g., channel quality index (CQI), precoding matrix indicator (PMI) and/or rank indicator (RI)); a beam link quality metric (e.g., the SNR-based L1 RSCP and/or an energy indicator such as L1-RSSI); a CSI and beam link quality metric measurement configuration (e.g., parameters the WTRU may use to configure the measurement such as measurement duration and periodicity); an UL feedback transmission resource configuration (e.g., a physical uplink control channel (PUCCH) configuration or physical uplink shared channel (PUSCH) grant for WTRU feedback); and/or an RS configuration (e.g., a periodic beam-specific CSI-RS for each beam within the L1 beam management set), such that the RS configuration may include frequency and time resource allocation, reference sequence type and index, and/or OCC parameter. In an example, the CSI-RS configuration for the beam link monitoring set may be different than for the PDCCH monitoring set. The L1 beam management set may overlap or include the PDCCH monitoring beam set and/or beam link monitoring set.

If the WTRU is configured with a RRM measurement beam set, in a multi-beam scenario, the WTRU may be configured to determine cell quality from the average of N best beams above a predefined threshold. For example, the RRM measurement beam set may include the N best beams used to derive the cell quality. In another example, the RRM measurement set may include any beam that has a measured quality above a predefined threshold associated with the serving cell and candidate cell. The WTRU may be configured to report the measurement results associated with the RRM measurement beam set. The WTRU may be configured with one or more additional configurable filters per-beam of the beam level measurements output from the L1 filter (e.g., for the purpose of reporting beam measurement results in radio resource control (RRC) measurement reports). The WTRU may consider the beams within the RRM measurement beam set associated with the serving cell (e.g., for the purpose of beam recovery). The WTRU may be configured to detect, measure and/or report the RRM measurement beam set based on synchronization signal (SS) Block configuration and/or CSI-RS configuration.

In an example, a WTRU may be configured with all the beam sets described above (PDCCH monitoring set, a beam-link monitoring set, L1 beam management set, and RRM measurement beam set) and each set may have different beams or identical beams with different beam-specific configuration parameters (e.g., different CSI-RS density and/or different PDCCH monitoring configuration). Thus, a WTRU may be configured with multiple beam sets with possibly overlapping beams. In some cases, a WTRU may be configured with one beam set for multiple purposes. For example, a WTRU may be configured with one beam monitoring set for both the PDCCH monitoring and beam link monitoring, (e.g., the beams for PDCCH monitoring and beam link monitoring are identical). A WTRU may be configured to perform beam recovery on a candidate beam in cases where the WTRU can ensure that the candidate beam belongs to the same serving cell and the candidate beam satisfies a preconfigured criterion. The candidate beam may belong to any of the beam sets configured to the WTRU.

A WTRU may be configured with an uplink beam set for periodic and/or requested uplink control information (UCI) or UL signal transmissions. In an example, the uplink beam set may be configured to carry a supplementary PUCCH channel, AND may be referred to as an UL PUCCH beam set. The beams of the UL PUCCH beam set may be associated with one or multiple DL beams in one or more of the beam sets discussed above. The association may be determined based on beam correspondence and/or uplink SRS transmission for L1 UL beam management. The association may be one-to-one between a PUCCH beam and a DL beam or one-to-many between a PUCCH beam and multiple DL beams. For example, a WTRU may maintain a one-to-one association between each PUCCH beam and each PDCCH monitoring beam. Accordingly, the serving PDCCH beam and each PDCCH candidate beam may each have an associated UL beam in the PUCCH beam set and the UCI transmission associated with each PDCCH monitoring beam may be transmitted in a corresponding UL beam. In another example, a WTRU may maintain a one-to-many association between a PUCCH beam and multiple PDCCH monitoring beams. In this case, the PUCCH beam set may have one UL PUCCH beam determined based on the serving PDCCH beam and all UCI transmissions associated with both the serving and candidate beams may be multiplexed onto the PUCCH beam. In another example, the PUCCH beams may be associated in a similar fashion with beams in the beam monitoring set, L1 beam management set or RRM measurement beam set.

A WTRU may be configured with a serving beam and one or more candidate beams in a PDCCH monitoring and/or beam monitoring set. The serving and candidate beams may be spatially orthogonal (e.g., paired with different WTRU RX beam group or WTRU antenna array panel). In other words, the serving beam and candidate beam in the beam set may not have a QCL (i.e., may be spatially non-QCLed). This may provide WTRU connection robustness. For example, if the serving beam is blocked, the candidate beam may not be blocked and the WTRU may continue the connection using the candidate beam.

A WTRU may perform one or more PDCCH monitoring functions on the beams of the PDCCH monitoring set and/or beam link monitoring beam. With respect to the PDCCH serving beam, the WTRU may be configured to perform primary PDCCH monitoring in CSS and/or USS according to the serving beam PDCCH resource and monitoring configuration. The WTRU may be configured to monitor for regular DCI. Additionally, the WTRU may be configured to monitor a DCI according to a candidate beam PDCCH resource and monitoring configuration. The DCI may include information about, for example, a fallback indicator, a beam switch indicator, and/or a scheduling indicator. With respect to the PDCCH candidate beam, the WTRU may be configured to perform reduced/secondary PDCCH monitoring in CSS and/or USS according to reduced or secondary beam PDCCH resource and monitoring configuration. For example, the WTRU may be configured to perform less frequent monitoring periodicity and/or occasions, different CORESET, and/or fewer PDCCH candidates.

A WTRU may perform reduced PDCCH blind decoding processing on the PDCCH candidate beam (e.g., due to reduced PDCCH monitoring occasions and lesser blind decoding effort at each occasion using smaller DCI, fewer PDCCH candidates, and/or fewer aggregation levels). A WTRU performing reduced PDCCH blink decoding processing on the PDCCH candidate beam may reserve WTRU battery under good channel conditions where a primary PDCCH monitoring on the PDCCH candidate beam is not necessary.

Beam failure detection criteria may be defined. The WTRU may be configured to monitor the quality of the serving beam by directly measuring characteristics of serving PDCCH transmission (e.g., using an RS associated with the PDCCH such as a DMRS, CRC check on the received DCI, and/or CSI-RS) or indirectly by measuring an RS which is QCLed with the serving PDCCH (e.g., SS Block (SSB), CSI-RS). The WTRU may also be configured to monitor the quality of one or more non-serving beams to identify a potential candidate beam in case of serving beam failure.

The WTRU may be configured to detect a beam failure if one or more preconfigured conditions are satisfied. For example, the WTRU may detect a beam failure if a preconfigured condition is satisfied for a predefined time period. The beam failure detection criteria may include a measurement result of the serving PDCCH below a threshold (e.g., if the reference signal received power (RSRP) or reference signal received quality (RSRQ) of a RS associated with the serving PDCCH is below a predefined threshold). The beam failure detection criteria may include a measurement result of a candidate beam above a threshold (e.g., if the RSRP/RSRQ of the RS associated with the candidate beam is better than the serving PDCCH or better than an absolute threshold). The beam failure detection criteria may include a rate of change of measurement result (e.g., the WTRU may trigger beam failure when the rate of decrease of RSRP/RSRQ associated with the serving beam is above a predefined threshold), which may be combined with the latest measurement result (e.g., below a threshold) to quickly detect sudden beam blockages.

The beam failure detection criteria may include a parameter indicative of upcoming/early radio link failure (RLF) (e.g., the WTRU may be configured with a beam failure criteria such that beam failure is detected and recovered before RLF is triggered). The parameter indicative of upcoming/early RLF may be based on a transmission block error rate (BLER) above a preconfigured threshold (e.g., if the BLER associated with the hypothetical serving PDCCH transmission based on predefined parameters are above a preconfigured threshold). In an example, the WTRU may be configured with the BLER thresholds using an offset to BLER thresholds for RLF, such that the BLER thresholds for beam failure are smaller or equal to the BLER thresholds defined for RLF. The parameter indicative of upcoming/early RLF may be based on indications associated with radio link monitoring (RLM) (e.g., if the number of consecutive out-of-sync (OOS) indications for RLM is above a predefined threshold). In an example, the WTRU may be configured with the number of consecutive OOS indications to trigger beam failure to be less than the number of OOS indications required to start an RLM timer (e.g., timer T310). The WTRU may be configured to use any combination of the above described criteria/conditions to detect beam failure.

A WTRU may be configured to handle failure of non-serving beams. A WTRU may be configured with a monitoring function associated with one or more non-serving beams. For example, the WTRU may apply the monitoring function to non-serving beams if the serving beam quality is below a threshold. In another example, the WTRU may apply the monitoring function to the non-serving beams if explicitly indicated/configured by the network. The WTRU may be configured to notify the network if one or more non-serving beams fail to meet a predefined criterion. The WTRU may be configured to notify the network if the WTRU determines that the serving beam is considered to be still operational. In an example, the WTRU may perform beam failure detection on the non-serving beams if the measurement results of such beams become significantly worse than the serving beam or below a predefined absolute threshold. A WTRU may transmit a candidate beam failure indication using a PUCCH associated with the serving beam. The candidate beam failure indication may include an identity of the failed candidate beam. The WTRU may multiplex the candidate beam failure indication with an uplink data transmission (e.g., on PUSCH, by "piggybacking" the candidate beam failure indication on the PUSCH transmission). The candidate beam failure indication with an uplink data (e.g., PUSCH) transmission may be scheduled or unscheduled. For example, the WTRU may have a valid uplink grant (e.g., configured or dynamically scheduled by a DCI), or the transmission may be not scheduled (e.g., transmitted using a grant-free resource). The transmission may be of a specific type (e.g., a Type 2 UL transmission without UL grant) if it is not dynamically scheduled. The WTRU may be configured with a PDCCH monitoring set and/or a beam link monitoring set with a list of candidate beams. Such configuration may be received in a transmission (e.g., by layer (L2)/RRC signaling or by L2 medium access control (MAC) control element (CE)) from a node in the network (e.g., gNB, TRP).

A WTRU may perform beam recovery candidate beam identification and/or selection. A WTRU may monitor beam link quality of each beam of the beam link monitoring set and/or PDCCH monitoring set based on one or more configured beam link quality metrics and/or beam link failure criteria. If a serving beam failure is detected, the WTRU may be configured to initiate beam recovery if at least one candidate beam associated with the same serving cell meets or exceeds a predefined quality. In one example, the WTRU may determine that a non-serving beam is a candidate if the non-serving beam did not experience a beam failure when the beam failure occurred in the serving beam. The WTRU may be configured to weight the most recent measurement samples more than historical measurement results for a given beam. This may be useful for the purpose of selecting a suitable beam. For example, this can be achieved by appropriate configuration of filtering coefficients/parameters. In an example, the WTRU may be configured to perform a quick and/or one shot measurement of candidate beams upon detecting a beam failure in the serving beams.

The WTRU may be configured to select a candidate beam for beam recovery based on any one or more of the following criteria: beam quality, availability of measurement result, spatial isolation, availability of dedicated recovery resource, earliest occurring recovery resource, type of recovery resource, preconfigured/preferred candidate beam, and/or availability of configuration. If the WTRU is configured with the beam quality criterion, the WTRU may be configured to perform beam recovery on a candidate beam which has the highest quality (e.g., RSRP) among all the detected/measured beams. In an example, the beam quality may be expressed in terms of a reliability metric (e.g., expected BLER) or a throughput metric (e.g., hypothetical CQI). If the WTRU is configured with the availability of measurement result criterion, the WTRU may be configured to perform beam recovery on a candidate beam for which it has more recent measurement results, and such results indicate that the beam is above a predefined threshold.

If the WTRU is configured with the spatial isolation criterion, the WTRU may be configured to select a candidate beam for beam recovery such that the candidate beam is spatially isolated from the serving cell, for example to avoid the risk of selecting a candidate beam which is also blocked due to proximity to the serving beam. In an example, the WTRU may determine spatial isolation between two beams (e.g., between a failed beam and a candidate beam), based on the angle of arrival measurements at the WTRU. In another example, the WTRU may be configured (e.g. by the network) with information regarding the spatial relation between the beams. For example, the WTRU may be configured with a logical grouping of beams, such that beams belonging to different groups may be assumed spatially isolated from each other. Each candidate beam or beam group may be associated with a spatial isolation ranking and/or factor. The ranking and/or factor may be in reference to a serving beam. In an example, the WTRU may consider CSI-RS beams associated with different SS blocks to be spatially isolated from each other.

If the WTRU is configured with the availability of dedicated recovery resource criterion, the WTRU may be configured to select the DL candidate beam above a predefined threshold (e.g., which enables the WTRU to determine whether or not the beam candidate is a valid beam for attempting a recovery) that is explicitly or implicitly associated with dedicated beam recovery resources. If the WTRU is configured with the earliest occurring recovery resource criterion, the WTRU may be configured to select the DL candidate beam above a predefined threshold, for which recovery resources occur earliest in time. This may have the advantage of allowing the WTRU to recover the link faster. If the WTRU is configured with the type of recovery resource criterion, the WTRU may be configured to select the DL candidate beam above a predefined threshold, for which the recovery resources allow for faster recovery (e.g., use a PUCCH type of channel over a physical random access channel (PRACH)-like channel). In an example, the WTRU may use the DL candidate beam for which an UL beam with valid timing advance exists.

If the WTRU is configured with the preconfigured/preferred candidate beam criterion, the WTRU may be configured to select the DL candidate beam above a predefined threshold, which may have been explicitly configured to be the preferred candidate beam for the serving beam. For example, this may be based on historical data of successful beam recovery on the candidate beam or based on explicit network configuration based on self-organizing networks (SON) metrics (e.g., the network may configure preferred candidate beam(s) based on the current serving beam). In another example, a specific offset may be broadcasted for each candidate beam to enforce access control or express some degree of load on the candidate beam. The WTRU may be configured to select the candidate beam that is less loaded and/or congested. If the WTRU is configured with the availability of configuration criterion, the WTRU may be configured to select the DL candidate beam above a predefined threshold, for which a valid configuration exists. This allows the WTRU to continue data transfer in the new beam without having to wait for reconfiguration signaling. A WTRU may prioritize a candidate beam in certain beam sets over others.

If a serving beam has failed and one or more beams better than the serving beam are available in the PDCCH monitoring set, beam link monitoring set, L1 beam management set and/or RRM measurement set, the WTRU may be configured to prioritize beams based on the beam set to which the candidate beam belongs.

For example, the WTRU may identify and select a beam recovery candidate according to any of the following orders. In an example, the WTRU may select an operational PDCCH candidate beam in the PDCCH monitoring set, which has the best beam quality, the most recent tracking area (RA) update, and/or with a PDCCH monitoring configuration closest to that of the serving PDCCH. In an example, the WTRU may select a beam in the beam monitoring set that is not configured for PDCCH monitoring (if it exists) and/or with the best beam quality and better than all of the PDCCH candidate beam with a predefined threshold. In another example, the WTRU may select a beam in the L1 beam management set that is not configured for PDCCH monitoring or beam link monitoring (if it exists), and/or with the best beam quality and better than all of the PDCCH candidate beams and monitored beams with a predefined threshold, and/or the most recent L1 beam measurement and feedback. In another example, the WTRU may select a beam in the RRM management set that is not configured for PDCCH monitoring, beam link monitoring or L1 beam managements (if it exists), and/or with the best beam quality and better than all of beams in the PDCCH monitoring, beam link monitoring and L1 beam management monitoring sets with a predefined threshold and/or, the most recent RRM measurement and report.

The WTRU may perform procedures for candidate beam selection for concurrent beam recovery. In an example, the WTRU may transmit concurrent beam recovery request(s) using a beam sweeping operation. The WTRU may be configured to perform a beam sweep over multiple candidate beams. The WTRU may select multiple beam recovery candidate beams based on preconfigured rules, which may include, but is not limited to include, any of the following rules: the selected candidate beams are received in one WTRU receive beam; the selected candidate beams have a beam quality metric higher than a predefined threshold; and/or the selected candidate beams have a TA update received no later than a predefined timing relative to the PDCCH serving beam failure declaration.

The WTRU may perform procedures for handling beam failure scenarios. Such scenarios may include cases where the WTRU detects a failure in the serving beam and a suitable candidate does not exist. In such cases, the WTRU may be configured to perform any of the following actions. In an example action, the WTRU may trigger an early RLF (e.g., the WTRU may start a timer, such as T312, and upon expiry of the timer, the WTRU may declare RLF, and consider T310 expired. In another example action, the WTRU may assume it is no longer synchronized with the serving cell and start a search for an SS block associated with the serving cell. In another example action, the WTRU may suspend UL transmissions associated with the serving cell and ignore pending grants and/or ACK/NACK transmissions. In another example action, the WTRU may trigger a beam search in the serving cell (e.g., the WTRU may initiate a cell search and identify a beam recovery candidate beam based on a detected SS block).

Resources may be selected for beam recovery. A recovery resource may include, but is not limited to include, a time and/or frequency and/or code resource. A WTRU may be configured to perform recovery using UL resources that are dedicated to the WTRU or reserved for a group of WTRUs or common for all the WTRUs in a cell. The WTRU may be configured with UL recovery resources that are explicitly and/or implicitly associated with a DL candidate beam or beam group, or specific to all the beams in the cell. In an example, the WTRU may be configured with a plurality of beam recovery resources for a given candidate beam or beam group. The WTRU may be configured to select resources on the candidate beam or beam group based on the UL time alignment timer (TAT) status for the specific beam or beam group. For example, the WTRU may transmit a UL synchronized signal for beam recovery if the UL time alignment is valid or known a priori in the candidate beam or beam group. The WTRU may be configured with periodic beam recovery resources with a predefined time interval. The periodicity may be configured as a function of parameters, such as quality of service (QoS) and/or WTRU mobility state. For example, a WTRU with an ultra-low latency service may be configured with frequently occurring beam recovery resource(s).

In an example, the WTRU may be configured with a recovery resource as a function of beam set to which the candidate beam belongs. For example, the WTRU may be configured with PUCCH-like channel for candidate beams in the PDCCH monitoring set or L1 beam management set, and/or the WTRU may be configured with PRACH-like channel for candidate beams in the RRC management set.

Dedicated beam recovery resources may be beneficial from a latency point of view, however it may be resource intensive to allocate dedicated beam recovery resources for all connected mode WTRUs in the cell. Accordingly, the WTRU may be configured with predefined rules to select the resources applicable for beam recovery to tradeoff between beam recovery latency and resource overhead.

A beam recovery resource may be selected dynamically from within multiple pools of beam recovery resources. Each pool may contain one or more beam recovery resources. The WTRU may be configured with the first pool of beam recovery resources via dedicated signaling (e.g., RRC signaling) and a second pool of beam recovery resources via broadcast signaling (e.g., via system information such as system information blocks (SIBs)). In another example, the WTRU may be configured with both first and second pools of beam recovery resources via broadcast signaling or dedicated signaling.

The WTRU may treat the second pool of beam recovery resources as valid/available as soon as the configuration is successfully received. The WTRU may store the configuration for the first pool of beam recovery resources if the configuration is successfully received. The WTRU may consider a subset of (e.g., one resource out of) the first pool of beam recovery resources to be valid/available only if explicitly indicated by the network, for example via L1 signaling (e.g., a DCI) or a MAC CE. The L1 signaling or MAC CE may indicate a logical index to the beam recovery resource. In another example, a WTRU may be configured with a baseline configuration via higher layer signaling and the dynamic signaling may indicate an offset to the baseline configuration that is indicates a dedicated resource to the WTRU. For example, the baseline configuration may provide the frequency/resource block (RB) and/or sequence for beam recovery request transmission, and the dynamic L1 signaling or MAC CE may indicate the time when the beam recovery resource becomes available. The WTRU may be configured with the validity time for the subset of resources explicitly indicated by the network. Upon the expiry of the validity time, the WTRU may treat the subset of resources as not valid/available and prohibited from usage until explicitly indicated.

In an example scenario, the explicitly activated subset of first pool of beam recovery resources may be contention-free resources and/or dedicated to the WTRU and the second pool of beam recovery resources may be contention-based resources and/or reserved for a group of WTRUs for purposes of beam recovery. In an example, the second pool of recovery resources may be specific to a candidate beam or specific to the cell. In another example, the second pool of resources may be shared between beam recovery and other purposes, such as initial access and/or system information (SI) requests.

In an example, the first pool of beam recovery resources may be associated with the transmission of UL channel/signal(s) when the WTRU is UL synchronized (e.g., PUCCH-like resources) and the second pool of beam recovery resources may be associated with the transmission of UL channel/signal(s) when the WTRU is not UL synchronized (e.g., PRACH-like resources). In another example, the first pool of beam recovery resources may be associated with the L1 beam management set and second pool of beam recovery resources may be associated with RRC measurement beam set.

In the event of a beam failure, the WTRU may be configured to prioritize the beam recovery resources in the following order. If the configuration for a first pool of resources is successfully received and at least one resource is selected by L1/MAC signaling and a validity time has not expired, then the WTRU may select the explicitly indicated beam recovery resource. Otherwise, if the configuration for second pool of recovery resources are successfully received, the WTRU may randomly select (e.g., with uniform distribution) a beam recovery resource from the second pool. Otherwise, the WTRU may perform beam recovery using the contention based PRACH resources configured for the cell.

Performing dynamic selection of multiple pools of beam recovery resources, as described above, may have the advantage of reducing overhead associated with dedicated beam recovery resources. For example, instead of reserving the dedicated beam recovery resource as soon as the WTRU enters the connected state, the network may configure the beam recovery resource only when it is needed (e.g., when a beam recovery is expected). For example, the network may detect degradation in serving beam quality based on the WTRU reporting one or more of the following: L1/L3 RSRP associated with the serving/candidate beams, an UL acknowledgement (ACK) or negative acknowledgement (NACK), and/or an SRS transmission. The latency associated with the dynamic configuration may be eliminated or offset via faster L1/MAC indication of a subset (e.g., one) of the RRC preconfigured resource pools (e.g., the first pool). There may be error scenarios where the L1/MAC indication is lost or does not arrive in time before the beam failure. In such cases, the WTRU may be configured to fall back to the second pool of recovery resources, which may (or may not) be WTRU specific, but may provide a degree of isolation from contention if reserved for a group of WTRUs and/or reserved for beam recovery purposes.

Figure 3:
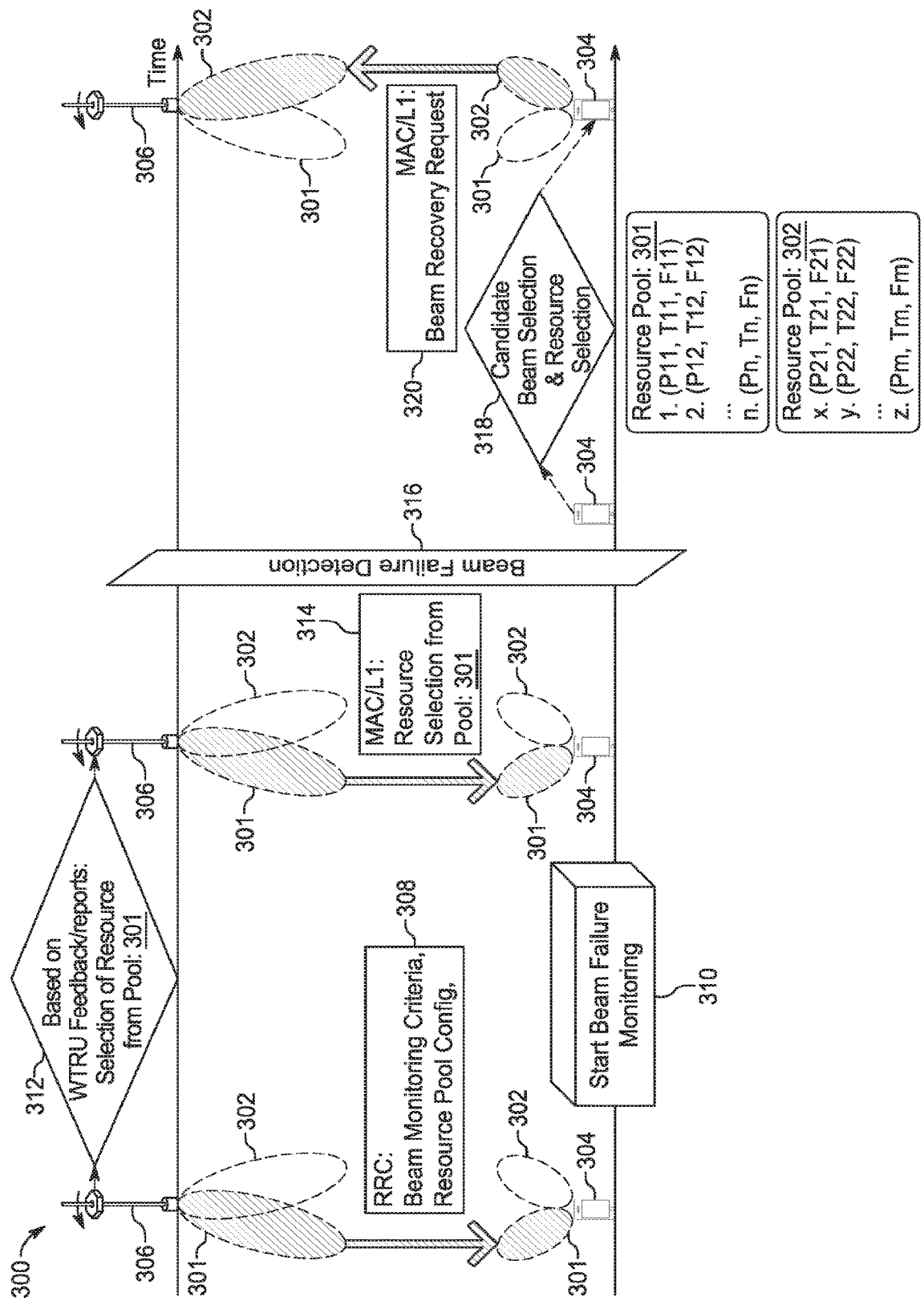
FIG. 3 is a signaling diagram of an example beam recovery resource selection procedure.

FIG. 3 is a diagram of an example beam recovery resource selection procedure 300 involving WTRU 304 and gNB 306. In an example, the WTRU 304 may be preconfigured by RRC signaling 308 (e.g., from the gNB 306) with two recovery resource pools 301 and 302. Pool 301 may include dedicated resources and pool 302 may include cell-specific beam recovery resources. In some implementations, pool 302 may be implemented using common RACH resources used for other purposes, such as initial access. The RRC signaling 308 may also include beam monitoring criteria, which the WTRU 304 may use to perform beam failure monitoring 310. Based on feedback/reports (not shown) from the WTRU 304, the gNB 306 may select resources from the pool of recovery resources 301 for the WTRU 304, and provide the resource selection from pool 301 to the WTRU 304 via MAC/L1 signaling 314 (e.g., MAC CE).

The WTRU 304 may receive MAC CE signaling 314 to configure and/or select a dedicated resource from pool 301 for a subset of candidate beams. For example, the subset of candidate beams may be determined based on WTRU 304 reporting, current serving beams of the WTRU 304, and/or based on explicit configuration. If a beam failure detection 316 occurs, the WTRU 304 may perform candidate beam selection and resource selection 318. For example, the WTRU 304 may determine the candidate beam for beam recovery based on any one or more of the following criteria: beam quality, availability of measurement result, spatial isolation, availability of dedicated recovery resource, earliest occurring recovery resource, type of recovery resource, preconfigured/preferred candidate beam, and/or availability of configuration. The WTRU 304 may perform beam recovery using dedicated resources if such resources exist for the candidate beam (e.g., if the candidate beam is 1, 2 . . . n in resource pool 301) or the WTRU 304 may fall back on contention-based or cell-specific resources associated with the candidate beam (e.g., if the candidate beam is x, y . . . z in resource pool 302) if a dedicated resource is not configured for the candidate beam and if a contention-based beam recovery procedure is allowed by the network. In this example, the WTRU 304 may select candidate beams in resource pool 302. The WTRU 304 may transmit and retransmit beam recovery requests 320, using MAC/L1 signaling, in one or more candidate beams of resource pool 302. The WTRU 304 may use the beam recovery request(s) 320 to indicate to the network that a beam failure occurred and/or implicitly provide a candidate beam (e.g., by indicating a choice of resource from a resource pool). Example characteristics of beam recovery requests, that may apply to beam recovery request 320, are described below.

A WTRU may be configured to transmit a beam recovery request in one or more candidate beam(s) upon a serving beam failure (as shown in the example of FIG. 3). The WTRU may be configured with a UL signal for which the characteristics/properties/contents may indicate one or more of the following information: the type of request (i.e. a beam recovery request); explicit/implicit identity of the WTRU; explicit/implicit identity of candidate beams; and/or the measurement results for the relevant candidate beams. Beam recovery requests may have one or more signal types. For example, the WTRU may be configured with a single-sequence beam recovery request transmission using a unique sequence configured dedicated for the beam recovery request signal. In another example, the WTRU may be configured with a set of sequences dedicated for beam recovery request signaling and the WTRU may select one sequence of the group or set based on its WTRU identity (ID) (e.g., cell radio network temporary identifier (C-RNTI)) for the beam recovery request transmission. In another example, a WTRU may be configured with a multi-sequence beam recovery request transmission using a set of sequences configured for the beam recovery request signal. The WTRU may be configured with a transmission order of the sequence in the time domain over a beam recovery request transmission time resource unit (e.g., a PRACH transmission occasion). A WTRU may be configured to apply a waveform and/or modulation specific to a beam recovery request transmission. For example, a WTRU may apply an ON/OFF modulation to the resource dedicated to the beam recovery request transmission and the network may detect the transmission based on the energy detected in the resource allocation.

Beam recovery requests may use a UL beam set. A WTRU may be configured with a WTRU-specific time and frequency resource dedicated for beam recovery request transmission. In an example, the WTRU may be configured to transmit the beam recovery request sequence on time and frequency resources configured for PUCCH and/or SRS transmissions. The network may detect a beam recovery request sequence when receiving the beam recovery request sequence on those resources (e.g., where PUCCH and/or SRS are normally received). In another example, a WTRU may be configured to transmit a signal using a waveform and/or modulation dedicated for beam recovery request signals. The signal may be transmitted using a resource configured for scheduling request (SR) transmission on a PUCCH beam within the PUCCH beam set. Such resource may or may not be associated with the serving PDCCH beam. A WTRU may transmit the beam recovery request on the PUCCH beam associated with the selected beam recovery candidate beam based on the PUCCH beam set association with the PDCCH monitoring beam set, as described above. The selected PUCCH beam may be maintained in the PUCCH beam set and may have a valid timing advance (TA) counter.

Beam recovery requests may be based on PRACH. For example, a WTRU may transmit a beam recovery request on the time and frequency resource configured for PRACH based on any one or more of the following triggering conditions: the selected beam recovery candidate beam does not have an associated PUCCH beam maintained by the WTRU; the selected beam recovery candidate beam has an associated PUCCH beam maintained by the WTRU but the timing advance counter has expired; and/or no response was received following a beam recovery request transmission based on PUCCH and/or the SR resource configured for the selected beam recovery candidate beam. The WTRU may transmit the beam recovery request in a time and frequency resource configured for PRACH. The network may detect a beam recovery request sequence when receiving a beam recovery request sequence in those resources where PRACH preambles are normally received. The WTRU may convey a WTRU ID and selected candidate beam information in the beam recovery request. The WTRU may use a WTRU-specific beam recovery request sequence and may select a PRACH time and frequency resource based on a pre-configured association between DL beam and PRACH resource set.

The WTRU may randomly select an UL beam from the PUCCH beam set for a beam recovery request transmission based on single-shot PRACH transmission. In another example, the WTRU may select an UL beam from the PUCCH beam set following a pre-configured order based on the available associated PDCCH candidate beam. For example, the WTRU may select a PUCCH beam associated with a PDCCH candidate beam with the best beam quality metric. In another example, the WTRU may select a PUCCH beam associated with a PDCCH candidate beam with the beam quality metric above a pre-configured threshold and with the most uncorrelated L1-RSCP result compared to the serving PDCCH beam on which beam link failure is detected. In the latter example, the WTRU may determine the correlation between L1-RSCP results of the serving PDCCH and candidate PDCCH beam based on historical beam link monitoring, L1 beam management measurement and/or RRM measurement beam results, whichever is available. The WTRU may use a beam-specific maximum power for the beam recovery request transmission.

Beam recovery request transmissions may be concurrent. A WTRU may select multiple beam recovery request candidate beams and the WTRU may transmit a beam recovery request concurrently in the PUCCH beams associated with each of the selected recovery request candidate beams. This may increase the robustness of the beam recovery. The WTRU may monitor the response to the beam recovery request transmission in each of the candidate beams. The network may send a beam switching command containing a DCI field indicating the new serving beam identity information in all beams of the PDCCH monitoring set so that the WTRU may be able to detect multiple identical beam switching commands to indicate the same new serving beam for the purpose of switching.

The WTRU may implement beam recovery using multiple beam recovery request transmissions, which may be referred to as multi-shot transmissions. For example, the WTRU may select a subset of UL beams, or all UL beams, of the PUCCH beam set for a beam recovery request transmission and perform multiple PRACH transmissions (multi-shot transmissions). The WTRU may perform such multi-shot transmissions using multiple preambles transmitted sequentially over a set of RACH transmission occasions. Under this approach, the WTRU may use one WTRU UL beam from the selected group of beams for each of the selected PRACH transmission occasions. The WTRU may be configured with a set of sequential PRACH transmission occasions that can be used for the beam recovery request transmission using a dedicated beam recovery request sequence. In another example, the WTRU may be configured with a dedicated set of sequence PRACH transmission occasions and in this case the WTRU may transmit either a dedicated beam recovery request sequence or a dedicated PRACH sequence. In another example, where the PUCCH beam set has one UL beam associated with the failed PDCCH serving beam, the WTRU may use the UL beams that have been recently applied for the multi-shot beam recovery request transmission.

Beam recovery using multiple transmission requests (multi-shot transmissions) may be used to increase the detection success of the beam recovery request transmission. The WTRU may start monitoring responses to the beam recovery request transmission from the gNB after the first transmission. Upon receiving a response from the gNB, the WTRU may terminate the remaining beam recovery request transmissions.

The WTRU may be configured for various retransmission behaviors. For example, the WTRU may be configured with retransmission behavior as a function of the resourced type and/or UL signal used for the initial transmission of beam recovery request. The WTRU may be configured with a maximum retransmission count specific to the type of recovery signal. For example, the WTRU may use a first maximum retransmission count for a PUCCH-like channel and a second (different) maximum retransmission count for PRACH-like channel. The WTRU may be configured to perform recovery transmissions on a PRACH-like channel if the maximum retransmission count is exceeded on a PUCCH-like channel.

The WTRU may be configured with a maximum retransmission count specific to a contention-free resource. For example, the WTRU may be configured to stop any further transmission on the contention-free resource if the maximum retransmission count is exceeded. In some implementations, the WTRU may continue beam recovery transmission on a contention based resource. In an example, irrespective of the retransmission behavior configurations, the WTRU may be configured with a total number of retransmissions across different resource types and/or UL signal types for the beam recovery procedure. The WTRU may be configured with a maximum time for the beam recovery procedure. In this case, if the beam recovery is not successful within the configured time or if the total number of retransmissions exceeds the preconfigured value, whichever is earlier, the WTRU may treat the beam recovery procedure as having failed. In another example, the WTRU may be configured to select the candidate beam for beam recovery request transmission using any one or more of the rules described herein.

The WTRU may be configured with procedures to handle a beam recovery request response. For example, if the WTRU transmits a beam recovery request, the WTRU may be configured to monitor a control channel search space and/or CORESET for a response from the network. For example, the search space and/or CORESET may be a default, pre-configured, or common search space, or a group common control channel. In an example, the search space may be a function of the candidate beam and/or the beam recovery resource used by the WTRU. The control channel search space may be a function of WTRU identity (e.g., C-RNTI).

The beam recovery response may acknowledge the beam recovery request unambiguously (or attempt unambiguity). For this purpose, the beam recovery response may include any one or more of the following information: an identity of the WTRU (e.g., used for contention resolution if contention based resources are used for beam recovery request transmission); an indication of the resource (time, frequency, sequence and/or beam) on which beam recovery request was received; a configuration to be applied for operation in the new serving beam after beam recovery, (e.g., including the beam set configuration); and/or a configuration of further measurements for beam refinement, which may include transmission resources for information including, but not limited to, RSs, and/or feedback.

The WTRU may be configured to receive a beam recovery response message in a DL control message. In an example, the WTRU may be configured to receive a beam recovery response in a message and/or format based on a UL signal and/or resources used for beam recovery request transmission. For example, the WTRU may be configured to receive a beam recovery response in a MAC CE or DCI in the case that a UL synchronized signal or a PUCCH was used for beam recovery request transmission. For example, the WTRU may be configured to receive the beam recovery response in a random access response (RAR) message if a UL unsynchronized and/or PRACH-like channel was used for beam recovery request transmission. The WTRU may be configured to acknowledge the beam recovery response to the network (gNB) if the WTRU can successfully verify that the message was in response to its own transmission. The WTRU may indicate to the network (gNB) that the WTRU can comply with the configuration to be applied on the new serving beam after the beam recovery.

A WTRU may use methods to determine parameters and configuration when serving beam(s) have changed/switched. Beam change, including beam change due to reconfiguration, recover or L1 mobility, may impact L1/L2 transmission aspects and/or L3 configuration aspects. A beam switch may involve a change in one or more configuration aspects, as described in the following.

The WTRU may determine that a change of beam has occurred. For example, a beam change may be indicated by the network using control signaling, or it may be detected based on the outcome of a beam recovery procedure. In an example, the network management of system resources may not have WTRU-specific resources common to all beams and/or beam sets. In this case, the network may control the allocation of resources for different beams for a given WTRU separately/independently for each beam (e.g., when multiplexing resources for different WTRUs). In this case, the beam configuration and/or a change of beam may benefit from a determination by the WTRU of the applicable beam configuration at any given time.

A change/switch in beam may create latency and/or overhead of reconfiguration during the beam switch. It may not be efficient in terms of latency or signaling overhead to rely on L3 reconfiguration procedures to update the configuration when a beam switch occurs. For example, some beam switches may result from events that may not be predictable and that may be dynamic in nature (e.g., blockage events due to mobility of other objects around a WTRU). Furthermore, such events may induce ping-pong effects as a WTRU moves away from a beam when blocking starts and returns toward the same beam when blocking ends, which may occur frequently.

Accordingly, various beam configuration aspects and parameters may be implemented in the WTRU and/or network. For example, a beam and/or beam set configuration may include a configuration of an of the following example signals/channels. The configuration of the signals/channels may include DL RSs (e.g., NR shared spectrum (NR-SS), CSI-RS, DMRS, which may be used for measurements, demodulation, path loss estimation, and/or timing adjustments. The configuration of the signals/channels may include UL reference signals (e.g., DMRS, SRS) which may be used for sounding and/or demodulation. The configuration of the signals/channels may include UL physical channel resources such as PRACH (e.g., a set of applicable PRBs, preambles and occasions in time), PUCCH (e.g., dedicated resources for dedicated scheduling request (D-SR), UCI transmission), and/or PUSCH (e.g., a set of applicable PRBs, bandwidth, frequency location). The UL physical channel resources may correspond at least in part to a bandwidth part (BWP). The configuration of the signals/channels may include DL physical channel resources such as CORESETS/PDCCH (e.g., set of applicable PRBs, DCI formats, aggregation levels, search spaces USS or CSS), and/or PDSCH (e.g., set of applicable PRBs, bandwidth, frequency location). The DL physical channel resources may correspond at least in part to a BWP. The configuration of the signals/channels may include transmission/reception patterns (e.g., in time). The configuration of the signals/channels may include discontinuous reception (DRX) configuration (e.g., a drxStartOffset and/or the start of the on-duration period). The configuration of the signals/channels may include power control aspects (e.g., desired receive power, power offset, power coefficient adjustments). Each of these configurations may have a default value and/or a dedicated value.

Figure 4:
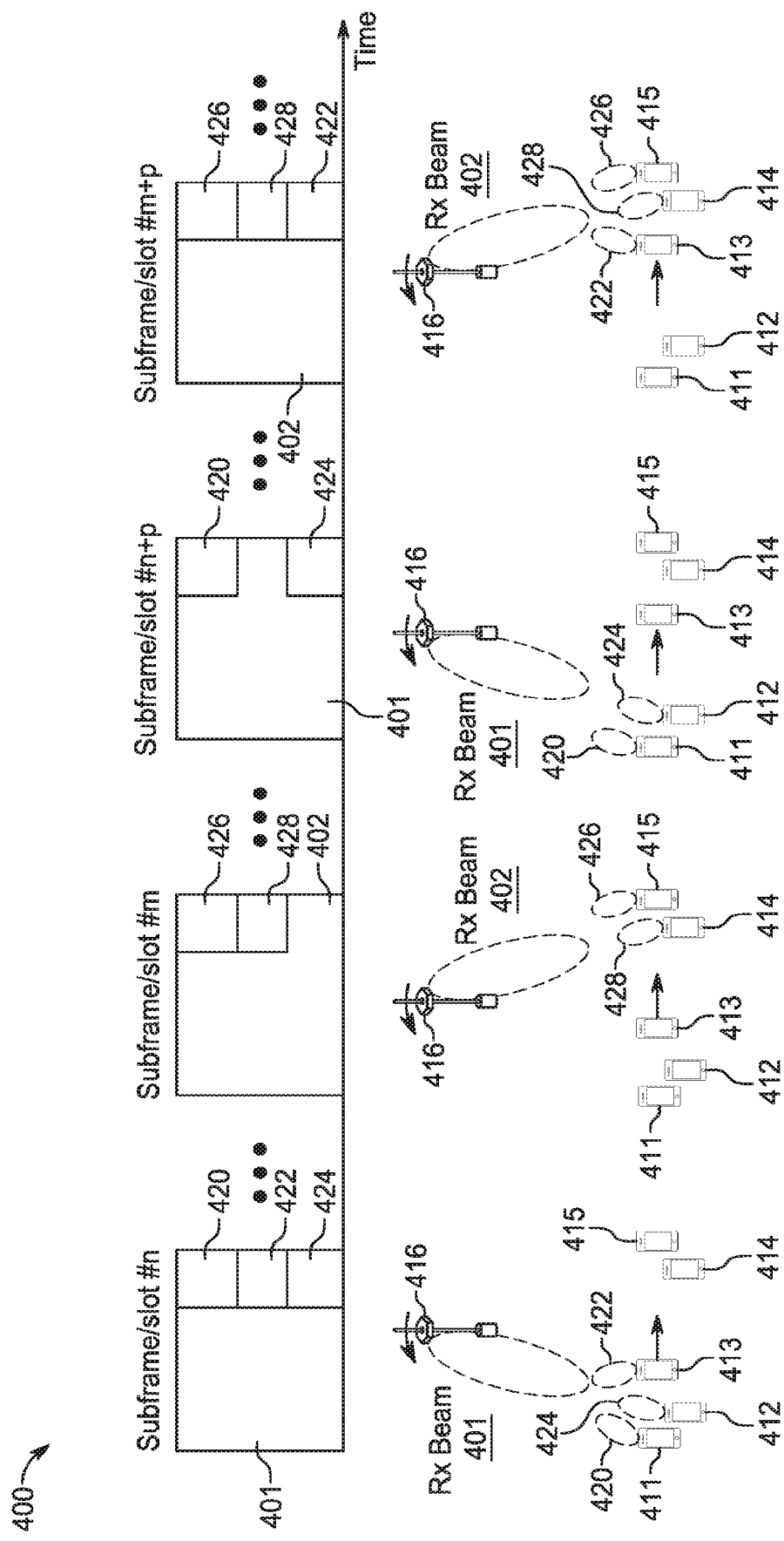
FIG. 4 is an diagram of an example of a UL configuration change procedure due to a beam change.

FIG. 4 is an diagram of an example of a UL configuration change procedure 400 due to a beam change (beam switch), which may occur when a gNB 416 multiplexes multiple WTRUs (from among WTRUs 411, 412, 413, 414 and/or 415) in a specific RX beam, such as RX beam 401 or RX beam 402. The RX beams 401 and 402 may be multiplexed in time (i.e., active in different subframes/slots). In the example show in FIG. 4, the WTRUs 411, 412, 413 are configured with UL resources 420, 422 and 424 associated with RX beam 401 at the gNB 416 during subframe/slot #n. During subframe/slot #m, RX beam 402 is active and WTRUs 414 and 415 are configured with UL resources 428 and 426. The UL resources are configured in subframe/slot numbers occurring at a periodicity of p time units. As illustrated in FIG. 4, when the WTRU 413 undergoes beam change from RX beam 401 to RX beam 402 at the gNB 416, the periodic resources configured in subframe/slot #n+p are no longer valid. The WTRU may not assume that the same UL resources at RX beam 401 as applicable for RX beam 402. The WTRU 413 may need a reconfiguration to obtain the resources in the new UL transmissions associated with the RX beam 402 at the gNB 416 during subframe/slot #m+p.

The availability of beam configurations may be determined in a number of different ways. For example, available beam configurations may be determined by the WTRU using any one or more of the following approaches: beam grouping, beam set-specific parameters, L3 configuration, system information, dedicated RRC signaling, full configuration, delta configuration, and/or fallback to default configuration.

In a beam grouping approach, beams may be grouped in sets of one or more beams. For example, from the network's perspective, a set of beams may correspond to beams associated to the same transmission point (e.g., TRP). A set of beams and the beam grouping structure may correspond to one of a control set or a data set. A beam control set may correspond to beams used at least for physical layer control channels. A beam data set may correspond to beams used at least for physical layer data channels.

Beam grouping structure may be cell-specific/widebeam or WTRU-dedicated/narrow-beam. For example, a set of beams may correspond to one of a cell-specific set of beams, or a WTRU-specific set of beams. A cell-specific set of beams may be configured with RS configuration of a NR-SS type (e.g., in RRC IDLE and/or RRC INACTIVE mode). A WTRU-specific set of beams may be configured with a RS configuration of a CSI-RS type only (e.g., in RRC CONNECTED mode) and/or with a NR-RS type (e.g., for beam refinement).

Each beam set may be indexed using an identity. For example, the identity may correspond to a set and may be associated to a configuration. For example, for a set of beams that consist of a single beam, the identity may correspond or be set to the beam identity. Beams may be mutually exclusive for different sets of one or more beams.

As part of beam grouping, multiple sets of the same beams, each with different configuration, may be used. For example, a beam identity may be part of multiple sets. For example, each set of beams may include the same beam identities where each beam (or set thereof) may be associated with different parameter values. In such a case, a change of beam may consist of a change of beam set and its corresponding configuration parameters. A particular case may include reconfiguration of a specific beam being performed by changing the applicable beam set for the concerned beam identity.

Beam set-specific parameters may be used. For example, each set of beams may be configured with parameters specific to all beams of the set. In an example, specific beams in the set may have beam-specific configuration aspects.

L3 configuration may be used. For example, the WTRU may receive a configuration for one or more beams, or set thereof, by L3 (e.g., RRC) signaling. The L3 signaling may be received as part of the SI. The SI may be received on the DL broadcast SI (e.g., on PBCH). For example, the WTRU may acquire cell-specific beams as part of the SI for a cell and/or for a BWP. The L3 signaling may be received using dedicated RRC signaling. The WTRU may receive L3 signaling during a configuration and/or reconfiguration procedure, and with or without mobility control information. For example, the WTRU may acquire cell-specific beams for a first cell as part of the SI for the first cell and/or for a BWP of the first cell when connected in a different second cell. For example, the WTRU may be configured with WTRU-specific beams for a cell and/or for a BWP using physical resources of the concerned cell and/or BWP when RRC connected (or when establishing such a connection).

The WTRU may receive a full configuration which may include values for all applicable parameters for the concerned beams and/or beam sets. For example, the WTRU may receive a full configuration for a first set of beams (e.g., a cell-specific beam set) for a primary or default beam set. The primary or default beam set may correspond to a default bandwidth, frequency location, CORESET and/or more generally to a default set of physical resources for the cell. The default set of physical resources for the cell may correspond to the resources applicable for a WTRU in RRC IDLE mode and/or used for an initial access to the cell.

The WTRU may receive a delta configuration parameters for set(s) of beams other than the default set of beam(s). For example, the WTRU may apply the default configuration (e.g., the configuration of the default set of beams) to the other such sets of beams while using the values additionally provided as part of the delta configuration when applicable (e.g., if such values are configured for the set of beams). In such cases, the received delta configuration may override the value from the default configuration for the concerned other set of beams. In another example, the received delta configuration may include one or more adjustments to apply to the values of the default configuration to determine the value applicable to the concerned other set of beams. For example, the WTRU may receive offset values to apply to the default configuration values (e.g., in time/frequency/code) signaled in a beam recovery response during beam recovery or signaled in control signaling during a beam change or reconfiguration.

The WTRU may use and/or revert to a default configuration for one or more configuration parameters (e.g., RS configuration such as CSI-RS, PUCCH resources, SRS resources) and/or for one or more beams when certain events occurs. An example of an event that triggers the WTRU to use the default configuration may include the WTRU determining that beam recovery was successful. For example, the WTRU may use a default configuration after beam recovery. The default configuration may not be optimal from a multiplexing point of view because some resources may be reserved in time for a specific WTRU; however, the WTRU may subsequently receive further signaling to reconfigure the beams by higher layers (e.g., when the new beam is stable for a predefined duration). An example of an event that triggers the WTRU to use the default configuration may include the WTRU determining that a timer expired (e.g., a beam recovery timer, a TA timer, and/or a deactivation timer. Another example of an event that triggers the WTRU to use the default configuration may include the WTRU receiving explicit signaling from the network, such as in in a DCI (e.g., a reconfiguration index set to "default"), a MAC CE (e.g., a deactivation command), and/or in a RRC message (e.g., a connection release message). In an example, the WTRU may consider these events only when they occur in relation to the concerned beam set.

The WTRU may use and/or revert to a default beam set and/or beam configuration when certain events occurs. An example of an event that triggers the WTRU to use the default beam set may include the WTRU determining that a timer expired (e.g., a beam recovery timer, a TA timer, a deactivation timer). Another example of an event that triggers the WTRU to use the default beam set may include the WTRU determining that beam recovery was not successful. Another example of an event that triggers the WTRU to use the default beam set may include the WTRU determining that it is experiencing radio link problems (e.g., after a maximum number of hybrid automatic repeat request (HARQ) retransmissions has occurred, when the WTRU determines that a random access procedure is not successful, when the WTRU cannot reliably receive control signaling, and/or after a number n of out-of-sync indications from the physical layer possibly within a given period). Another example of an event that triggers the WTRU to use the default beam set may include the WTRU receiving explicit signaling from the network such as in a DCI (e.g., a reconfiguration index set to "default"), in a MAC CE (e.g., a deactivation command) or in a RRC message (e.g., a connection release message). In an example, the WTRU may consider these events only when they occur in relation to the concerned beam set (e.g., impairment events pertaining to the operation of the concerned beams.)

In an example, the WTRU may indicate the completion of the reconfiguration of the beams by transmitting a control message in the UL. For example, the WTRU may transmit an acknowledgement (e.g., on PUCCH) for the transmission that triggered the reconfiguration (e.g., a DCI). In some implementations, the WTRU may perform such transmission using the new configuration.

Various approaches may be used to determine an applicable beam configuration. For example, the WTRU may be preconfigured with a plurality of configuration parameter sets, which may be later applied as a specific configuration. In an example, the configuration can be reconfigured dynamically. For example, each configuration parameter set may include one or more configurations relevant for operation in the beam or beam paired link after a beam management procedure (e.g., a beam switch or beam recovery). The WTRU may thereafter select a specific configuration from amongst the preconfigured set to apply after the successful beam switch or beam recovery procedure.

In an example, the WTRU may apply preconfigured parameters using an explicit indication. For example, the WTRU may be preconfigured with a plurality of configuration parameter sets, such as via RRC signaling. Each parameter set may be logically indexed (e.g., from index 0 to index N). During the beam management procedure (e.g., in a beam switch command or in a beam recovery request response), the WTRU may receive an indication of a specific configuration within the preconfigured parameter set to apply for the new beam. For example, the WTRU may receive a specific index via L1 (e.g., DCI) or MAC signaling (e.g., a MAC CE). The WTRU may complete the reconfiguration by applying the parameters associated with the aforementioned index. In one example, the WTRU may be configured to apply the configuration associated with the previous serving beam for the new beam after beam change if a special index (e.g., index 0) is received in L1 signaling (e.g., DCI), MAC signaling (e.g., MAC CE), a beam recovery response or a beam switch command.

In an example, the WTRU may apply preconfigured parameters using implicit indexing. For example, the preconfigured parameters may be implicitly indexed based on beam identity. The WTRU may be preconfigured with parameters for each SS block index, CSI-RS resource identity, PDCCH DMRS, and/or any other identity associated with each candidate beam. The WTRU may apply the reconfiguration associated with the candidate beam on which the beam recovery response is received. In another example, the preconfigured parameters may be implicitly indexed based on beam recovery resource. The WTRU may apply the reconfiguration associated with the beam recovery resource for which a beam recovery response is received.

Figure 5:
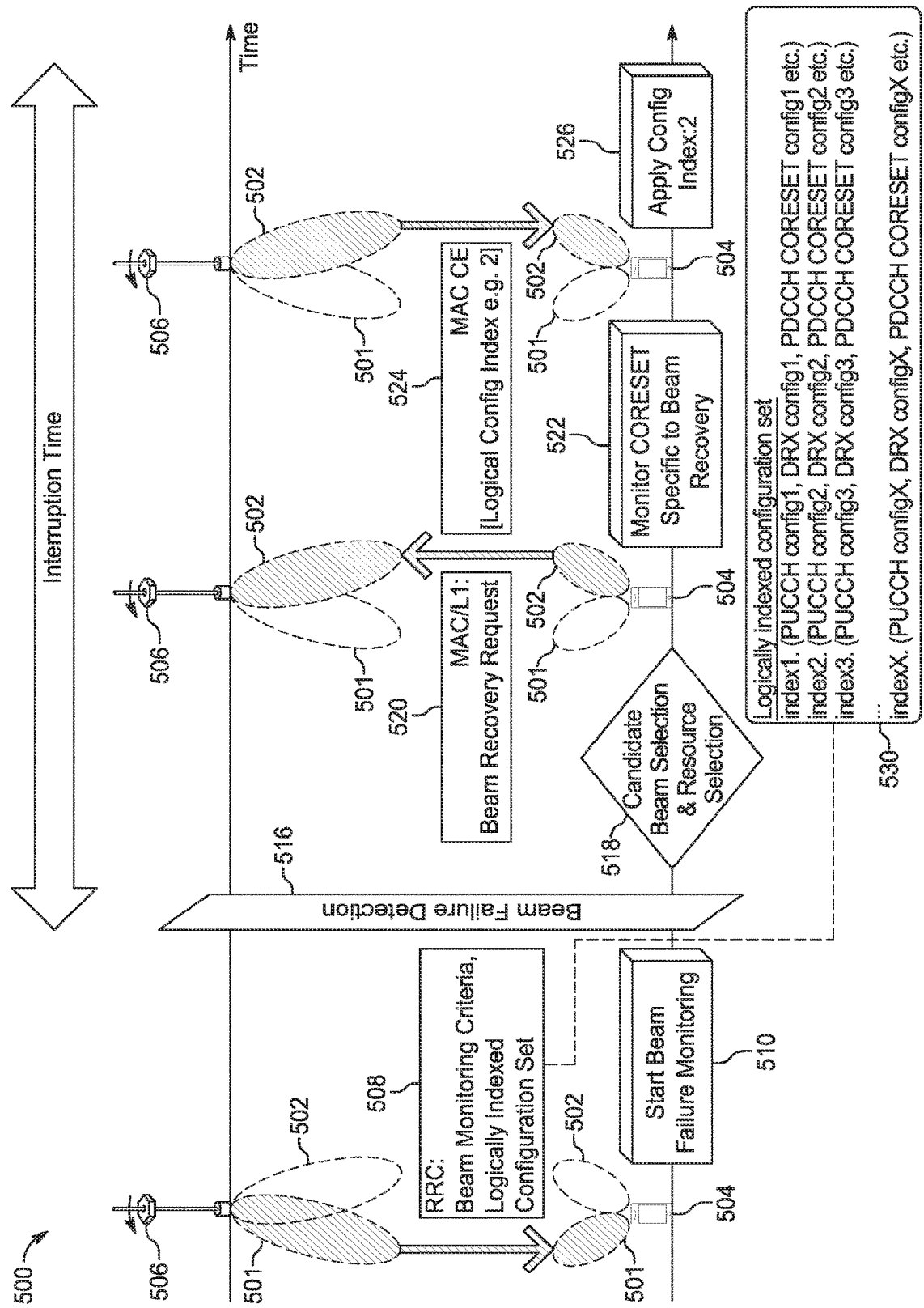
FIG. 5 is a diagram of an example a determination of configuration update procedure upon beam recovery.

FIG. 5 is a diagram of an example a determination of configuration update procedure 500 upon beam recovery. In an example, the WTRU 304 may be preconfigured by RRC signaling 508 (e.g., from the gNB 506) with two recovery resource pools 501 and 502. For example, pool 501 may include dedicated resources and pool 502 may include cell-specific beam recovery resources. The RRC signaling 508 may also include beam monitoring criteria, which the WTRU 304 may use to perform beam failure monitoring 510. The WTRU 504 may be configured by the gNB 506 and/or RRC signaling 508 with a set of possible configuration sets 530, where each configuration set may include a CORESET configuration, PUCCH configuration, DRX configuration, and/or any other configuration that depends upon the serving beam. Each of the configuration sets 530 may be logically indexed based on implicit or explicit schemes, such as those described above.

If a beam failure detection 516 occurs, the WTRU 504 may perform candidate beam selection and resource selection 518. The WTRU 504 may transmit and retransmit beam recovery requests 520, using MAC/L1 signaling, in one or more candidate beams of resource pool 502. After the WTRU 504 transmits a beam recovery request 520 (e.g., a random-access preamble on the resources reserved for beam recovery), the WTRU 504 may monitor 522 the CORESET specific to beam recovery response. The WTRU 504 may determine that the beam recovery procedure is successful, for example if the WTRU 504 receives a DCI addressed to the C-RNTI of the WTRU 504. In some implementations, the WTRU 504 may receive a MAC CE 524 indicating the logical index of a reconfiguration (e.g., index:2) to be applied. If the WTRU 504 receives the indication of the logical index of the reconfiguration in the MAC CE 524, the WTRU 504 may apply 526 the configuration associated with the logical index, for example no later than x slots after receipt of the indication. Although not shown in FIG. 5, the WTRU 504 may start to monitor the CORESET associated with the new configuration. The WTRU 504 may acknowledge the successful application of the new configuration by transmitting an acknowledgement, which may include the new PUCCH configuration, if configured. The MAC CE 524 based configuration update may help minimize the involvement of RRC signaling during a beam recovery procedure and may thus reduce the latency of the overall beam recovery in general.

In an example, the preconfigured TCI states may no longer be valid after a beam failure event. For example, the WTRU may lose the serving beam due to a sudden rotation. In such cases, the WTRU may find a new beam from the cell which may not have been reported (by the WTRU to the gNB) earlier. This may result in the WTRU not having a valid TCI state for the new beam. This situation may persist until the WTRU reports new beam measurement results, and/or until the WTRU later receives higher layer configuration of new TCI states.

The WTRU may be configured to monitor a specific CORESET pre-configured for reception of a beam recovery response (e.g., CORESET-beam failure recovery (BFR) control channel resources to monitor for BFR responses). The WTRU may be configured to monitor the CORESET-BFR for a predefined time window (e.g., a beam recovery response window), after transmission of beam recovery request. The WTRU may be configured to monitor the CORESET which was used before beam failure (e.g., CORESET-Normal) after the end of beam recovery response window, if a DCI addressed to the C-RNTI of the WTRU is not received during the beam recovery response window.

A WTRU may be configured to re-synchronize TCI during beam recovery (e.g., implicit assumption of TCI state upon beam failure). A WTRU may be configured to release or stop using the preconfigured TCI states upon beam failure and recovery to a beam not associated with any of the preconfigured TCI states. In an example, the WTRU may assume that the TCI state of PDSCH is same as the TCI state applied to the CORESET-BFR (i.e., CORESET of PDCCH used for beam recovery response reception). For example, the WTRU may assume that an antenna port of PDSCH DMRS is QCLed with PDCCH used for beam recovery response reception. In an example, the WTRU may assume that the TCI state indication is not transmitted in the DCI within the CORESET-BFR, until explicitly indicated via higher layer signaling. The WTRU may stop monitoring CORESET-BFR after receiving a new CORESET configuration after beam recovery.

L1/L2 operations may be performed by a WTRU upon change and/or reconfiguration of beams. For example, one or more serving beams may not be available during a period of beam failure. The WTRU may perform transmission and/or reception on candidate beams during the beam recovery procedure. In an example, ongoing procedures may be interrupted when a beam recovery procedure is triggered. For example, an ongoing beam recovery procedure may result in unavailability of a transmission and/or reception opportunity for other procedures across various protocol layers. The WTRU may be configured to handle impacts to one or more functions/procedures during a period of interruption caused due to a beam change (e.g., due to reconfiguration, beam recovery, and/or L1-mobility). Accordingly, the various approaches described herein in the context of beam recovery may also be applied in cases of network controlled beam switching or other procedures that change and/or update the serving beams of a WTRU. The interruption may be either fixed in time or variable in time. The maximum time allowed for interruption may be upper bounded, such that the WTRU may be configured to determine that the procedure for a change and/or for an update of the applicable serving beam(s) is unsuccessful after a time (e.g., x milliseconds) has elapsed and/or the WTRU determines that the beam link has not been successfully established. The WTRU may be configured to determine the interruption time (e.g., from the trigger to initiation of the recovery/change up to the first UL transmission with a L2 transport block). In some implementations, this determination may be made only when the data radio bearer (DRB) can resume.

In some implementations, DL beam and/or UL beam state may be assumed during a beam failure. Beam failure may include failure of the UL beam only, the DL beam only, or failure of both UL and DL beams. Following the principle that UL transmissions follow DL reception (e.g., as in LTE), the WTRU may detect a DL beam failure and may stop transmission on the UL beam until the DL beam failure is resolved. In another example, the WTRU may detect an UL beam failure, in which case, the WTRU may continue to receive on the DL beam, but may not transmit in the UL beam. In another example, if a failure is detected on both beams, the WTRU may not transmit in the UL beam and may not receive in DL beam until beam failure is recovered. These examples do not exclude the possibility of transmitting or receiving on another beam during the beam failure of a given beam.

Beam failure may have an impact on hybrid automatic repeat request (HARQ). A WTRU may be configured to handle UL grants and/or transmissions during beam failure events. For example, the WTRU may have received an UL grant prior to declaring beam failure for an UL resource which is available following beam failure. In an example, a WTRU may cancel or skip all pending UL grants which are valid for a particular beam when a beam failure occurs on that beam. This may apply to UL grants associated with UL semi-persistent scheduling (SPS). The WTRU may avoid transmission on these grants. In an example, the WTRU may be configured to flush its HARQ buffers and/or pending UL feedback if any one or more of the following events occur: a beam failure is detected; a beam recovery results in a beam change; a beam failure is explicitly indicated by the network in a beam recovery response message; and/or the beam recovery is not successful within a predefined time period.

In another example, the WTRU may be configured to receive the feedback associated with UL transmissions made before or during the beam failure once the beam recovery is successful. For example, the WTRU may be configured to receive the ACK/NACK feedback from the network in response to an UL transmission on another beam. Examples of other beams may include, but are not limited to include, any of the following beams: one or more of the beams associated with preconfigured beam sets; on the candidate beam indicated by the WTRU in the UL transmission; on the beam on which beam recovery has succeeded; on a default beam and or/connection beam operating in a different frequency and/or radio access technology (RAT); and/or on a different beam monitored by the WTRU for which beam failure has not occurred.

The WTRU may expect the ACK/NACK feedback on the alternate beam to be delivered using DCI on PDCCH, and/or a physical hybrid-automatic repeat request indicator channel (PHICH)-like signal. The ACK/NACK feedback may be delivered through specific fields in the DCI, such as a new data indicator (NDI) in a new grant, or by a dedicated DCI message used for this purpose. In another example, a dedicated MAC CE may be used to deliver the ACK/NACK for all WTRU transmissions during a beam failure condition.

The WTRU may expect the ACK/NACK feedback on the alternate beam (e.g., the candidate beam) based on any of the following timings: the same timing for ACK/NACK as would have been expected on the failed beam; in the beam recovery response message following the recovery on the new beam; and/or at some time offset from recovery completion (e.g., the time offset may be a function of the timing of the grant, the duty cycle of PDCCH on the failed beam, and/or the duty cycle of PDCCH on the candidate beam).

The WTRU may inform the network via any suitable indication/signaling of whether one or more specific UL grants will be used or not by the WTRU (e.g., prior to the timing of the UL resource), or was previously used or not by the WTRU (e.g., following beam recovery). For example, the indication may be sent by the WTRU using any of the following signaling: PUCCH on a current beam or candidate beam; RACH on the current beam or candidate beam; MAC CE (e.g., with another UL transport block, where the indication may apply to a future UL grant that is already pending at the time of a previous UL transmission).

In an example, the WTRU may provide an indication of all UL grants which were not used for transmission by the WTRU with the beam recovery request (BRR), or in a MAC CE transmitted by the WTRU following beam recovery (e.g., using a dedicated MAC CE, or buffer status report (BSR)). In another example, the WTRU may send multiple indications on one or more candidate UL beams for each of the UL grants which are unused during the beam recovery procedure. Such indications may be sent on a PUCCH-like channel on the candidate beam or using a RACH transmission (e.g., a dedicated preamble).

Procedures may be performed by the WTRU to handle pending HARQ feedback in the event of change and/or reconfiguration of beams. A WTRU may have pending HARQ feedback for which the transmission occasion would fall within a time period during which an ongoing beam recovery procedure is in progress. In an example, the WTRU may cancel all HARQ feedback transmissions when a beam failure is detected on the serving beam. Upon recovery completion on another beam, the WTRU may discard any transmission/retransmissions for a HARQ process ID for which the WTRU successfully decoded the transport block (TB) but discarded the HARQ feedback. The WTRU may transmit an ACK to the network for such discarded TBs.

In another example, the WTRU may suspend all HARQ feedback transmissions for which the transmission occasions fall within a time period during which the beam recovery procedure is executed. In an example, the WTRU may transmit the HARQ feedback following a successful beam recovery. For example, the WTRU may transmit one or more HARQ feedback messages together in a single message. The HARQ feedback may be bundled or combined into a single HARQ feedback for a set of TBs. In another example, the HARQ feedback may be in the form of a list of ACK/NACK bits and associated HARQ process IDs. In another example, the HARQ feedback may be in the form of an ordered list of ACK/NACK bits, starting from the process IDs for which the WTRU suspended the HARQ feedback transmissions.

In another example, the WTRU may transmit HARQ feedback on one or more candidate beams during beam failure. The transmission of such HARQ feedback may be a part of the BRR transmission. For example, at the transmission of BRR, the WTRU may include all pending HARQ feedback and may transmit such feedback along with the BRR. In an example, the BRR transmission may include the transmission of an ACK/NACK bit on PUCCH of the candidate beam selected by the WTRU for beam recovery. The WTRU may be configured to transmit HARQ feedback on the serving beam under normal circumstances and on a selected candidate beam when the serving beam failure is detected.

In the following, examples are given of WTRU behavior upon beam failure. In an example, if beam failure occurs on a subframe/TTI in which the WTRU is configured to transmit ACK/NACK, the WTRU may transmit ACK/NACK on PUCCH of the candidate beam for BFR. If beam failure does not occur on a subframe/TTI in which the WTRU is configured to transmit ACK/NACK, the WTRU may transmit a default indication on PUCCH (e.g., ACK or NACK). In another example, if beam failure occurs on a subframe/TTI in which the WTRU is configured to transmit ACK/NACK, the WTRU may transmit ACK/NACK on PUCCH of the candidate beam for BFR. If beam failure does not occur on a subframe/TTI in which the WTRU is configured to transmit ACK/NACK, the WTRU may transmit on a different indication in PUCCH for a BFR request.

A WTRU may indicate or report the timing of beam failure to the network, and/or may provide information allowing the network to determine the timing of the beam failure. For example, the indication of the timing of the beam failure may be sent to the network (e.g., gNB) following beam recovery, or at transmission of the BRR. The transmission of BRR may occur some period of time (e.g., one or more TTIs, subframes, or PDCCH scheduling occasions) following the declaration of beam failure on the current beam. In this case, the network may use knowledge of the timing of beam failure declaration, for example to determine the TBs and/or redundancy versions (RVs) to be retransmitted.

In an example, the WTRU may transmit an explicit indication of the timing of beam failure declaration. The timing indication may be in the form of: a system frame number (SFN) and/or subframe number, or portion thereof (e.g., the WTRU may transmit the least M significant bits of the SFN and the subframe number); the number of subframes prior to the indication at which beam failure was declared by the WTRU; and/or the process ID identifying the last scheduled DL transmission which was not successfully decoded by the WTRU (e.g., NACK status).

A WTRU may be configured to handle retransmissions following beam recovery. For example, during beam recovery, a WTRU may be scheduled with UL/DL transmissions which may use special treatment of retransmissions following beam recovery. In an example, the WTRU may reset the transmitted RV for UL transmissions (e.g., transmit RV=0) upon reception of a grant for a TB where NDI is not toggled. The WTRU may be scheduled with UL/DL transmissions with such special treatment of retransmissions following beam recovery if any one or more of the following conditions are satisfied: the WTRU was granted UL resources to transmit a specific TB during the beam failure condition, but did not transmit it; and/or the transmission performed by the WTRU during beam failure condition was that of an initial transmission and not a retransmission. In an example, the WTRU may suspend the HARQ retransmission counter during a beam failure condition. The WTRU may suspend the counter regardless of UL transmission of data performed on the original beam. The WTRU may continue counting HARQ retransmissions following BFR.

A WTRU may handle SPS during a beam failure procedure. A WTRU may re-use/keep an existing SPS configuration when switching from one beam to another (beam management) or when performing beam recovery. The SPS configuration may include, but is not limited to included, periodicity, activation status, and/or grant size of the configuration. In an example, the WTRU may assume the same timing of SPS resources on the new beam/recovered beam as on the original beam. The WTRU may avoid transmission in the UL on UL SPS resources during the beam failure condition and restart UL transmission on the first SPS resource (based on the original timing) on the new beam. In another example, the WTRU may assume a change in the timing (e.g., the subframe offset or time between two successive SPS resources) and or period of UL/DL SPS resources following beam recovery. The change in timing may be a function of the time between BRR transmission by the WTRU and response by the network. The change in timing may be configurable by the network. For example, for SPS resources configured with a periodicity of M subframes, the first SPS resource in the new beam following beam recovery may occur N (e.g., N<M) subframes following the last unusable SPS resource on the source beam.

In another example, the WTRU may implicitly deactivate all active SPS configurations under a beam failure condition. The WTRU may implicitly activate the SPS resources at some time offset following beam recovery. The WTRU may receive an activation for an SPS resource from the network. The activation for the SPS resource may contain an explicit configuration of the SPS parameters (e.g., grant, and/or MCS). The WTRU may reuse any one or more of the SPS parameters from a previous activation command. The WTRU may receive a single activation command for several SPS processes and the WTRU may further activate the SPS processes using the same parameters received with the last activation command.

L1/L2 operations performed by a WTRU upon change and/or reconfiguration of beams may include treatment of upper layer timers and/or timing. A WTRU may provide an indication to its upper layers (e.g., L2/MAC, L3/RRC) about the time spent in beam recovery or beam switch. The time indication to upper layers may indicate, but is not limited to indicate, any of the following information: the time during which the WTRU did not monitor PDCCH; the time during which the WTRU did not perform UL transmission on the original beam; the time between beam failure detection and BRR transmission; and/or the time between BRR transmission and BRR response reception.

In an example, a WTRU may use the time indication to upper layers to suspend, delay, and/or compensate for upper layer timers that may assume accessibility of the beam by the WTRU. A WTRU may suspend an upper layer timer and resume such timer when the recovery procedure is complete, and/or when the recovery procedure is declared as failed. A WTRU may suspend frame, subframe, TTI, or other timing-related counting procedures during a beam recovery procedure and resume the suspended counting procedure(s) at completion of the beam recovery. A WTRU may add or subtract a given number of frames, subframes, and/or TTI, from such counting procedures, based on a value determined by the lower layers for the duration of any of the above aspects of beam recovery.

A WTRU may perform procedures to handle the timing alignment timer (TAT) during beam recovery or beam switch. In an example, a WTRU may reset the TAT for a particular timing advance group (TAG) upon the commencement of a beam recovery procedure or beam switch procedure. The WTRU may receive (e.g., in the BRR response) a timing alignment for the new beam or set of beams and correspondingly reset the TAT. A WTRU may continue to run the TAT during the beam recovery procedure as long as the WTRU does not receive a new value of the timing offset. A WTRU may receive and/or update the timing information associated with the new serving beam during the beam recovery procedure.

In an example, a WTRU may suspend an RRC timer during beam recovery or beam switch and may later continue/resume the timer after the beam recovery procedure has succeeded or failed. For example, the WTRU may suspend any one or more of the following timers during the beam recovery procedure: T301 (RRCConnectionReestablishment), T302, T303, T305, T306, T308 (Access Barring), and/or T321.

In an example, the WTRU may suspend a timer during a beam recovery procedure, and may restart and/or resume the timer upon successful beam recovery. The WTRU may force a timer to expire or stop immediately upon failure of the beam recovery procedure. For example, a WTRU may transmit an RRCConnectionReestablishmentRequest message. During the reestablishment procedure, the network may establish a beam monitoring process and then transmit an RRCConnectionRestablishment or RRCConnectionRestablishmentReject message. After establishment of the beam monitoring process, the WTRU may detect a beam failure and initiate the beam recovery procedure. The WTRU may, in this case, suspend timer T301 until completion of beam recovery. If beam recovery succeeds, the WTRU may resume time T301 from the time of suspension. If beam recovery fails, the WTRU may stop or expire timer T301 and declare beam recovery failure.

In an example, the WTRU may increment or decrement the current value of the timer by a given amount following beam recovery. The increment/decrement amount may be configurable or may be determined or provided by the lower layers.

A WTRU may perform procedures to handle paging during beam recovery or beam switch. A WTRU may experience beam failure, or may be performing beam recovery during the WTRU's paging occasion. For example, the WTRU may be configured to apply a reconfiguration upon beam recovery, where the reconfiguration may update/change/modify one or more aspects related to paging reception in the new beam. In an example, the WTRU may delay or move its paging occasion by an amount equal to the beam recovery duration (e.g., in number of TTIs or subframes) if a beam failure and/or beam recovery procedure occurs during the WTRU's paging occasion. The delay of the paging occasion may be equal to the amount of time spent during beam recovery. In an example, the WTRU may calculate a new paging occasion and replace the current paging occasion (i.e., the paging occasion in which beam failure/recovery occurs) with the new paging occasion. The new paging occasion may assume the same paging calculation formula with one or more parameters changed (e.g., the WTRU ID, paging DRX cycle of the WTRU, number of paging occasions, offset used for paging frame calculation, and/or the identity of the new beam).

WTRU may perform procedures to handle connected mode DRX during beam recovery or beam switch. A WTRU may experience beam failure, or may be performing beam recovery, during the ON duration of a WTRU's connected mode DRX, such that the beam failure may affect the intended DRX operation. In such cases, the WTRU may skip the counting of subframes affected by beam recovery and/or beam switch in the determination of DRX related timer (e.g., onDuration and/or DRX Cycle). For example, a WTRU may extend its ON duration if a beam failure occurs. The WTRU may assume its ON duration is extended by the duration of beam recovery or beam switch. The WTRU may assume its ON duration is extended by the amount of time in which the WTRU is not able to monitor the control channel on one or more DL beams, and may count its ON duration as the number of TTI/subframes in which PDCCH can be monitored.

In another example, a WTRU may scale its counting during beam recovery or following beam switch to take into account the difference in duty cycle of control channel signaling. For example, a WTRU may perform beam recovery on a beam with a lower PDCCH duty cycle and may extend its ON duration while it is monitoring PDCCH on the lower duty cycle PDCCH to account for the lower duty cycle PDCCH. In another example, a WTRU may perform a beam switch to a beam with a higher or lower duty cycle of PDCCH, and may scale its ON duration or other DRX timers by a factor related to the difference in duty cycle between the original beam and the target beam.

In an example, the WTRU may not enter DRX when a beam recovery is ongoing. For example, the WTRU may consider that the active time for beam recovery to include any one or more of the following durations: the time during which a random access is triggered for beam recovery; the monitoring time during the beam recovery response window; and/or the time that a timer associated with BFR (e.g., the beamFailureRecoveryTimer) is running when the WTRU is configured with DRX. For example, the WTRU may be required to decode PDCCH during the active time for beam recovery.

A WTRU may perform procedures to handle MAC, radio link control (RLC) and/or packet data convergence protocol (PDCP) level timers during beam recovery or beam switch. A WTRU may skip TTIs or time for the duration of beam switch or beam recovery procedure when counting certain MAC level timers. Such MAC timers may include any one or more of the following example timers: periodic power headroom report (PHR) timer; SR prohibit timer; BSR timer; ScellDeactivationTimer; mac-ContentionResolution-Timer; t-PollRetransmit timer; t-Reordering timer; t-status-Prohibit timer; and/or PDCP discard timer.

Beam recovery or beam switch may impact other higher layer procedures, such as those procedures described in the following. A WTRU with UL data to transmit and configured SR resources on PUCCH may suspend SR transmission during a beam recovery procedure or beam switch procedure. The SR transmission may be allowed to resume following the beam recovery or beam switch on the new beam. In an example, the WTRU may assume that the SR configuration on the new beam is implicitly maintained as in the old beam. The SR configuration may be assumed to be enabled only following successful beam recovery (e.g., at the reception of the BRR response message from the network). In another example, the WTRU may receive an indication of whether the existing SR configuration is valid or invalid, and/or a new SR configuration. The WTRU may receive (e.g., in the BRR response message) parameters related to the changes in the SR configuration on the new beam. The parameters in the SR configuration on the new beam that may be changed may include, but are not limited to include, any of the following parameters: timing of the SR resources; frequency of the SR resources; resource index of the SR resources; numerology of the SR resources; an increase or decrease in the number of SR resources; an increase or decrease in periodicity of SR resources; and/or timers related to SR (e.g., SR-prohibit timer).

In an example, a WTRU transmitting BSR as part of BRR may cancel all pending SR transmissions following the BRR transmission. In another example, a WTRU may reset the SR_COUNTER at the completion of the beam recovery procedure. Resetting of the SR_COUNTER may be depend on any one or more of the following conditions: the target beam has the same/different SR configuration as the source beam; the WTRU recovers on the same/different beam as the beam in which failure was triggered; the target beam is part of the same/different beam group or timing group (e.g., UL timing group) as the source beam; the target beam (or candidate beam) is configured/not-configured with PUCCH; and/or the WTRU is timing aligned/not timing aligned to the target beam.

In an example, the WTRU may suspend the SR_COUNTER during the beam recovery, and when successful, the WTRU may resume the SR_COUNTER from the value it had reached at the time of suspension. In such cases, the WTRU may continue transmission of SR on the source beam independently of the beam recovery procedure, however the WTRU may not increment the SR_COUNTER during these attempts of SR transmission to the source beam. In an example, a WTRU transmitting BSR as part of BRR to a specific candidate beam may cancel all pending SR transmissions only following successful reception of a BRR response following BRR transmission. In an example, a WTRU transmitting BSR as part of BRR to a specific candidate beam may cancel all pending SR transmissions only in cases where no additional data arrived at the WTRU during the beam recovery procedure. In an example, the WTRU may consider only the data which arrived during the beam recovery procedure as pending data when determining whether an SR should be triggered following the beam recovery procedure.

In an example, a WTRU may suspend or not increment SR_COUNTER for any SR transmissions performed during the beam recovery or beam switch procedures. SR_COUNTER may be incremented for subsequent SR transmissions which occur on the new beam once the beam recovery or beam switch procedure has been completed successfully. In an example, a WTRU may disable a SR prohibit timer, thus allowing SR transmission without prohibition, during the beam recovery procedure, and may re-enable the SR prohibit timer once beam recovery has succeeded.

A WTRU may perform procedures to handle the WTRU RACH procedure during beam recovery or beam switch. The WTRU may prioritize beam recovery and/or other WTRU procedures initiated by RACH during beam recovery or beam switch. In an example, a WTRU may detect beam failure and may perform beam recovery at the same time as, during, or just prior to, a new or ongoing RACH procedure used for a purpose other than beam recovery (e.g., used for triggering an SR when SR resources have not been configured or when triggering a system information request).

In an example, a WTRU may cancel an ongoing RACH procedure (and consequently, higher layer procedure(s)) when a beam failure event occurs. The WTRU may perform a RACH procedure as part of beam recovery in the new beam, and may ignore the RACH response and/or RACH transmissions/retransmissions from the previous RACH procedure during the beam recovery procedure. For example, a WTRU performing a RACH procedure triggered by a BSR/SR request may cancel the BSR/SR request (even if it is ongoing) in order to perform beam recovery and BRR transmission in the new beam. For example, a WTRU performing a RACH procedure for UL timing synchronization may cancel the RACH procedure immediately when beam failure occurs because the beam recovery procedure may establish UL synchronization on the new beams.

In another example, a WTRU may delay a beam recovery procedure or assume the beam failure as not critical to address immediately, and thus prioritize another RACH procedure. In this case, the WTRU may continue an ongoing RACH procedure. For example, the WTRU may be configured with conditional handover to a target cell if the serving cell quality becomes worse than that of the target cell. The WTRU may detect a failure of a serving beam (e.g., based on a L1 and/or L2 beam management procedures) and may also determine whether a quality of the serving cell becomes worse than the quality of a target cell (e.g., based on an L3 measurement procedure). In this case, the WTRU may determine that it should indicate a conditional handover procedure and/or a beam recovery procedure. The WTRU may be configured with one or more rules to prioritize one procedure over the other. For example, the WTRU may be configured to suspend/stop beam recovery if the candidate beam associated with the target cell is better than the candidate beam in the serving cell. In another example, the WTRU may be configured to prioritize a conditional handover over beam recovery when beam recovery is configured.

A WTRU may perform beam selection or beam switch procedures due to a beam failure. In an example, beam failure may trigger a selection of beam or a change of beam on which the WTRU performs other ongoing or upcoming RACH procedures. For example, a WTRU may exclude, in the selection for the beam for RACH procedure, a beam which is the same as, or has some association with, the beam in which the WTRU detects beam failure.

In an example, the WTRU may initiate a RACH procedure (e.g., for re-establishment) following a beam failure. The WTRU may exclude all beams which are associated with the previous beam failure (which may be in the same cell) when selecting the beam(s) on which a RACH preamble will be transmitted. In another example, a WTRU may abort a RACH procedure on a beam following beam failure having occurred on an associated beam. The WTRU may restart the aborted RACH procedure on a different beam. In another example, the WTRU may not increment the RACH preamble transmission counter under conditions of an aborted RACH procedure.

In the examples above, an association between two beams may include, but is not limited to, any of the following associations: the same beam, given by the beam ID or other identification; two beams having the same or related CSI-RS configuration; a network configured association between beams; two beams which are QCL; and/or an association (e.g., network configured) between CSI-RS and SS-block resources.

Beam recovery or beam switch may have an impact on measurements or measurement reporting. A WTRU may be configured with intra- and/or inter-frequency measurements to be performed in parallel with beam management. Beam failure may have an impact on the timing of performing measurements, as well as on reporting and/or event triggering rules. Beam recovery or beam switch may delay or interrupt measurements or measurement reports. For example, a WTRU may interrupt intra-frequency and/or inter-frequency measurements during a BFR procedure. The interrupted measurements may be resumed once the beam recovery procedure has succeeded. In another example, a WTRU may delay or cancel the reporting of measurements or the triggering of measurement events during beam recovery. In another example, the WTRU may be configured with rules to prioritize between intra-frequency and/or inter-frequency measurements and a beam recovery procedure. For example, the WTRU may prioritize intra-frequency and/or inter-frequency measurements over beam recovery if the serving cell quality is below a preconfigured threshold (e.g., a threshold that determines when the WTRU should perform measurements on non-serving cells, for example when the RSRP is below s-measure). In another example, the WTRU may continue to report RRC measurements on the serving beam during beam recovery. In an example, the RRC measurement reporting may be made with increased robustness if available to the WTRU. For example, the WTRU may report measurements using UL duplication (e.g., dual connectivity (DC) or carrier aggregation (CA) based) during the beam recovery procedure. In another example, the WTRU may report measurements to a different SRB (e.g., split SRB) or to a specific leg of a split SRB during a beam recovery procedure.

In the above example, the determination by the WTRU to delay, cancel, or interrupt measurements may depend, but is not limited to depend, on any one or more of the following characteristics: type of service (e.g., URLLC vs eMBB) currently configured in the WTRU; RRC semi-static configuration; WTRU speed; WTRU capabilities; connectivity status (e.g., E-UTRA-NR dual connectivity (EN-DC), NR-NR DC, and/or CA); beam reciprocity; availability of an UL beam (e.g., a candidate beam with PUCCH); the ID(s) of the beams currently monitored by the WTRU; and/or whether the measurements are inter-frequency or intra-frequency.

In an example, WTRU behavior in delaying or transmitting the measurement report during BRR may be related to the specific location of the WTRU in the cell, which may be known based on the beam(s) currently serving the WTRU. The WTRU may therefore modify its behavior with respect to the above solution based on a set of beams or beam IDs, which may be configured by the network.

Beam failure and/or beam recovery may control or affect measurement characteristics. A characteristic of a beam failure may have an implicit effect on the rules for performing measurements. Such beam failure characteristics may include any one or more of the following characteristics: the occurrence of a beam failure; a failed beam recovery procedure; the rate at which beam failure occurs on a cell; time of stay in serving beam (e.g., the uninterrupted time during which the WTRU has a beam which is part of the active set); the time spent in BFR in any one beam failure or over a fixed/configurable period of time; the number of candidate beams; and/or the quality of the serving/candidate beams.

Such beam failure characteristics yield may have an implicit change in any one or more of the following characteristics: the value of an s-measure; initiation or termination of intra/inter-frequency measurements; parameters related to event triggering (e.g., timeToTrigger, hysteresis, thresholds; enabling/disabling specific events; enabling/disabling certain cells, whitelisted cells, and/or blacklisted cells; and/or a measurement reporting period. In an example, a WTRU may determine RSRP is larger than the currently configured s-measure but may have a beam failure rate which is larger than a configured threshold. In this case, the WTRU may initiate intra and/or inter frequency measurements according to the configured measurement objects. In another example, a WTRU may increase or decrease the measurement reporting period by a factor related to the rate of beam failure events in the current cell.

RRC reporting by the WTRU may include beam failure characteristics. In an example, a WTRU may include the characteristics of beam failure, beam recovery, and/or beam switch (beam management) procedures in the measurement reports. Such characteristics may include one or more of the following characteristics: beam failure rate; beam recovery time (average time, time for each event); beam identification of serving, candidate, and/or failed beams; and/or beam quality of serving, candidate, and/or failed beams.

In an example, a beam recovery procedure may be interrupted due to a serving beam improvement. After a beam failure, the quality of the serving beam may improve, for example in the case of a temporary fade or an obstacle that is temporarily blocking the serving beam or set of serving beams. In an example, the WTRU may continue monitoring the CSI-RS or SS block or any other RS associated with the serving beam during a beam recovery procedure. For example, a WTRU may report in-sync/out-of-sync (IS/OOS) based on a RS associated with the serving beam during the beam recovery procedure. The WTRU may report IS/OOS based on the RS associated with the serving beam during the beam recovery procedure, and may base IS/OOS indications to upper layers on the new target beam following successful completion of the beam recovery procedure. The WTRU may abort or cancel a beam recovery procedure in the case that the serving beam measurements exceed a threshold. A WTRU may continue to monitor RSs on the serving beam until successful completion of the beam recovery procedure or at any one or more of the points in time that the following events occur: transmission of the BRR; reception of a BRR response from the network; successful completion of further L1 and/or MAC signaling following BRR response from the network; and/or successful reception and application of a new RRC configuration (e.g., if expected as part of the beam recovery procedure).

The beam recovery procedure may involve sequential transmission of BRR to a set of candidate beams until a response to the BRR is received. Serving beam RS measurements may be performed by the WTRU until reception of the BRR response from the network. If the serving beam RS is above a threshold at any time prior to reception of the BRR response, the WTRU may cancel transmission of the BRR to the next candidate beam in the set of candidate beams to be attempted and assume the beam failure condition has been resolved on the serving beam. In such cases, the condition for cancelling/aborting a beam recovery procedure may be checked only prior to transmission of BRR for each next candidate beam.

In another example, abortion of the beam recovery procedure may involve the WTRU ignoring the BRR response message. The WTRU may signal abortion of the beam recovery procedure to the network after reception of the response message in order to avoid completion of the beam switch. The abortion signaling may include, but is not limited to include, any one or more of the following signaling: transmission on PUCCH on the serving beam; transmission of PRACH on the serving beam; transmission of a specific message in the target beam for the purpose of aborting the beam recovery procedure, such as a NACK to the BRR response message; and/or any other control message on the serving beam.

The WTRU may be configured to handle various error scenarios related to beam failure, beam recovery and/or beam switch. For example, the WTRU may be configured to monitor the quality of both the serving and candidate beams when the beam recovery procedure is ongoing. The WTRU may be configured to cancel or abort an ongoing random access procedure on a candidate beam during a beam recovery procedure (e.g., if the serving beam becomes better than a preconfigured threshold, and/or if the quality of candidate beam goes below a preconfigured threshold).

In an example, the WTRU may be configured to assess the radio link quality of a first set of resources against two thresholds, $Q_{in}$ and $Q_{out}$. The WTRU may be configured to assess the radio link quality of a second set of resources against two thresholds, $Q_{in2}$ and $Q_{out2}$. It is noted that $Q_{in2}$ and $Q_{out2}$ for the second set of resources may be the same as thresholds $Q_{in}$ and $Q_{out}$ for the first resource set, or may have different values. In this example, the first set of resources may correspond to the RSs QCLed with a serving beam set. The second set of resources may correspond to the RSs associated with a candidate beam set. The second set of resources may be associated with dedicated random access resources.

In an example, the lower layers (e.g., the physical (PHY) layer) in the WTRU may provide an indication of error to higher layers according to the any one or more of the following example rules. In an example scenario where RS resources in the first set of resources are below a threshold $Q_{out}$, and at least one RS resource in the second set of resources is above a threshold $Q_{in}$, and a preconfigured dedicated random access preamble is associated with the at least one RS resource, the lower layers may provide an indication of error to higher layers (e.g. MAC). For example, the indication of error may provide any of the following information to the higher layer(s): occurrence of beam failure; request for link reconfiguration or beam recovery; information about the RS in the second set of resources; and/or dedicated random access resource(s).

In an example scenario where RS resources in the first set of resources are below a threshold $Q_{out}$, and at least one RS resource in the second set of resources is above a threshold $Q_{in}$, and a preconfigured dedicated random access preamble is not associated with the at least one RS resource, the lower layers may provide an indication of error to higher layers (e.g. MAC). For example, the indication of error may provide any of the following information to the higher layer(s): occurrence of beam failure; request for link reconfiguration; and/or information about the RS in the second set of resources.

In an example scenario where RS resources in the first set of resources are below a threshold $Q_{out}$, and no RS resources in the second set of resources is above a threshold $Q_{in}$, the lower layers may provide an indication of error to higher layers (e.g. MAC). For example, the indication of error may provide any the following information: occurrence of beam failure; and/or request for link reconfiguration. In an example, the WTRU may transmit the indication of error when an RS resource in the second set of resources, which was previously reported to be greater than $Q_{in}$, becomes lower than $Q_{out}$. In an example, the MAC layer in the WTRU may be configured to wait for a predefined time before sending the indication of error to higher layers.

In an example scenario where at least one RS resource in the first set of resources is above a threshold $Q_{in}$, the lower layers may provide an indication of error to higher layers (e.g. MAC). For example, the indication of error may provide any of the following information: recovery of an RS resource from the first set of resources; and/or information about the RS resource in the first set of resources.

For the examples above where an indication of error is provided by the lower layers to the higher layers, the WTRU may determine whether or not the indication of error is reported to upper layers for slots where the radio link quality is assessed. For example, the WTRU may be configured to provide the indication for every slot where the radio link quality is assessed, or at a configured periodicity (e.g., every n ms). The periodicity value may be a fixed value, configured by the gNB, or the periodicity may be specific to WTRU implementation in order to meet performance requirements (e.g., a requirement to detect beam failures within a certain time period).

The WTRU may be configured to perform any one or more of the following example actions upon receiving at a higher layer an indication of error from the lower layer. For example, if the lower layer indicates as an error beam failure (e.g. upon first indication or upon receiving N consecutive indications from lower layer) and the RS from the second set of resources is associated with a dedicated preamble, the WTRU may trigger a random access procedure using the dedicated resource associated with the RS from second set of resources. The WTRU may also monitor the CORESET associated with the RS from the second set of resources. In another example, if the lower layer indicates as an error beam failure (e.g. upon first indication or upon receiving N consecutive indications from the lower layer) and RS from the second set of resources is not associated with a dedicated preamble, the WTRU may trigger a contention based random access procedure using a common RACH resource associated with the RS from the second set. If the lower layer indicates as an error a recovery of the RS from the first set of resources (e.g. upon first indication or upon receiving N consecutive indications from lower layer), the WTRU may abort any ongoing random access procedure if any, reconfigure lower layers to monitor the CORESET associated with the first set of resources, and/or transmit a scheduling request using the resources associated with first set of resources. If the lower layer indicates as an error beam failure (e.g. upon first indication or upon receiving N consecutive indications from lower layer) and no RS resource from the first set or second set of resources is above a threshold $Q_{in}$, the WTRU may indicate beam recovery failure to the RRC.

The WTRU may be configured to declare radio link failure (i.e., detect/determine that radio link failure has occurred) after receiving a beam failure indication from the lower layers. The WTRU may be configured to declare radio link failure if no dedicated resources are associated with the best RS from the serving cell and/or if contention-based beam recovery is not allowed.

The WTRU may be configured to differentiate the radio link failure caused due to beam recovery failure from other types of radio link failures (e.g., radio link failures due to random access triggered for cases other than beam recovery, RLC failures, or RLF triggered by an RLM procedure). The WTRU may be configured to, after declaring RLF due to beam recovery failure, set the reestablishment cause in the RRCConnectionReestablishmentRequest message indicating beam recovery failure. In an example, the WTRU may be configured to provide additional information in the RRC-ConnectionReestablishmentRequest message about the nature of beam failure (e.g., beam failure due to candidate beam not found, beam failure due to absence of beam recovery response, and/or beam failure due to beam recovery timer expiry). The WTRU may be configured to include a RLF report indicating information about status of serving cell beams when the beam recovery failure has occurred. The RLF report may include any of the following example information. The RLF report may include one or more RS resources from the second set of resources that are above a threshold for which a dedicated preamble was not configured. The RLF report may include the measurement result of the top N RS resources from the first and/or second set of resources. The RLF report may include a number of preamble retransmission attempts before beam recovery failure. In an example, the WTRU may be configured to report similar beam related information within a secondary cell group (SCG) failure information message if the beam recovery failure results in the SCG failure. The presence of beam related information in the reestablishment request may be used in a self-organizing network (SON) framework (e.g., networks that make decisions based on deployment knowledge and/or historical WTRU reports) to optimize the configuration of beam failure thresholds, timers, candidate beams, and/or dedicated resources, and/or to reduce the probability of beam recovery failure and/or RLF events. A WTRU reporting the cause of RLF due to beam failure may be useful for a SON network to configure WTRUs properly in the future.

A WTRU may be configured with two or more component carriers, and beamforming may be applied to at least one of the component carriers. In such cases, a WTRU may perform methods for multi-carrier beam failure recovery (BFR). For example, a WTRU may be configured with a low frequency primary cell (PCell) and a high frequency secondary cell (Scell). For example, low frequency may refer to carriers below 6 GHz, and high frequency may refer to carriers above 6 GHz. Narrow beamforming may be applied to high frequency carriers, for example to compensate for higher path loss and/or to provide desired coverage. Narrow beamforming of low frequency carriers may not be necessary to provide desired coverage due to comparatively lower path loss. In other examples, a WTRU may be configured for multi-carrier operation, where at least one serving cell in either a master cell group (MCG) or secondary cell group (SCG) may operate in a high frequency carrier and may apply beamforming. The SpCell may refer to the PCell of the MCG or the primary Scell (PScell) of the SCG depending on if the MAC entity is associated to the MCG or the SCG, respectively.

In such cases, the high frequency Scells may enable offloading of data intensive services due to availability of wide bandwidth. Further, the high frequency Scells may provide ultra-low latency due to shorter TTIs. In some cases, the failures in Scell may be considered less critical than SpCell failures. Nonetheless, timely detection and recovery of Scell link failures may be helpful to meet anticipated requirements of future massive broadband and ultra-low latency applications.

Figure 6:
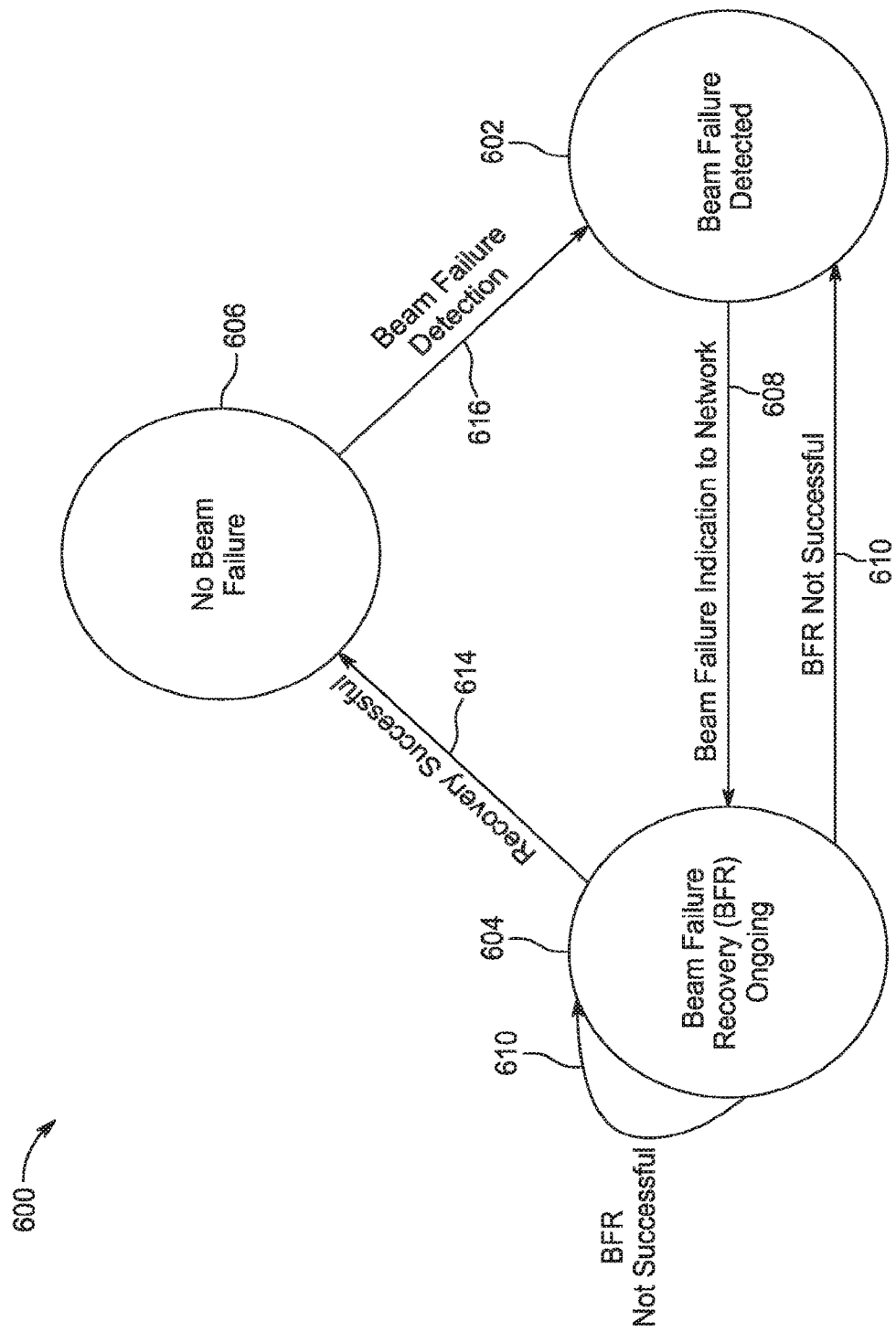
FIG. 6 is a state diagram of an example state machine for maintaining beamforming state or context for a serving cell.

A WTRU may model the per-serving cell (e.g., SpCell, PScell, Scell) beam failure status which may impact MAC procedures in the WTRU. For example, the WTRU may be configured to maintain beamforming state or context specific to each serving cell. In some examples, the WTRU may maintain such state only for serving cells that apply beamforming. FIG. 6 is a state diagram of an example state machine 600 for maintaining beamforming state or context for a serving cell.

As shown in FIG. 6, state or context information associated with each serving cell may include, but is not limited to include, any one or more of the following example states: beam failure detected 602 (and or beam failure ongoing, not shown), BFR ongoing 604, and/or no beam failure 606. In this example, if the WTRU detects a beam failure on a given cell, the WTRU may transition the state of the cell on which beam failure was detected, and may perform one or more actions. Such actions may or may not depend on the expiry of a BFR timer.

For example, if the WTRU triggers a beam failure on a given Scell (beam detection 616), the WTRU may change the Scell's state from no beam failure 606 to beam failure detected 602. After (or associated with) transitioning the state of a given cell from no beam failure 606 to beam failure detected 602, the WTRU may provide a beam failure indication 608 to the network. In this case, the WTRU may transition the cell's state from beam failure detected 602 to BFR ongoing 604, which may depend on the indication 608 provided to the network and at which time the WTRU may start or restart a BFR timer. If the WTRU determines that BFR for a given Scell is not successful 610, the WTRU may change the Scell's state to beam failure detected 602 or may remain in the BFR ongoing state 604. If the BFR for a given cell is successful 614, the WTRU may change the cell state to no beam failure 606.

The WTRU may perform certain actions or alter certain MAC procedures in a given cell depending on its beamforming state and/or whether the BFR timer is running (or has not expired). For example, if the WTRU is in a BFR ongoing state, the WTRU may suspend certain UL transmissions for certain procedures that involve PUSCH and/or PUCCH, such as logical channel prioritization (LCP) and/or SR procedures. The suspensions of PUSCH and/or PUCCH related procedures may be further conditioned on the logical channel priority that is using the PUSCH and/or PUCCH resource. The suspensions of PUSCH and/or PUCCH related procedures may further depend on the power headroom of the WTRU, the DL measurement levels of certain DL RSs, and/or whether the UL procedure is done using the supplemental uplink (SUL) or the non-SUL carrier. In an example, the suspensions of PUSCH and/or PUCCH related procedures may further propagate to other cells, even if they are not in a BFR ongoing state. For example, if a cell (e.g. the SpCell) is in a BFR ongoing state, the suspensions of PUSCH and/or PUCCH related procedures may apply to Scells regardless of their beam failure state.

The WTRU may suspend or alter certain MAC procedures that involve PDCCH monitoring according to the cell's beamforming state and/or whether the BFR timer is running. For example, if the WTRU is in a BFR ongoing state for a given cell, the WTRU may suspend DRX operation for that cell. In another example, upon transitioning the state of a given cell to a BFR ongoing state, the WTRU may monitor on a certain cell the PDCCH, BWP, and/or CORESET, depending on the content of the beam failure indication provided to the network. In another example, the WTRU may report an RLF for a certain cell and/or stop monitoring the PDCCH on a given cell after a certain number of beam recovery attempts for that cell. If the WTRU is in a beam failure detected state on a certain cell, the WTRU may monitor a subset of PDCCH monitoring occasions and/or CORESETs with which the WTRU is configured.

For a WTRU configured for multi-carrier operation, the WTRU may be configured to prioritize a beam recovery on the SpCell over a beam recovery in a Scell. In an example, the WTRU may be configured to execute only one beam recovery procedure per MAC instance at any given point in time. For example, if beam failure is detected in both the SpCell and Scell, the WTRU may execute BFR on the SpCell first, and after (or associated with) beam recovery in the SpCell, the WTRU may trigger beam recovery on the Scell. In another example, while a BFR is ongoing in the Scell, the SpCell may encounter a beam failure. The WTRU may be configured to cancel the ongoing BFR in the Scell and trigger a beam recovery in the PCell. In another example, if a BFR is ongoing in the SpCell, the Scell may encounter a beam failure. In this case, the WTRU may be configured to complete the beam recovery in the SpCell before triggering beam recovery in the Scell.

The WTRU may be configured to monitor and detect Scell beam failure. For example, the WTRU may be configured to update the state and/or context associated with a serving cell based on the status of a beam failure monitoring procedure and/or BFR procedure. In an example, the WTRU may receive the status of beam instances on a per-serving cell basis from lower layers. In another example, the WTRU may be configured to maintain separate counters to track a number of beam failure instances per serving cell. The WTRU may be configured to trigger a beam recovery procedure specific to a serving cell if the number of consecutive beam failure instances for the specific serving cell exceeds a preconfigured threshold. In an example, the WTRU may perform different actions based on whether the beam failure occurred in a SpCell or in a Scell (which may be referred to as a failed Scell). The WTRU may be configured to maintain a BFR timer specific to each serving cell, and the BFR timer may be used to determine how long the beam recovery may be attempted before an RLF is declared. In an example, a number of consecutive beam failure instances and/or threshold values of the BFR timer (i.e., a threshold time) may be configured specific to each serving cell.

The WTRU may be configured to identify the candidate beam for an Scell based on one or more methods described herein. In some deployments, the Scell may not be configured with SS blocks. In such cases, the WTRU may identify the candidate beams whose CSI-RS measurement result is above a preconfigured threshold.

A WTRU configured for multi-carrier operation may be configured with procedures for transmitting an Scell beam failure indication. The WTRU may be preconfigured with resources in the SpCell to indicate Scell beam failure and/or the Scell candidate beam information implicitly, such as via selection of a specific resource, or explicitly, such as based on contents of the transmission on the selected preconfigured resource in the SpCell.

Figure 7:
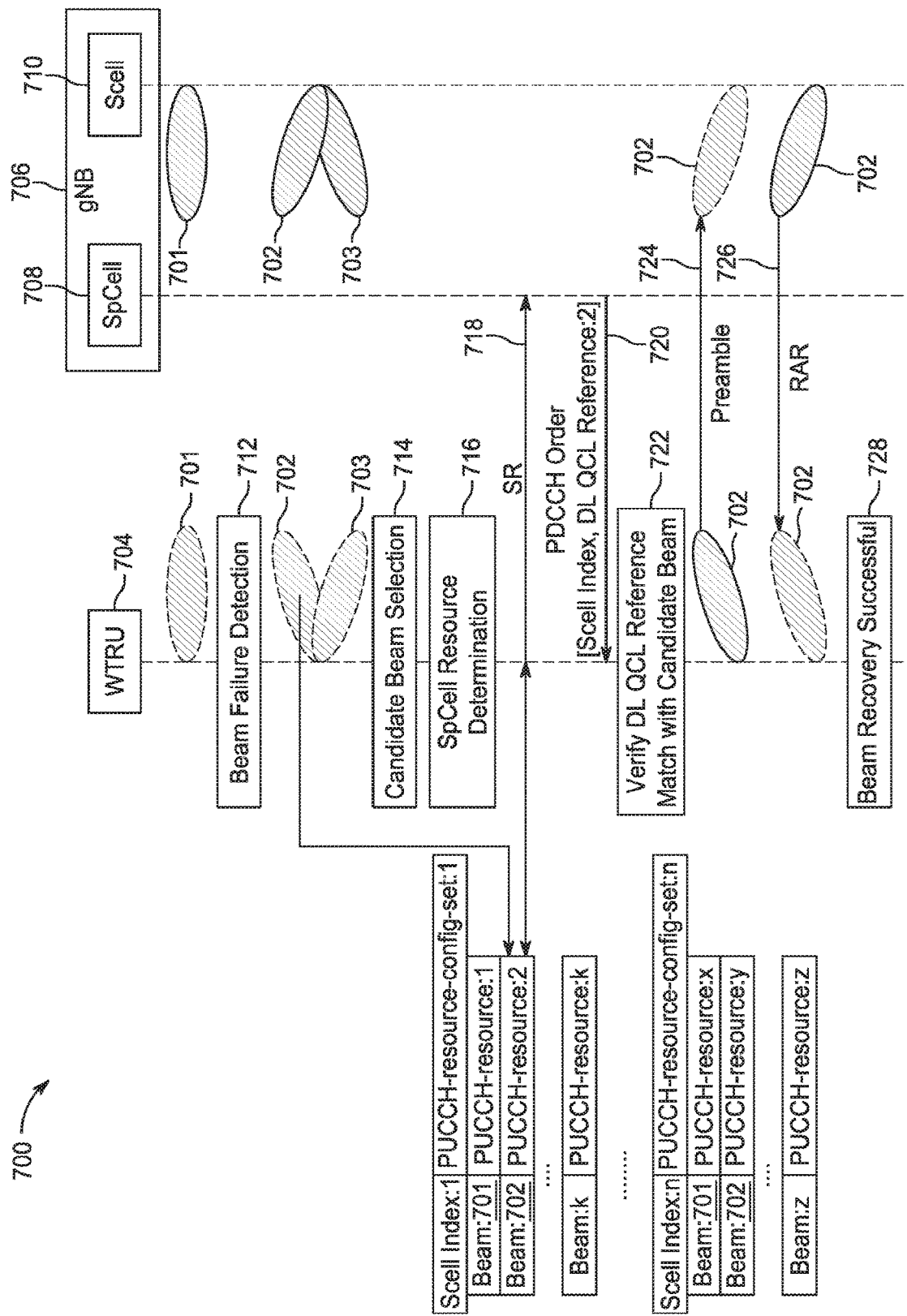
FIG. 7 is a diagram of an example multi-carrier secondary cell (Scell) beam failure indication procedure.

FIG. 7 is a diagram of an example Scell beam failure indication procedure 700, where the WTRU 704 is configured for multi-carrier operation and the gNB 706 includes an SpCell 708 (primary cell) and an Scell 710 (secondary cell). The WTRU 704 may be configured to communicate with the gNB 706 on Scell 710 using serving beam 701. The WTRU 704 may monitor for and detect a beam failure 712 on serving beam 701.

In an example, dedicated PUCCH resources in the SpCell 708 may be used to indicate Scell 710 beam failure of beam 701. For example, the WTRU 704 may be configured (e.g., via RRC signaling) with dedicated PUCCH resources associated with the SpCell 708 for reporting a Scell 710 beam failure indication. In an example, the WTRU 704 may be configured with multiple PUCCH-resource-config sets (e.g., PUCCH-resource-config set:1, ... PUCCH-resource-config set:n) associated with the SpCell 708, and each PUCCH-resource-config set may be mapped to an Scell index associated with an Scell beam, and each PUCCH-resource-config resource within a set may be mapped to a DL QCL reference/DL beam (e.g., SS block and/or CSI-RS resource) in the Scell 710. In the example shown in FIG. 7, the PUCCH-resource-config-set:1 may be mapped to Scell index:1 of Scell 710 and PUCCH-resource:1 may be mapped to beam 701 on the Scell 710.

The WTRU 704 may be configured to indicate the Scell index (e.g., Scell index:1) associated with the detected Scell beam failure (e.g., of beam 701) based on selection of the PUCCH-resource-config set (e.g., PUCCH-resource-config set 1). At 714, the WTRU 704 may be configured to select a candidate beam (e.g., beam 702) in the Scell 710, and implicitly indicate the candidate beam (e.g., beam 702) in Scell 710 using the preconfigured PUCCH resource (e.g., PUCCH-resource:2) within the selected PUCCH-resource-config set (e.g., PUCCH-resource-config set). If Scell 710 beam failure is detected at 712 (e.g., by the WTRU 704), the WTRU 704 may be configured to, at 716, select an UL (PUCCH) resource in the SpCell 708 as a function of the identified candidate beam (e.g., beam 702) in the Scell 710. In an example, the WTRU 704 may be configured to transmit an SR 718 indicating beam failure in the Scell 710 and a selected candidate beam (e.g., beam 702) in the Scell 710 in the selected PUCCH resource of the SpCell 708.

The WTRU 704 may be configured to initiate beam recovery on the Scell 710 when the WTRU 704 receives a PDCCH order 720 from the gNB 706 on the SpCell 708. The PDCCH order 720 from the SpCell 708 may include an Scell index and/or a DL QCL reference (e.g., SSB index and/or CSI-RS resource index) associated with the Scell 710. At 722, the WTRU 704 may verify the received DL QCL reference match with a candidate beam (e.g., beam 702). The WTRU 704 may be configured to initiate random access procedure on the Scell 710 using the UL beam 702 determined based on the Scell 710 DL QCL reference indicated in the PDCCH order 720. The random procedure may include the WTRU 704 sending a random access preamble 724 on the Scell 710 on beam 702, and receiving a RAR 726 on the Scell 710 on beam 702. At 728, the WTRU 704 may determine that the beam recovery was successful based on the reception of the RAR 826. Characteristics and details of an Scell beam failure indication procedure, which may apply to the example Scell beam failure indication procedure 700, are described in more detail below.

In an example, as part of an Scell beam failure indication procedure, the WTRU may be configured with a PUCCH-resource-config set in the SpCell, and each PUCCH-resource-config within the set may be mapped to a Scell index. If an Scell beam failure is detected (e.g., by the WTRU), the WTRU may transmit event triggered or aperiodic beam reporting on a selected PUCCH resource. The selected PUCCH resource may implicitly indicate the index of the failed Scell, and the contents of the beam reporting may indicate the identified candidate beams in the Scell. For example, the PUCCH resource for Scell beam reporting may be different from a PUCCH resource for SpCell beam reporting. In an example, the WTRU may report n (where n may be ≥1) best candidate Scell SSB indexes and/or RSRP results associated with those SSBs. For example, the WTRU may report n (where n may be ≥1) best candidate CSI-RS resource identities and/or RSRP results associated with those CSI-RS resources. If n=1, the WTRU may report the best candidate. If n>1, the WTRU may report the n best candidates.

In an example, random access resources on the SpCell may be used to indicate Scell beam failure. In some cases, contention-based random access may not be supported in the Scell. The WTRU may be configured (e.g., via SIB or dedicated RRC signaling) with contention based random access resources in the SpCell to implicitly indicate the Scell beam failure. A WTRU may be configured with contention based random access resources (e.g., time and/or frequency and/or preamble) on the SpCell to indicate Scell beam failure. For example, the WTRU may be configured with a set of random access resources, wherein each time/frequency resource (e.g., PRACH-config-index, PRACH-freqOffset) on the SpCell may be mapped to a specific Scell index and each preamble (e.g., preamble index) within the time/frequency resource may be mapped to the DL QCL reference/DL beam (e.g., SS block and/or CSI-RS resource) in the Scell. The WTRU may be configured to indicate the Scell index associated with Scell beam failure based on, for example, selection of PRACH-config-index and/or PRACH-freqOffset of the preconfigured random access resource in the SpCell. The WTRU may be configured to implicitly indicate the candidate beam in Scell based on the selection of a preconfigured preamble on the SpCell mapped to the candidate beam in the Scell. In another example, the WTRU may be configured with a set of random access preambles in the SpCell, and each random-access preamble may be mapped to a Scell index. The WTRU may be configured to indicate a beam failure of an Scell based on selection of a preamble resource associated in the SpCell mapped with that Scell. In another example, the WTRU may be configured with contention-free random access resources in the SpCell (e.g., instead of contention based resources) and a similar procedure may be applied.

Figure 8:
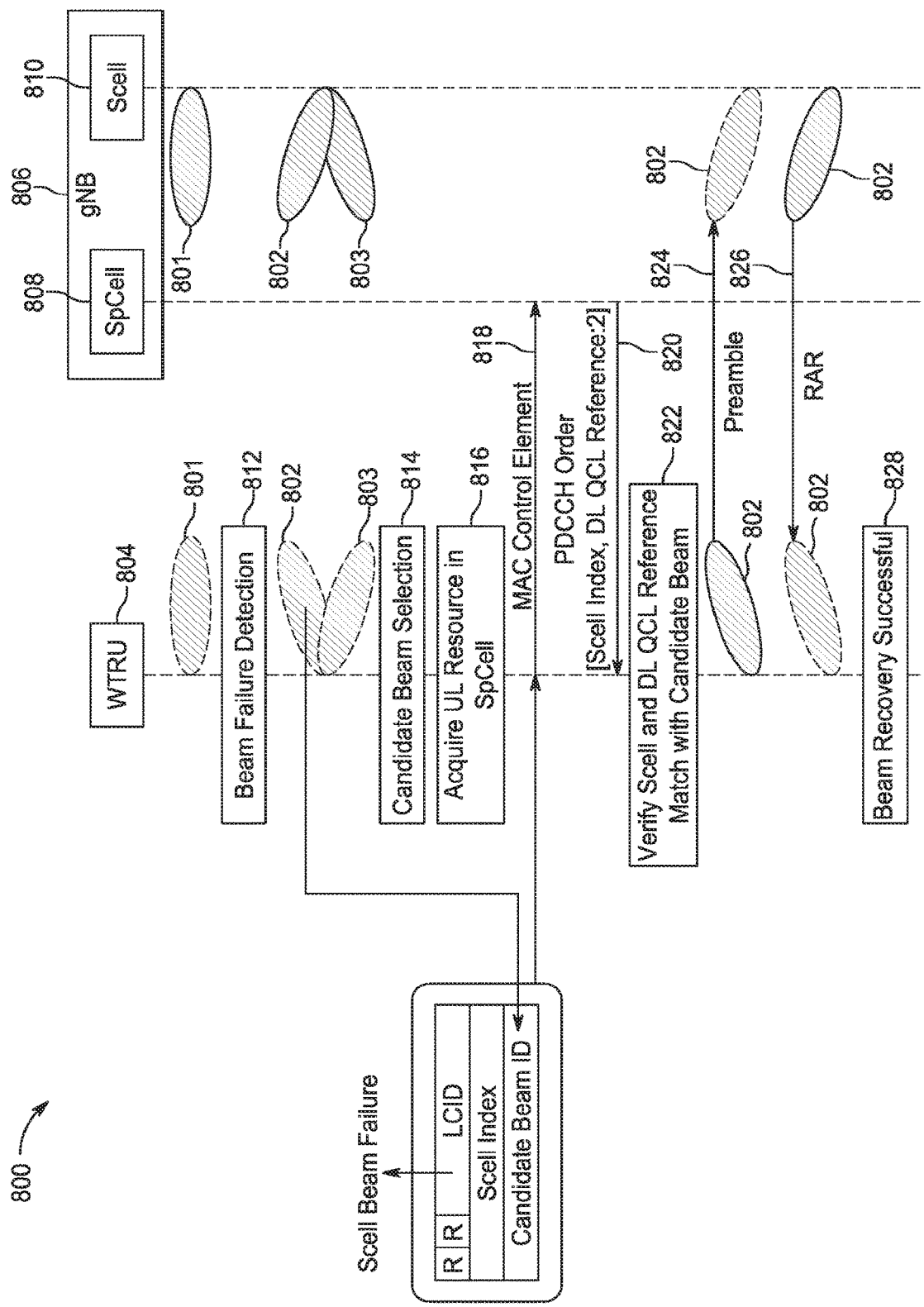
FIG. 8 is a diagram of another example Scell beam failure indication procedure.

A WTRU may acquire a UL grant or may use an available UL grant on the SpCell to report Scell beam failure and/or the Scell candidate beam information, for example using a MAC CE (an example of such a procedure is shown in FIG. 8, and described below). Reporting Scell beam failure and/or the Scell candidate beam information may be used in an Scell supporting DL only (or UL and DL), and may be used to avoid the need to preconfigure dedicated resources for Scell BFR, thus enabling an Scell to support both UL and DL. For example, if Scell beam failure occurs, the WTRU may be configured to transmit a MAC CE indicating Scell beam failure and/or report Scell candidate beam information. In an example, the WTRU may use the available UL grant or acquire a UL grant on the SpCell using an SR/PUCCH/PRACH transmission on the SpCell specifically reserved for Scell beam failure indication or using SR or RACH on the SpCell. The format of the MAC CE use a MAC sub-PDU with MAC sub-header with a logical channel identity specifically defined to indicate Scell beam failure. In an example, a MAC CE of the MAC sub-PDU may include a bitmap of the Scell index (e.g., using the same format as activation/deactivation MAC CE), and the bit position corresponding to the failed Scell index may be set to 1, and the remaining bit positions set to zero. The MAC CE may include an identity of a selected candidate beam, which may be in the form of an SS block index, CSI-RS resource identity, or a logical bitmap mapping to SS block index or CSI-RS resource identity. In another example, the identity of the candidate beam may be indicated using an index from a preconfigured list of candidate beam RSs. If the WTRU cannot find a suitable candidate beam in the failed Scell, the WTRU may indicate Scell beam failure with a reserved/null value for the DL candidate beam. In an example, dedicated PRACH/PUCCH resources may be reserved to indicate the event of no DL candidate beam.

FIG. 8 is a diagram of another example Scell beam failure indication procedure 800, where the WTRU 804 is configured for multi-carrier operation and the gNB 806 includes an SpCell 808 (primary cell) and an Scell 810 (secondary cell). The WTRU 804 may be configured to communicate with the gNB 806 on Scell 810 using serving beam 801. The WTRU 804 may monitor for and detect a beam failure 812 on serving beam 801.

At 814, the WTRU 804 may be configured to select a candidate beam (e.g., beam 802) in the Scell 810, and acquire, at 816, UL resources in the SpCell 808. The WTRU 804 may be configured to transmit a MAC CE 818, on an the acquired UL resource in SpCell 808, indicating beam failure in the Scell 810 and a selected candidate beam (e.g., beam 802) in the Scell 810. In this example, a LCID code point may be reserved to indicate Scell beam failure.

The WTRU 804 may be configured to initiate beam recovery on the Scell 810 when the WTRU 804 receives a PDCCH order 820 from the gNB 806 on the SpCell 808. The PDCCH order 820 from the SpCell 808 may include an Scell index and/or a DL QCL reference (e.g., SSB index and/or CSI-RS resource index) associated with the Scell 810. At 822, the WTRU 804 may verify the Scell 810 and the received DL QCL reference match with a candidate beam (e.g., beam 802). The WTRU 804 may be configured to initiate a random access procedure on the Scell 810 using the UL beam 802 determined based on the Scell 810 DL QCL reference indicated in the PDCCH order 820. The random procedure may include the WTRU 804 sending a random access preamble 824 on the Scell 810 on beam 802, and receiving a RAR 826 on the Scell 810 on beam 802. At 828, the WTRU 804 may determine that the beam recovery was successful based on the reception of the RAR 826.

Various methods and structures may be used to implement a response to an Scell beam failure indication (e.g., PDCCH order). The WTRU may be configured to initiate beam recovery on the Scell if it receives a PDCCH order from the SpCell. For example, the PDCCH order may be a response to the Scell beam failure indication from the WTRU. In an example, the PDCCH order may be initiated by the network for one or more of various reasons (e.g., Scell BFR or initial Scell beam selection or Scell beam management in general).

The PDCCH order may indicate the UL carrier (e.g., Scell carrier indication/index or SUL carrier indication), PRACH format, time/frequency resources, preamble index, number of repetitions of RA resource etc. In some examples, the PDCCH order may explicitly indicate the bandwidth part to perform random access (RA) on the Scell etc. Alternately the WTRU may be implicitly configured to use the default bandwidth part or the last active bandwidth part for RA on Scell, for example.

The WTRU may be configured to initiate random access on the Scell using a UL beam determined based on the Scell DL QCL reference indicated in the PDCCH order. The PDCCH order from the SpCell may include a DL QCL reference (e.g., SSB index and/or CSI-RS resource index) associated with the Scell. The DL QCL reference may be either implicitly or explicitly indicated in the PDCCH order. For example, the WTRU may implicitly determine the QCL reference based on the PRACH resource (e.g. preamble and/or time/frequency resource). The WTRU may be configured to determine the UL beam for preamble transmission based on the Scell DL QCL reference in the PDCCH order. For example, the UL TX beam in the WTRU may correspond to the RX beam associated with the DL QCL reference signaled in the PDCCH order. In an example, the WTRU may be configured to verify whether the DL QCL reference in the PDCCH order corresponds to the Scell candidate beam reported by the WTRU. The WTRU may be configured to ignore the PDCCH order in case of mismatch (e.g., where the DL QCL reference in the PDCCH order does not correspond to the Scell candidate beam reported by the WTRU and/or the RSRP associated with DL QCL reference is below a preconfigured threshold). The WTRU action may avoid spurious UL transmissions due to a race condition between a WTRU initiated Scell beam failure indication and a network triggered PDCCH order.

In an example, the WTRU may be configured with contention free random access preambles in each serving cell to trigger BFR associated with that serving cell. For example, the WTRU may implicitly indicate the candidate SS block or CSI-RS resource by selection of a contention free random access preamble associated with that SS block or CSI-RS resource.

Various procedures and structures for completion of Scell beam recovery may be implemented. For example, the WTRU may be configured to monitor for a DCI in Scell after a beam failure indication transmission, where the beam failure indication transmission may include, but is not limited to include, any of the following transmissions: a preamble transmission in Scell; a MAC CE transmission in PCell; a PUCCH transmission in PCell; or a preamble transmission in PCell. For example, the WTRU may consider the BFR complete/successful upon receiving a DL assignment, UL grant, and/or RAR addressed to the WTRU's C-RNTI or configured scheduling RNTI (CS-RNTI) on the PDCCH of the Scell that triggered the beam failure. In an example, the WTRU may monitor DCI in a CORESET preconfigured for BFR in Scell. In another example, if a CORESET for Scell is not configured explicitly, the WTRU may assume the same BFR CORESET for all configured serving cells (e.g., reuse SpCell BFR CORESET configuration for Scell).

For example, the WTRU may start a timer upon transmission of a beam failure indication or upon beam failure detection and if the BFR cannot be completed before the expiry of the timer the WTRU may declare that the beam recovery has failed. For example, the WTRU may start a BFR timer upon transmission of a MAC CE including a beam failure indication. If a DCI addressed to the WTRU's C-RNTI or CS-RNTI is not received within a timer expiry, the WTRU may declare a BFR failure.

In an example, the WTRU may cancel ongoing Scell beam recovery upon receiving an Scell deactivation command. The WTRU may stop the BFR timer associated with an Scell upon receiving an Scell deactivation command for the corresponding Scell. For example, the WTRU may be configured to receive an Scell deactivation command as a response to a beam failure indication. In an example, the WTRU may cancel the outstanding beam failure indication transmission (e.g. preamble, MAC CE transmission or PUCCH transmission) associated with a Scell when a Scell deactivation command corresponding to that Scell is received. In an example, the WTRU may cancel the RAR and/or DCI monitoring associated with Scell BFR upon receiving an Scell deactivation command. In an example, the WTRU may stop a beam failure detection timer and reset the counters associated with BFR upon receiving an Scell deactivation command.

Procedures may be used to handle ambiguity of Scell deactivation timer expiry. In an example, the WTRU may stop the BFR timer associated with an Scell upon expiration of a corresponding Scell deactivation timer. The WTRU may perform the same actions during Scell deactivation timer expiry as described for reception of Scell deactivation command. It some scenarios, a beam failure in an Scell may mask one or more DK transmissions in that Scell. For example, the WTRU may miss a PDCCH carrying an UL or DL grant due to beam failure and this may lead to the expiry of the Scell deactivation timer. To avoid unintentional deactivation of Scell, the WTRU may be configured to stop the Scell deactivation timer when beam failure is detected for the corresponding Scell. The WTRU may be configured to restart the Scell deactivation timer upon successful completion of BFR for that Scell. Since the WTRU may be configured to expect an Scell deactivation command as a response to beam failure indication, the network may deactivate Scell explicitly via a MAC CE if needed.

An example procedure for handling ambiguity of Scell deactivation timer expiry in a WTRU is described in the following. The following procedures may be performed by the MAC entity of the WTRU, for each configured Scell. In the case that an Scell Activation/Deactivation MAC CE is received that deactivates the Scell, the MAC entity of the WTRU may perform, for each configured Scell, any of the following actions: stop the beamFailureDetectionTimer, if running; stop the beamFailureRecoveryTimer, if running; reset the counter associated with beam failure indication; and/or cancel the beam failure indication, if pending. In the case that a beam failure instance indication has been received from lower layers in the WTRU, the MAC entity of the WTRU may perform, for each configured Scell, any of the following actions: start or restart the beamFailureDetectionTimer; increment beam failure instance (BFI) BFI_COUNTER by 1; if BFI_COUNTER= beamFailureInstanceMaxCount+1, stop the ScellDeactivationTimer and/or initiate a random access procedure (e.g., as described herein) on the SpCell by applying the parameters configured in BeamFailureRecoveryConfig. In the case that the BFR procedure associated with a Scell is successfully completed, the MAC entity of the WTRU may, for the corresponding Scell, start the ScellDeactivationTimer associated with the Scell, if not running.

For a preamble transmission in the Scell, the WTRU may be configured to receive two RARs: one from the SpCell, and another from the Scell. The WTRU may be configured to verify whether both UL and DL Scell beams are recovered successfully, or whether only the Scell DL beam is recovered successfully.

The WTRU may be configured to monitor RAR from both SpCell and Scell if a preamble transmission occurs in the Scell. In an example, the random access RNTI (RA-RNTI) calculation for RAR reception in the SpCell may include a component associated with Scell index. The RAR response window on the SpCell and Scell may or may not overlap. In an example, the WTRU may determine the status of Scell BFR using the received RAR messages and using any of the following rules. In a scenario where RAR is successfully received from Scell, the WTRU may consider BFR to be complete. In a scenario where no RAR is received from the Scell within the response window and a RAR is received from SpCell, then the WTRU may consider Scell DL candidate beam to be invalid. In this case, if there is no other candidate beam or SUL carrier exists or maximum preamble transmissions are reached or a timer associated with Scell beam recovery expires, the WTRU may report Scell recovery failure to SpCell. Otherwise, if there is alternate candidate beam in the Scell, then the WTRU may perform retransmission of preamble in Scell using an alternate candidate beam. Otherwise, if no candidate beam exists in the Scell and if the SUL carrier is configured for the Scell, the WTRU may trigger random access on the SUL carrier. In a scenario where no RAR is received from the Scell within the response window and RAR is not received from SpCell within the response window, and if the maximum preamble transmissions are not reached or a timer associated with Scell beam recovery is not expired, then the WTRU may perform any one or more of the following actions: retransmit preamble in the Scell, with power ramping; perform preamble transmission on a different candidate beam in the Scell, if it exists; and/or perform preamble transmission on the SUL carrier, if configured.

Various procedures and structures described in the context of multi-carrier beam recovery may also be applicable in single carrier beam switch cases, or any other procedure that changes/updates the beams for a WTRU.

Figure 9:
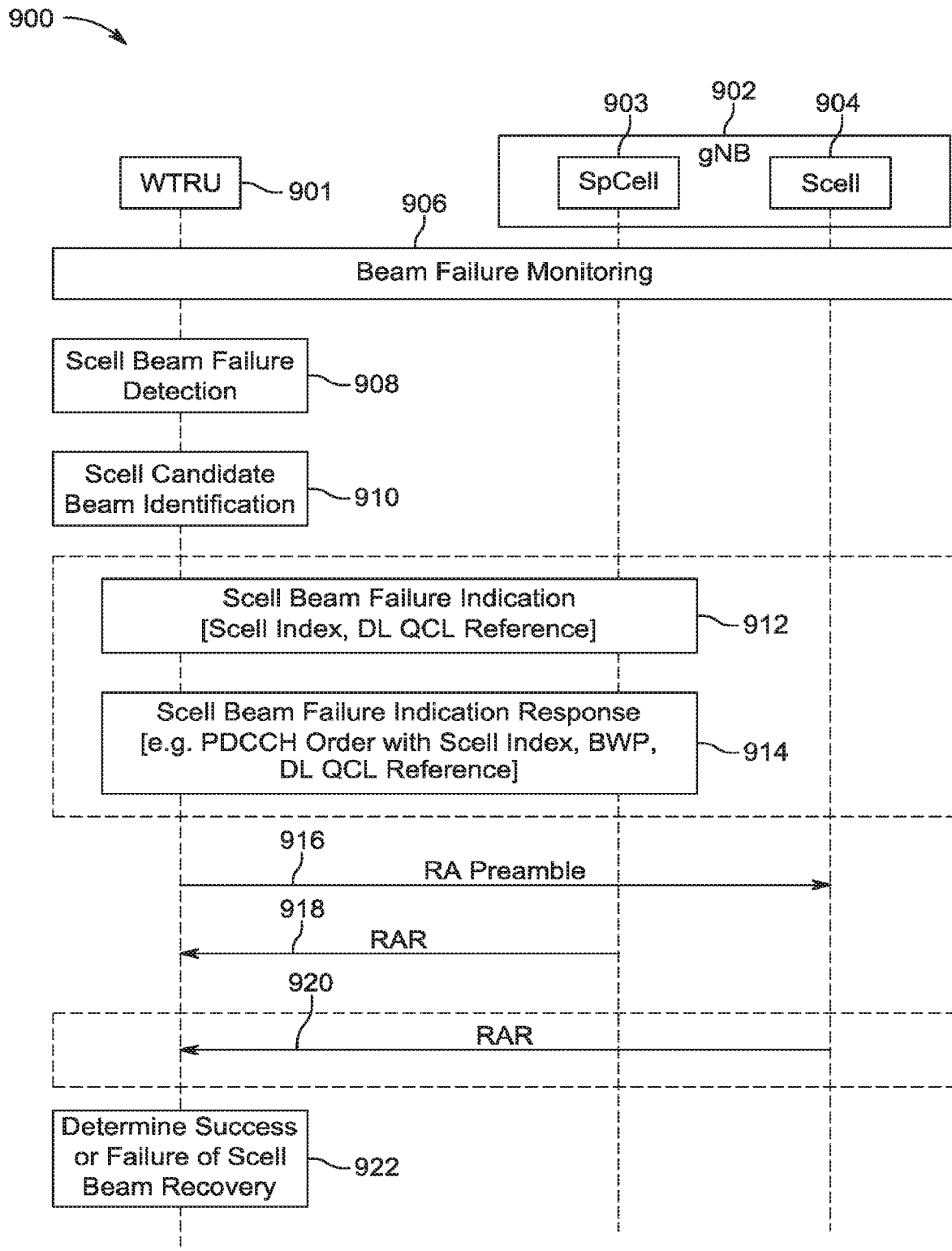
FIG. 9 is a signaling diagram a multi-carrier beam recovery procedure.

FIG. 9 is a signaling diagram of an example multi-carrier beam recovery procedure 900. At 906, the WTRU 201 may perform beam failure monitoring in one or more serving cells (e.g., SpCell 903, Scell 904) by tracking a number of consecutive beam failure instances for each serving cell of gNB 902. At 908, if a beam failure is detected by the WTRU 901 on Scell 904, the WTRU 901 may, at 910, identify/determine the Scell candidate beam, for example based on RS measurement above a preconfigured threshold, or based on any other scheme such as those described herein.

In a scenario not shown, if a beam failure occurs in the SpCell 903, the WTRU 901 may trigger BFR using a beam recovery request (e.g., preamble) transmission in the SpCell 903. If the beam failure occurs in the Scell 904, the WTRU 901 may perform BFR using any one or more of the following example procedures. In a scenario where contention-free resources are allocated in the failed Scell 904, the WTRU 901 may perform BFR transmissions (e.g., using a preamble associated with a candidate beam) in the Scell 904. In a scenario where contention-based preamble transmissions are allowed in the Scell 904, the WTRU 901 may perform contention-based preamble transmissions (e.g., using a preamble associated with a candidate beam) in the Scell 904. Otherwise, as shown in FIG. 9, the WTRU 901 may trigger an Scell beam failure indication 912 to the SpCell 903, for example using any one or more of the following example methods. In an example method, if dedicated PUCCH resources are configured in the SpCell 903 and the WTRU 901 has a valid timing advance for the SpCell 903, then the WTRU may transmit a Scell beam failure indication 912 using PUCCH. In another example method, if random access preambles are configured in SpCell 903 for the purpose of Scell beam failure indication 912, then the WTRU 901 may transmit Scell a beam failure indication 912 using PRACH. In another example method, the WTRU 901 may obtain a UL grant or use an available UL grant and may transmit an Scell beam failure indication 912 using a MAC CE. The Scell beam failure indication 912 may include the Scell index and/or DL QCL reference identifying the selected candidate Scell beam and indicating beam failure in the Scell 904. The WTRU 901 may be configured to initiate beam recovery on the Scell 904 when the WTRU 901 receives an Scell beam failure indication response 914 (e.g., a PDCCH order with Scell index, BGWP, and/or DL QCL reference associated with the Scell 904) from the gNB 902 on the SpCell 903.

The WTRU 901 may be configured to initiate a random access procedure on the Scell 904 using a selected UL beam determined based on the Scell 904 DL QCL reference indicated in the Scell bema failure indication response 914. The random procedure may include the WTRU 901 sending a random access preamble 916 on the Scell 904 on the selected beam, and receiving a RAR 918 on the Spcell 903 and/or a RAR 920 on the Scell 904 on the selected beam. At 922, the WTRU 901 may determine that the beam recovery was successful based on the reception of the RAR 918 and/or RAR 920.

In an example not shown in FIG. 9, a WTRU may not be configured with dedicated BFR resources (e.g., preambles and/or PUCCH resources) in the current active BWP. In such cases, the WTRU may be configured to autonomously switch its active BWP to a default BWP or a BWP on which dedicated beam recovery resources are configured. For example, the WTRU may select a BWP for beam recovery in the following order of priority (e.g., switch the BWP parts in the following order until it finds dedicated resources for beam recovery): current active BWP in Scell; default BWP in Scell; any other BWP in Scell; current active BWP in the SpCell; default BWP of SpCell; and/or any BWP in the SpCell. In an example, the WTRU may be configured to select an earliest occurring beam recovery resource in any of the BWPs configured for the WTRU.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor, the processor configured to:
receive configuration information, wherein the configuration information comprises an indication of a plurality of uplink (UL) resources for a secondary cell (Scell) beam recovery, a first UL resource of the plurality of UL resources is associated with a first beam set of the SCell, and a second UL resource of the plurality of UL resources is associated with a second beam set of the Scell;
determine that beam failure has occurred on the Scell;
determine whether to indicate that beam failure has occurred on the Scell using the first UL resource or the second UL resource, wherein the processor is configured to determine to indicate that beam failure has occurred on the Scell using the first UL resource if the beam failure corresponds a beam of the first beam set of the Scell, and the processor is configured to determine to indicate that beam failure has occurred on the Scell using the second UL resource if the beam failure corresponds a beam of the second beam set of the Scell; and
send a transmission using the determined first or second UL resource based on determining that beam failure has occurred on the Scell.

2. The WTRU of claim 1, wherein the processor is configured to:
receive a UL grant; and
transmit a message using UL resources indicated in the UL grant, wherein the message comprises information indicating that beam failure has occurred on the Scell.

3. The WTRU of claim 2, wherein the message further comprises an indication of a selected candidate beam associated with the Scell.

4. The WTRU of claim 3, wherein the message corresponds to a medium access control (MAC) control element (CE).

5. The WTRU of claim 2, wherein the processor is configured to determine that a beam recovery procedure for the Scell is complete based on receiving the UL grant.

6. The WTRU of claim 1, wherein the first UL resource corresponds to a first physical uplink control channel (PUCCH) resource, and the second UL resource corresponds to a second PUCCH resource.

7. The WTRU of claim 6, wherein the first PUCCH resource is associated with a first scheduling request (SR) configuration, and the second PUCCH resource is associated with a second SR configuration.

8. The WTRU of claim 1, wherein the processor being configured to send a transmission using the determined first or second UL resource comprises the processor being configured to transmit a dedicated preamble using a time and frequency resource associated with a selected candidate beam.

9. The WTRU of claim 1, wherein the configuration information comprises an indication of at least a first reference signal (RS) for beam measurements for the first beam set of the Scell, and at least a second RS for beam measurements for the second beam set of the Scell.

10. The WTRU of claim 9, wherein each of the first RS and the second RS correspond to one of a synchronization signal block (SSB) or a channel state information reference signal (CSI-RS).

11. A method performed by a wireless transmit/receive unit (WTRU), the method comprising:
receiving configuration information, wherein the configuration information comprises an indication of a plurality of uplink (UL) resources for a secondary cell (Scell) beam recovery, a first UL resource of the plurality of UL resources is associated with a first beam set of the SCell, and a second UL resource of the plurality of UL resources is associated with a second beam set of the Scell;
determining that beam failure has occurred on the Scell;
determining whether to indicate that beam failure has occurred on the Scell using the first UL resource or the second UL resource, wherein determining whether to indicate that beam failure has occurred on the Scell using the first UL resource or the second UL resource comprises determining to indicate that beam failure has occurred on the Scell using the first UL resource if the beam failure corresponds a beam of the first beam set of the Scell or determining to indicate that beam failure has occurred on the Scell using the second UL resource if the beam failure corresponds a beam of the second beam set of the Scell; and
sending a transmission using the determined first or second UL resource based on determining that beam failure has occurred on the Scell.

12. The method of claim 11, comprising:
receiving a UL grant; and
transmitting a message using UL resources indicated in the UL grant, wherein the message comprises information indicating that beam failure has occurred on the Scell.

13. The method of claim 12, wherein the message further comprises an indication of a selected candidate beam associated with the Scell.

14. The method of claim 13, wherein the message corresponds to a medium access control (MAC) control element (CE).

15. The method of claim 12, comprising determining that a beam recovery procedure for the Scell is complete based on receiving the UL grant.

16. The method of claim 11, wherein the first UL resource corresponds to a first physical uplink control channel (PUCCH) resource, and the second UL resource corresponds to a second PUCCH resource.

17. The method of claim 16, wherein the first PUCCH resource is associated with a first scheduling request (SR) configuration, and the second PUCCH resource is associated with a second SR configuration.

18. The method of claim 11, wherein sending a transmission using the determined first or second UL resource comprises transmitting a dedicated preamble using a time and frequency resource associated with a selected candidate beam.

19. The method of claim 11, wherein the configuration information comprises an indication of at least a first reference signal (RS) for beam measurements for the first beam set of the Scell, and at least a second RS for beam measurements for the second beam set of the Scell.

20. The method of claim 19, wherein each of the first RS and the second RS correspond to one of a synchronization signal block (SSB) or a channel state information reference signal (CSI-RS).

* * * * *